Fig. 2.

Jan. 16, 1962 T. H. MITCHELL ETAL 3,017,461
COMMUNICATION SYSTEM
Filed Aug. 10, 1956 33 Sheets-Sheet 3

Fig. 3.

INVENTORS
THOMPSON H. MITCHELL
JAMES S. HARRIS &
DAVID ZEKARIA

BY Charles H. Brown
ATTORNEY

Jan. 16, 1962     T. H. MITCHELL ETAL     3,017,461
COMMUNICATION SYSTEM
Filed Aug. 10, 1956     33 Sheets-Sheet 4

*Fig. 4.*

INVENTORS
THOMPSON H. MITCHELL
JAMES S. HARRIS &
DAVID ZEKARIA
BY Charles H. Brown
ATTORNEY

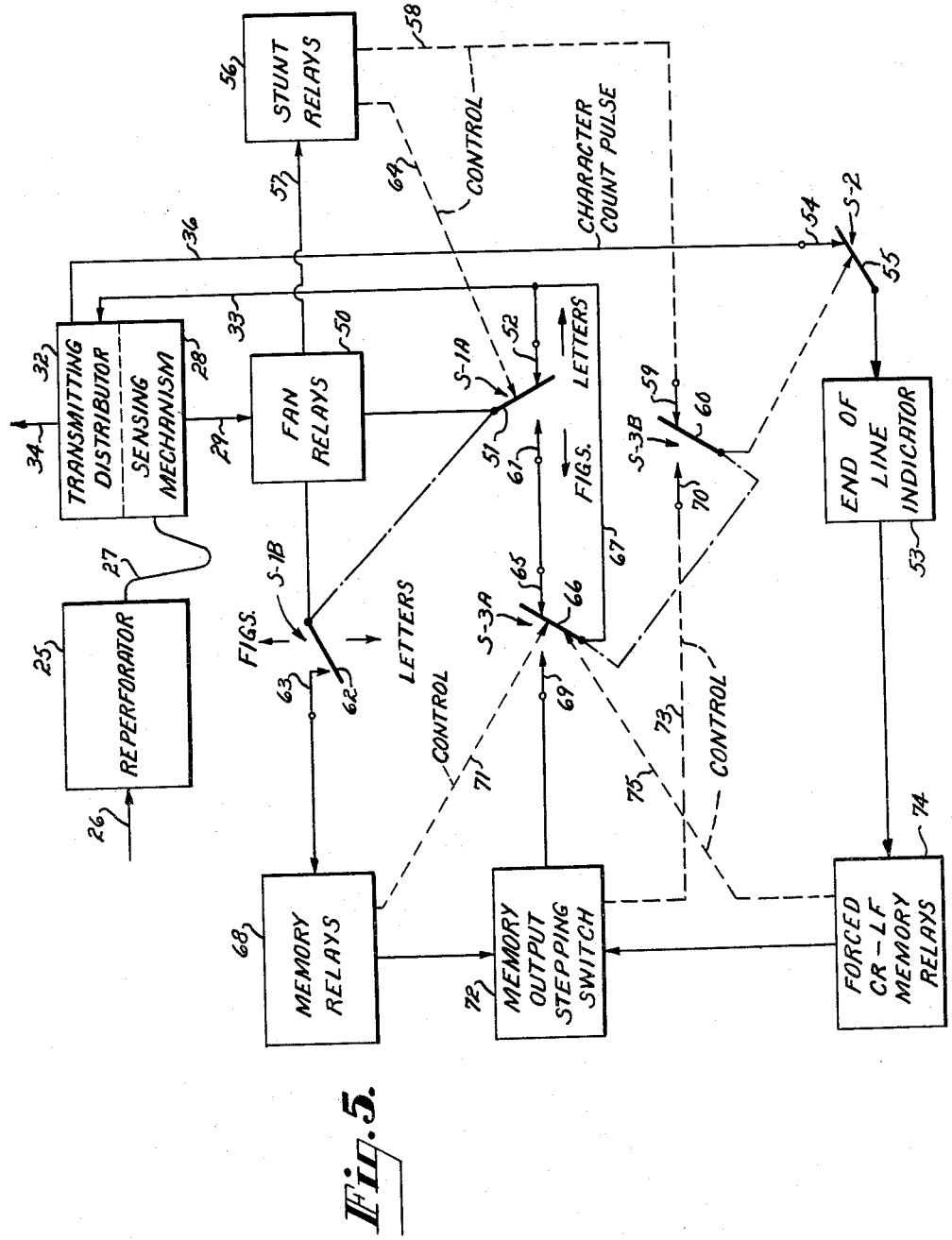

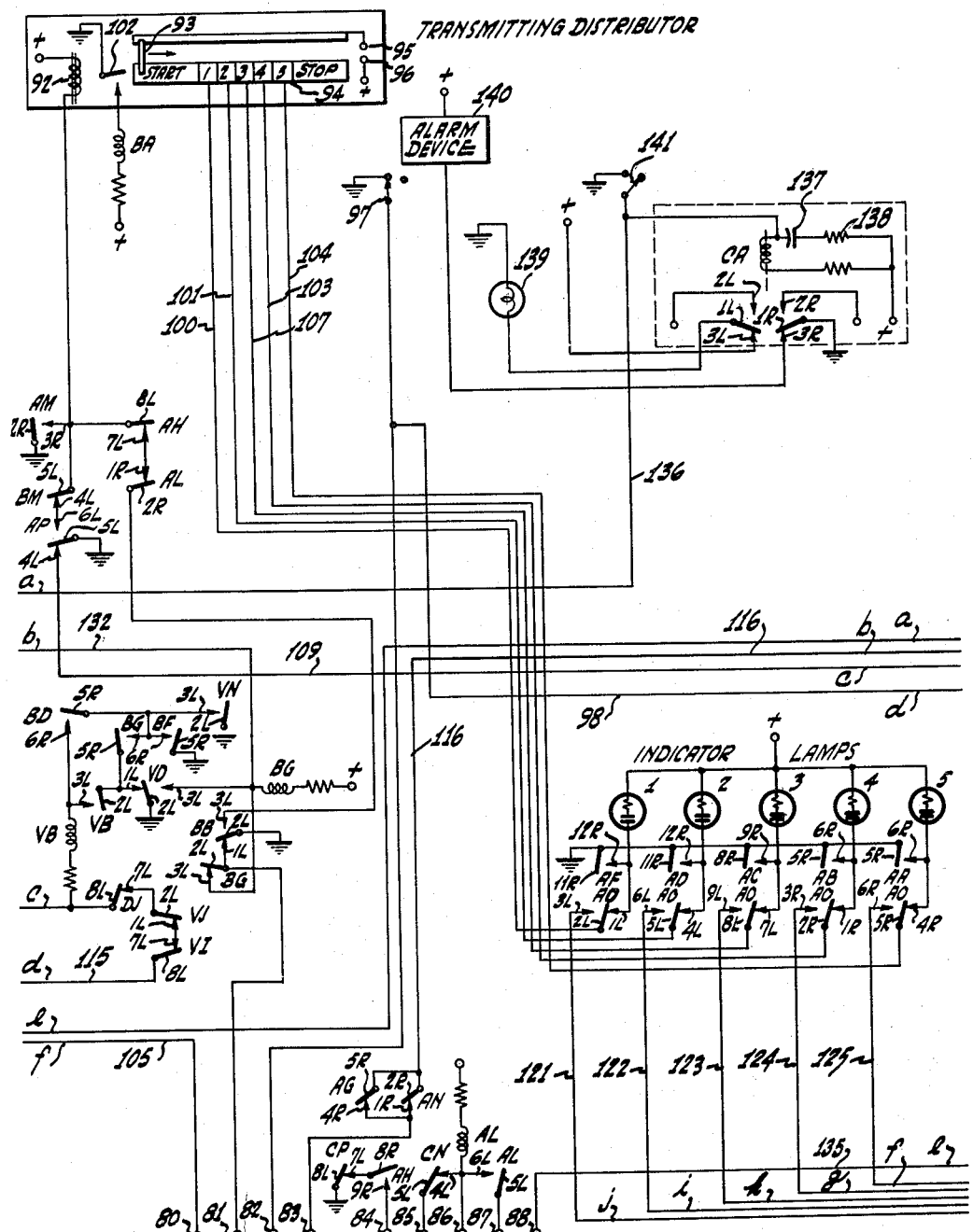

Jan. 16, 1962  T. H. MITCHELL ETAL  3,017,461
COMMUNICATION SYSTEM
Filed Aug. 10, 1956  33 Sheets-Sheet 11
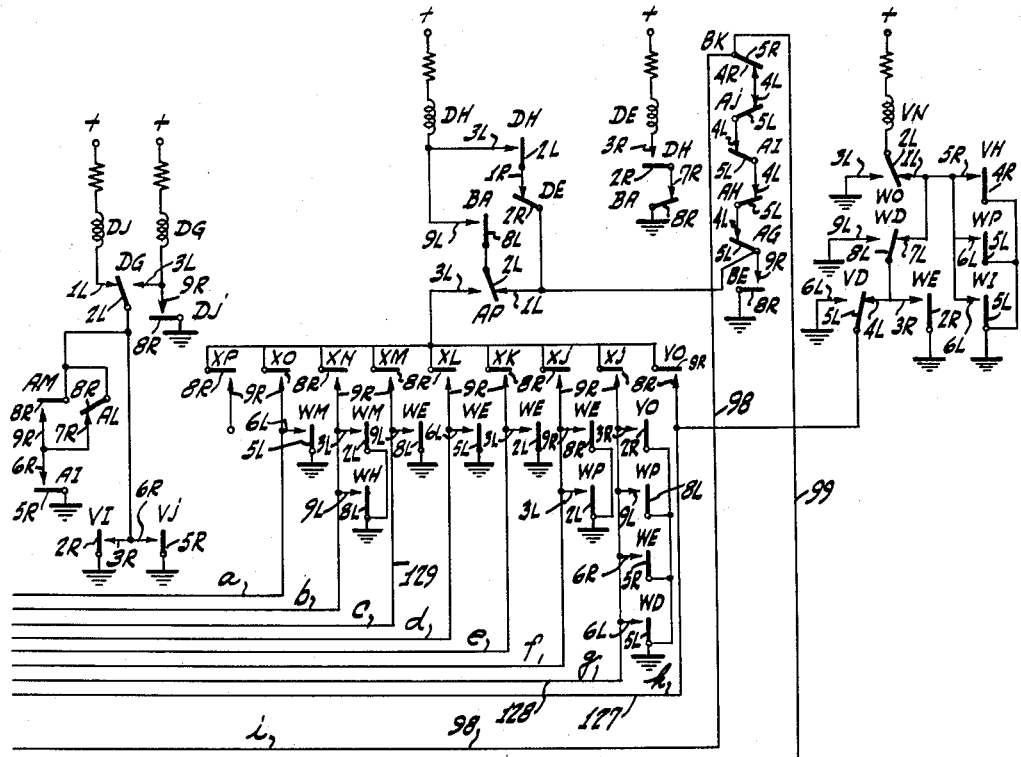
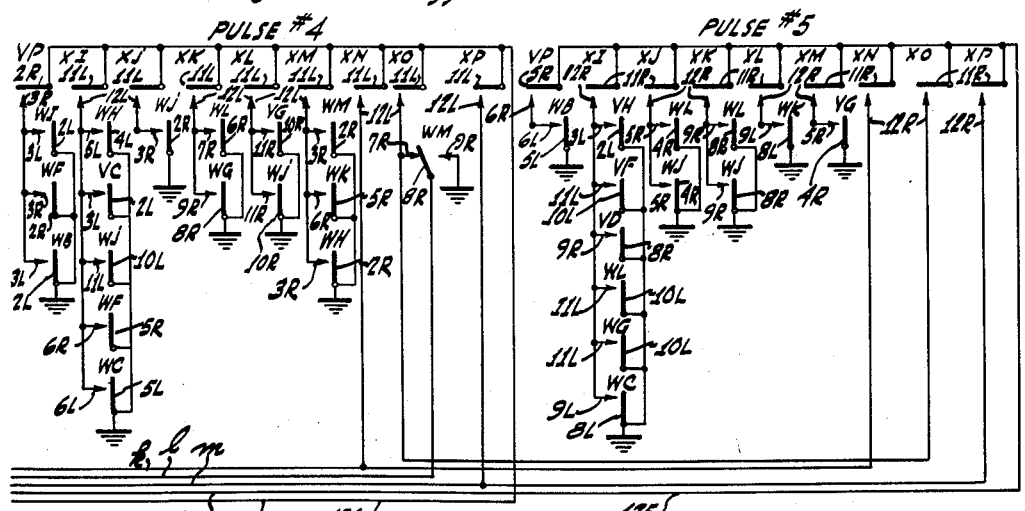
Fig.6f.
INVENTORS
THOMPSON H. MITCHELL
JAMES S. HARRIS &
DAVID ZEKARIA
BY Charles H. Brown
ATTORNEY

INVENTORS
THOMPSON H. MITCHELL
JAMES S. HARRIS &
DAVID ZEKARIA

BY Charles H. Brown
ATTORNEY

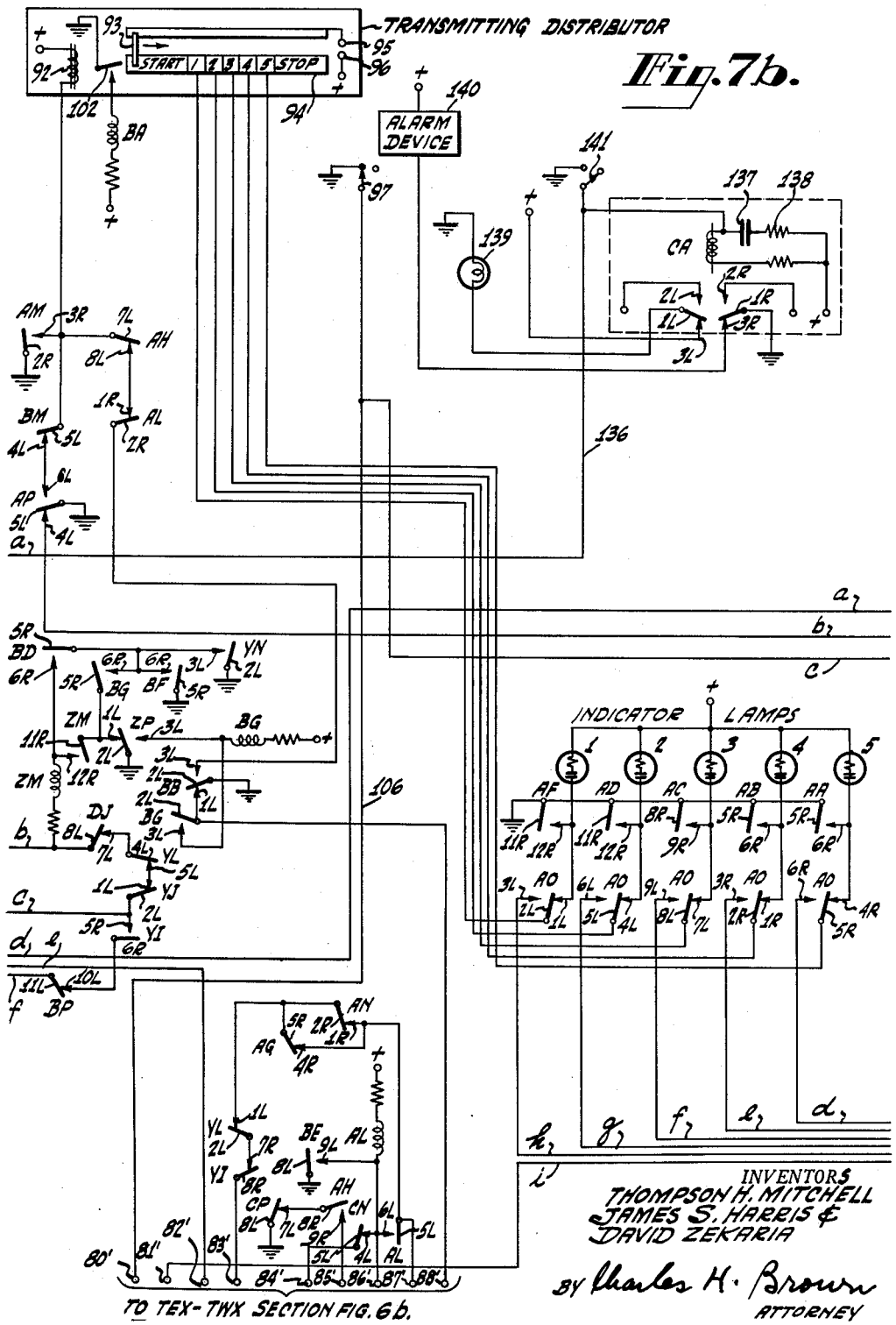

INVENTORS
THOMPSON H. MITCHELL
JAMES S. HARRIS &
DAVID ZEKARIA

BY Charles H. Brown
ATTORNEY

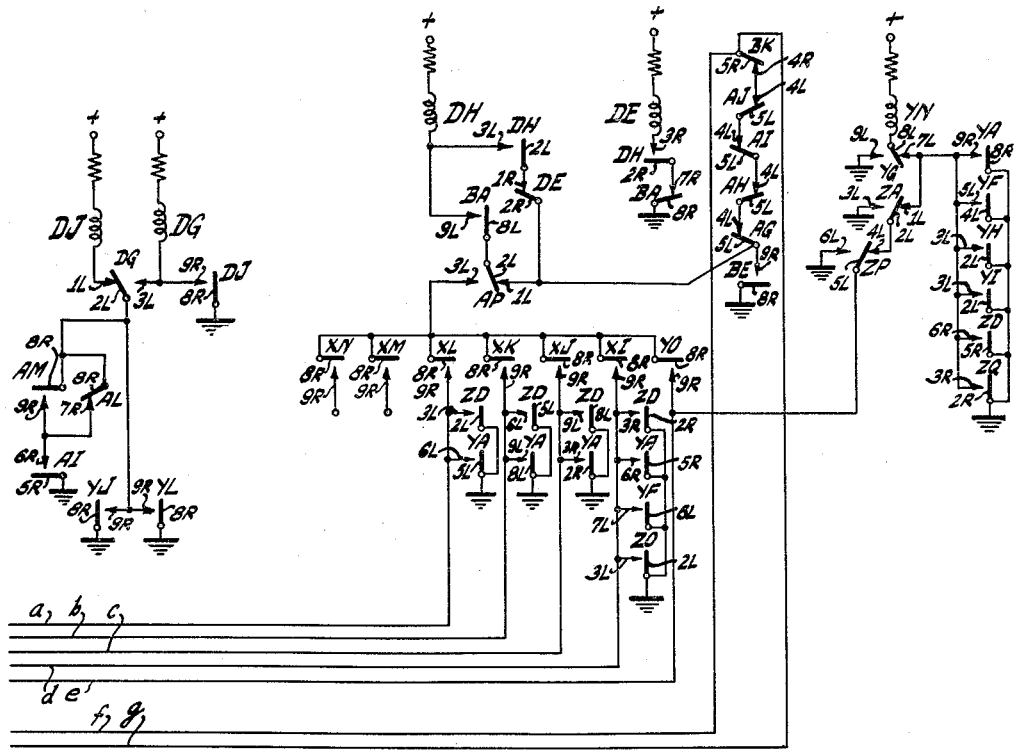
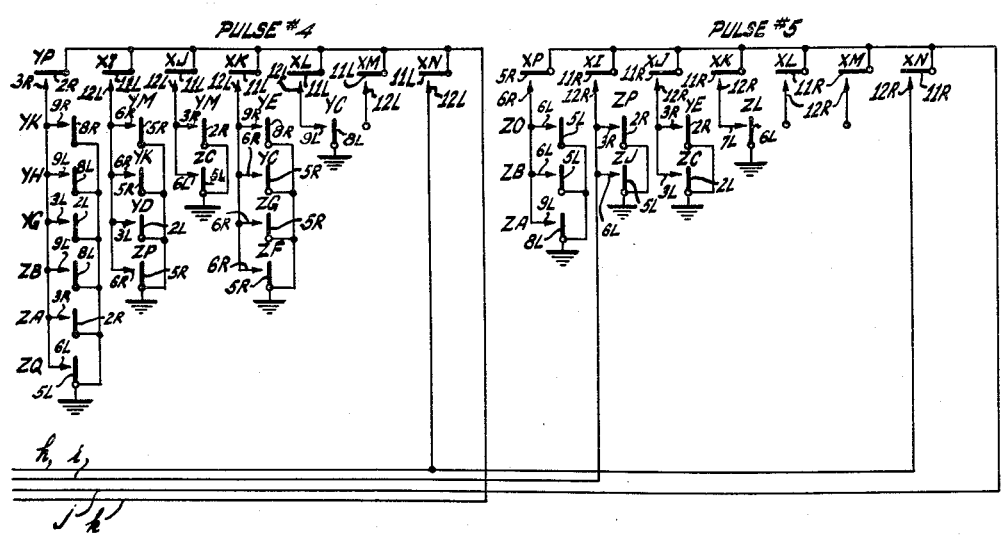
Fig. 7f.
INVENTORS
THOMPSON H. MITCHELL
JAMES S. HARRIS &
DAVID ZEKARIA
BY Charles H. Brown
ATTORNEY Jan. 16, 1962     T. H. MITCHELL ETAL     3,017,461
COMMUNICATION SYSTEM
Filed Aug. 10, 1956     33 Sheets-Sheet 18
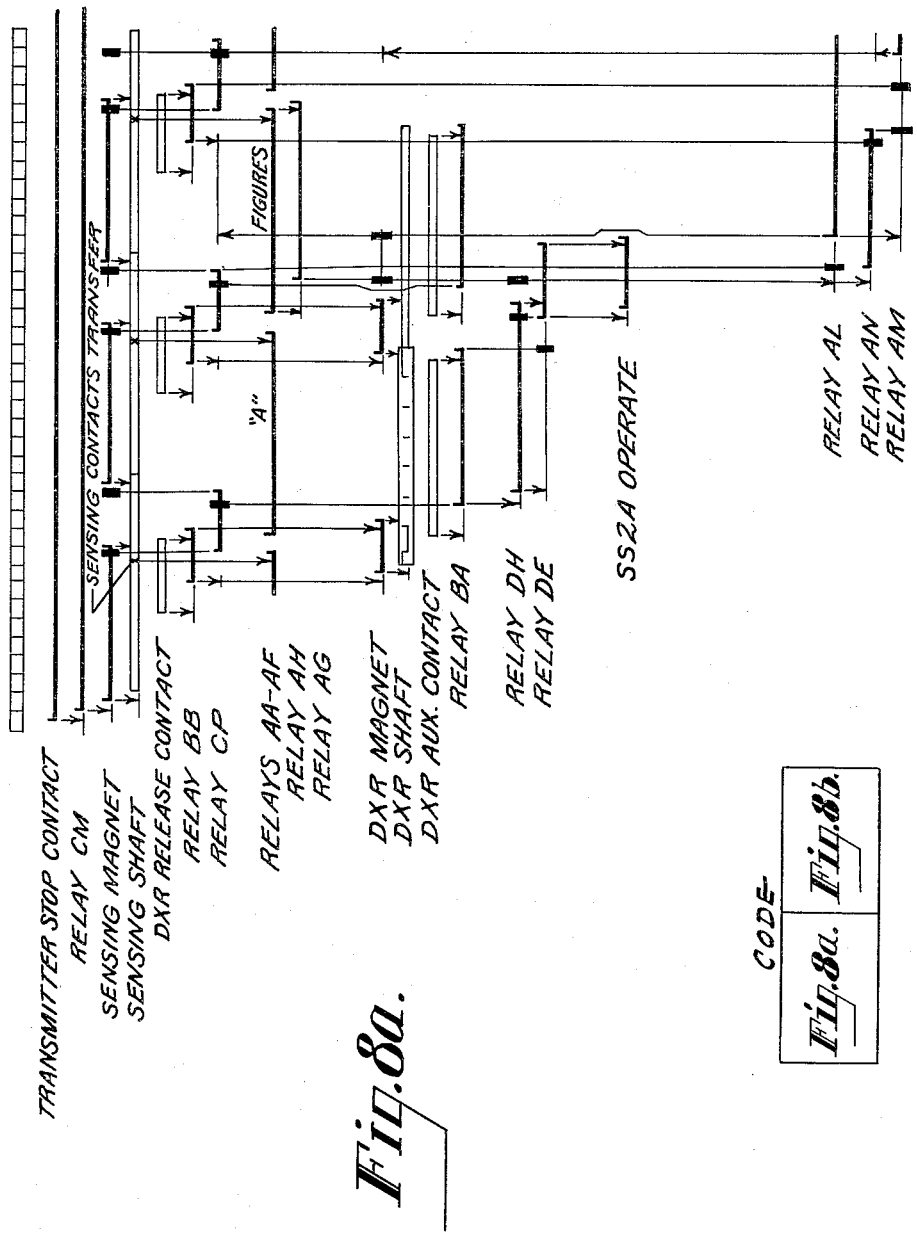
INVENTORS
THOMPSON H. MITCHELL
JAMES S. HARRIS &
DAVID ZEKARIA
BY Charles H. Brown
ATTORNEY Jan. 16, 1962 T. H. MITCHELL ETAL 3,017,461
COMMUNICATION SYSTEM
Filed Aug. 10, 1956 33 Sheets-Sheet 19
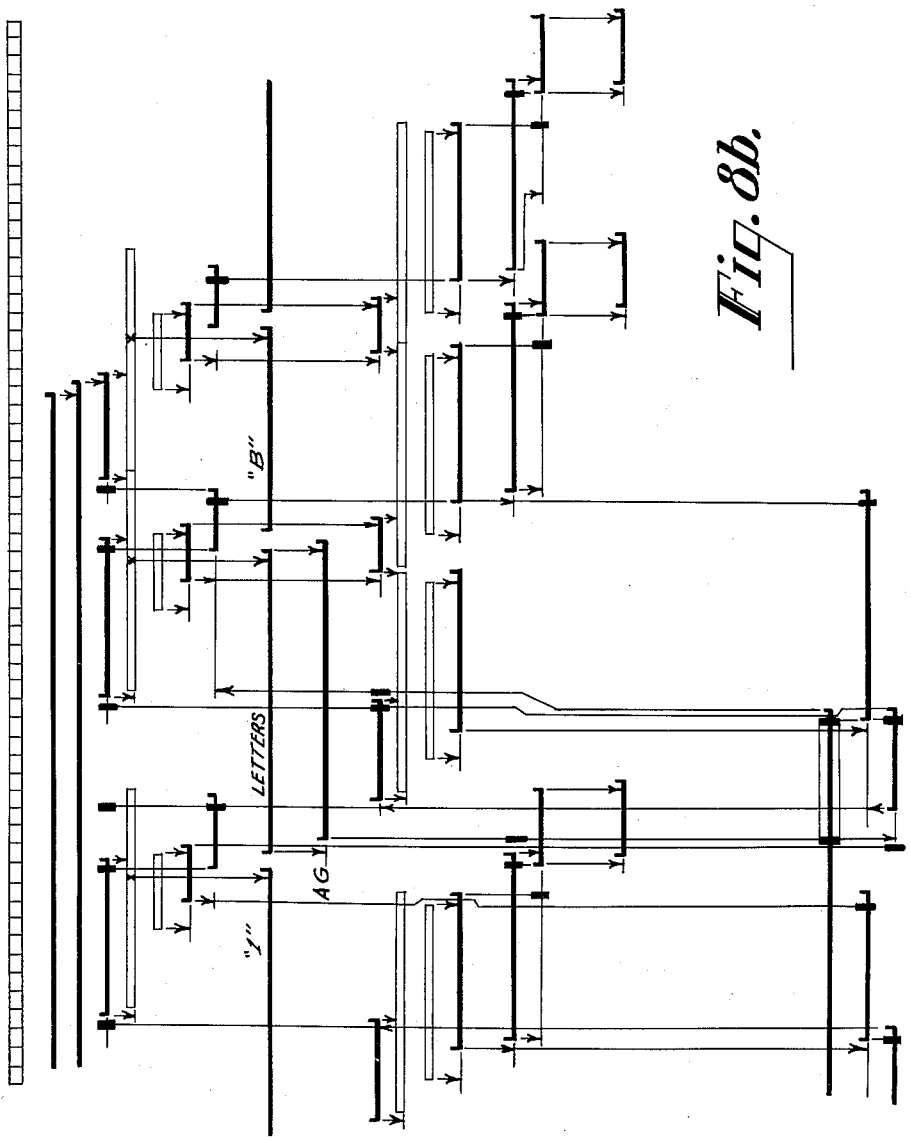
INVENTORS
THOMPSON H. MITCHELL
JAMES S. HARRIS &
DAVID ZEKARIA
BY Charles H. Brown
ATTORNEY.

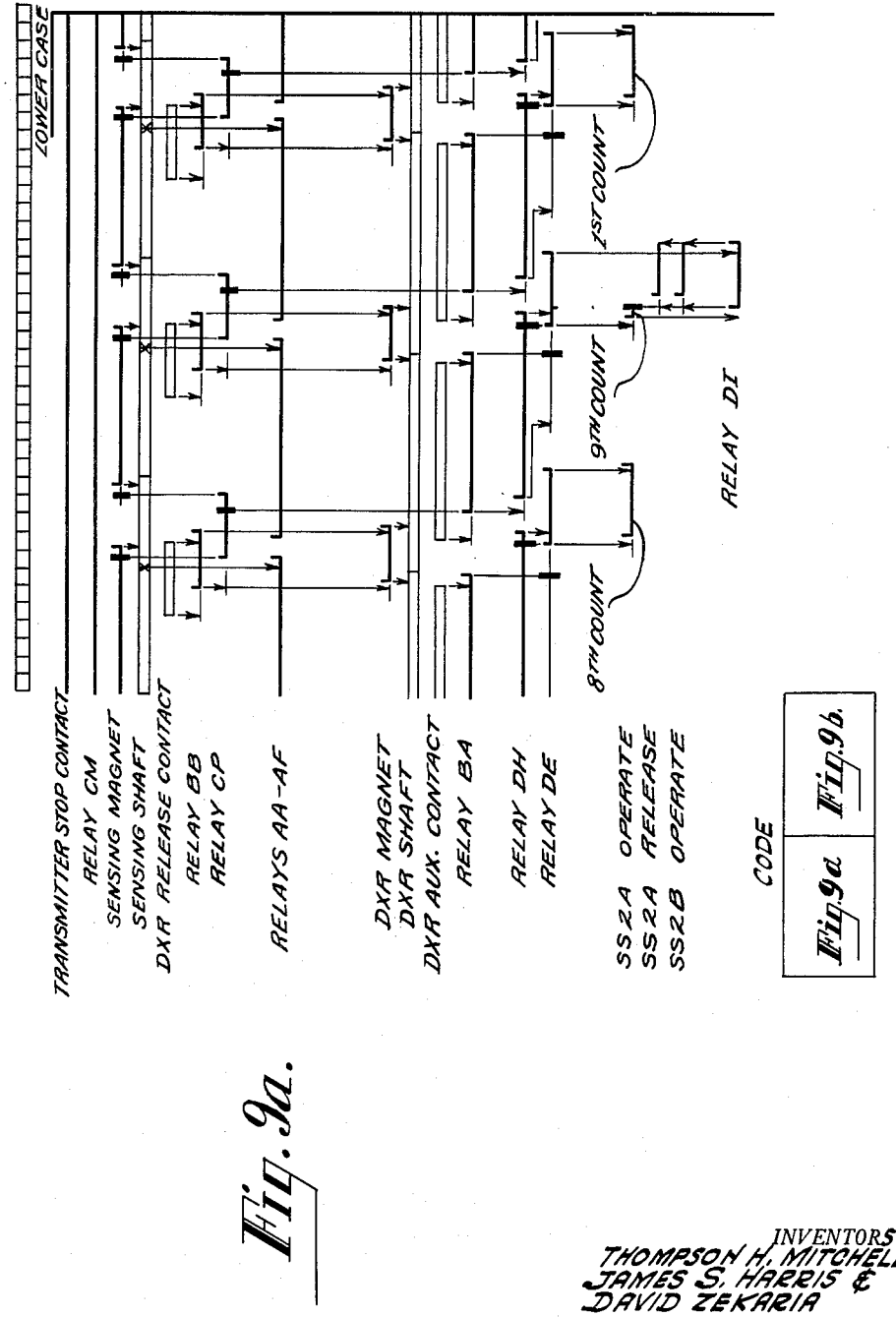

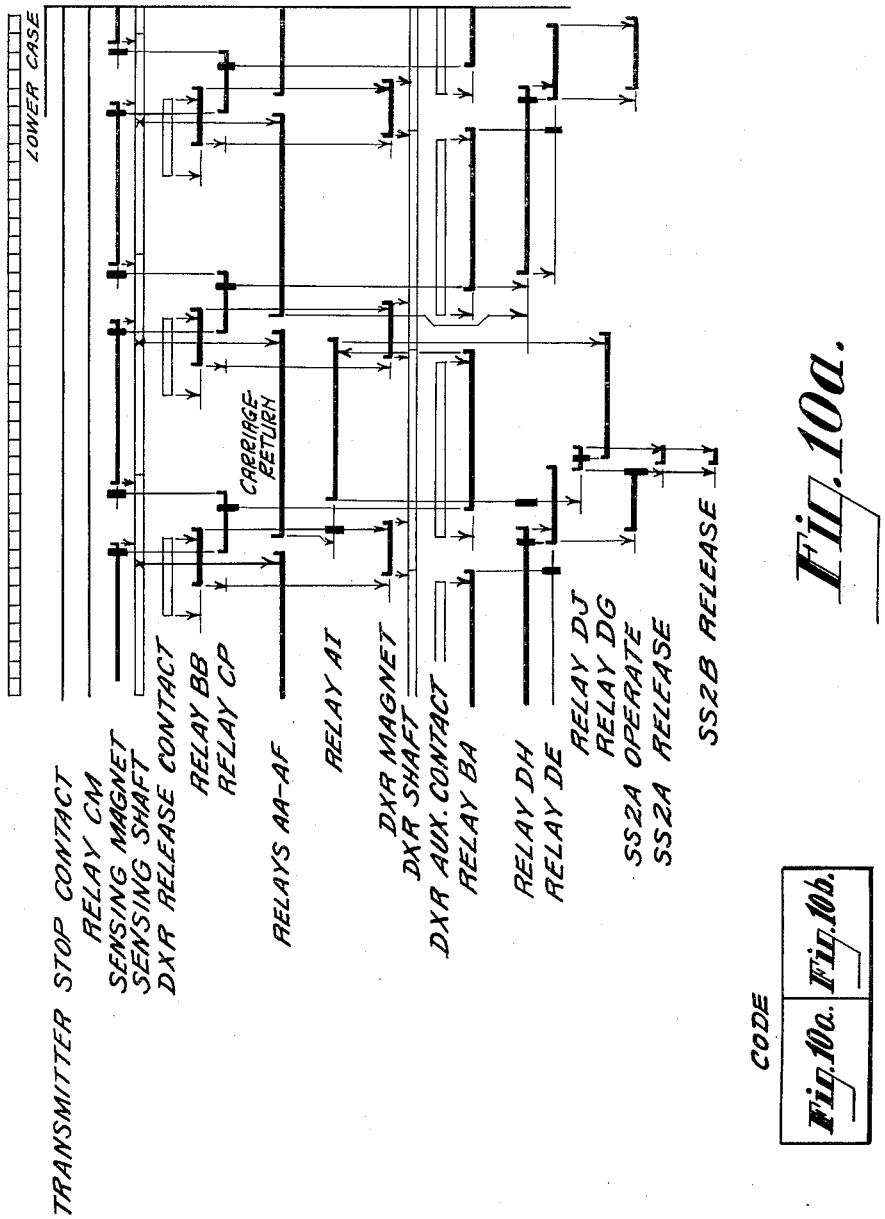

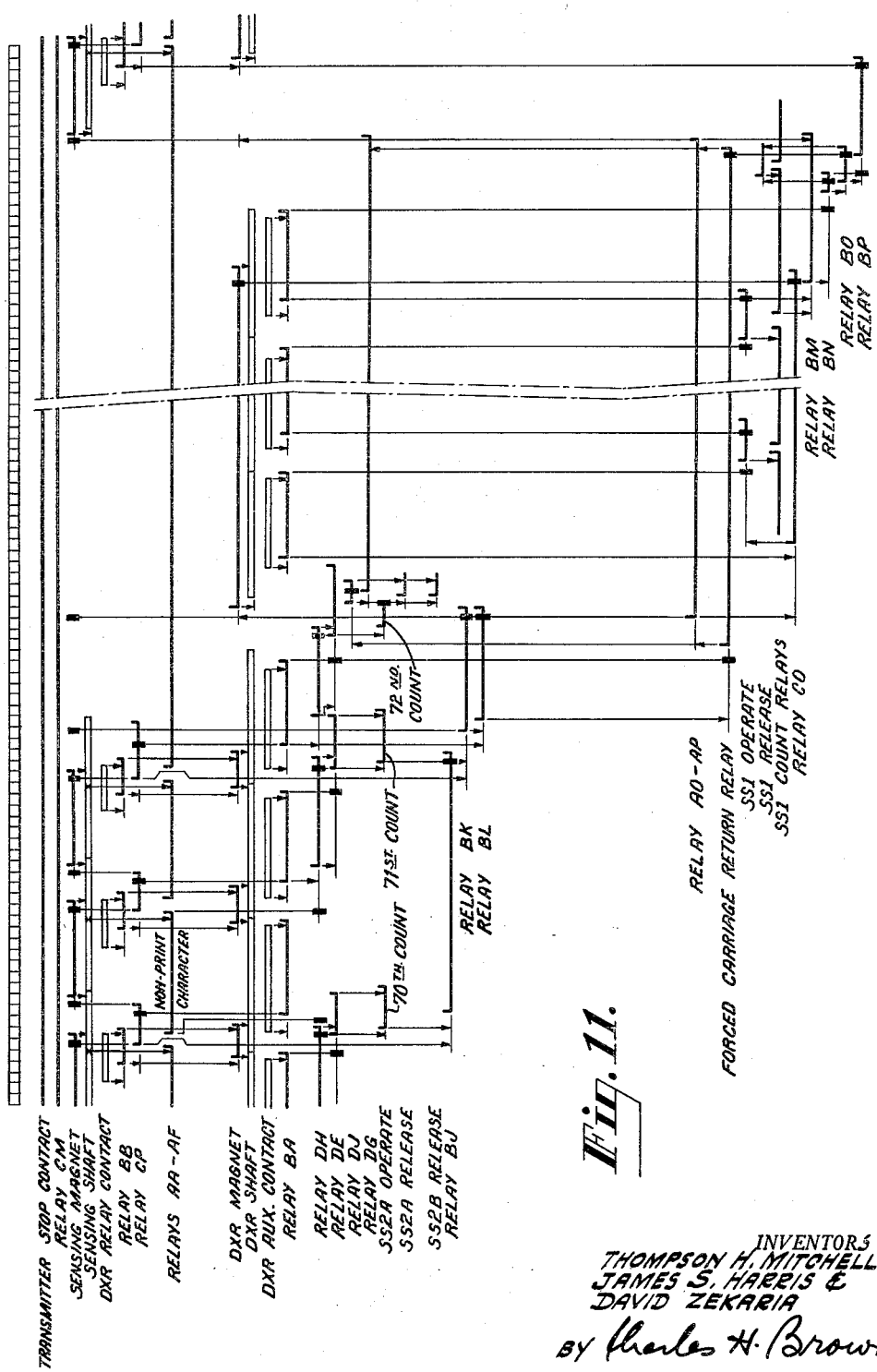

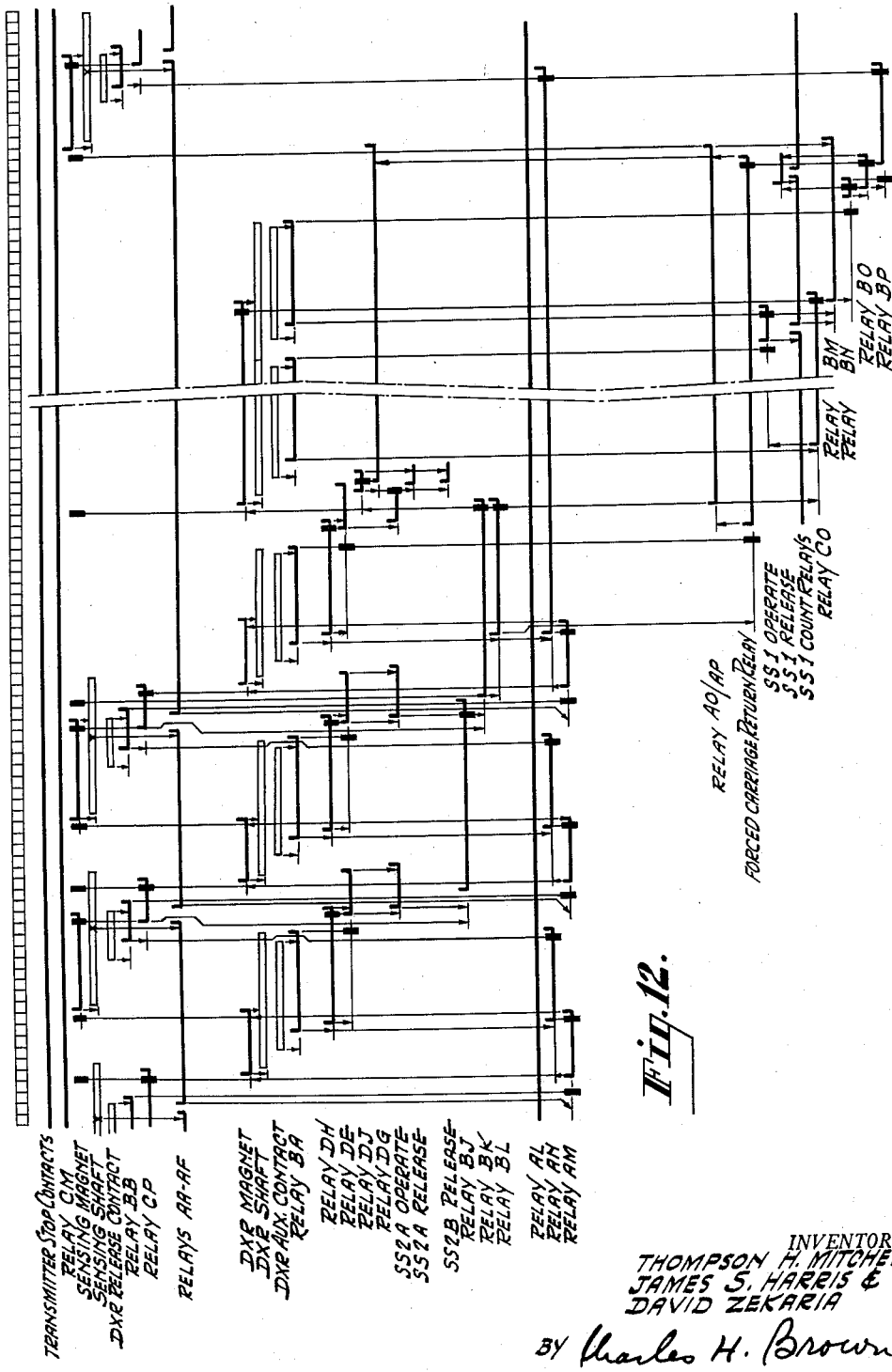

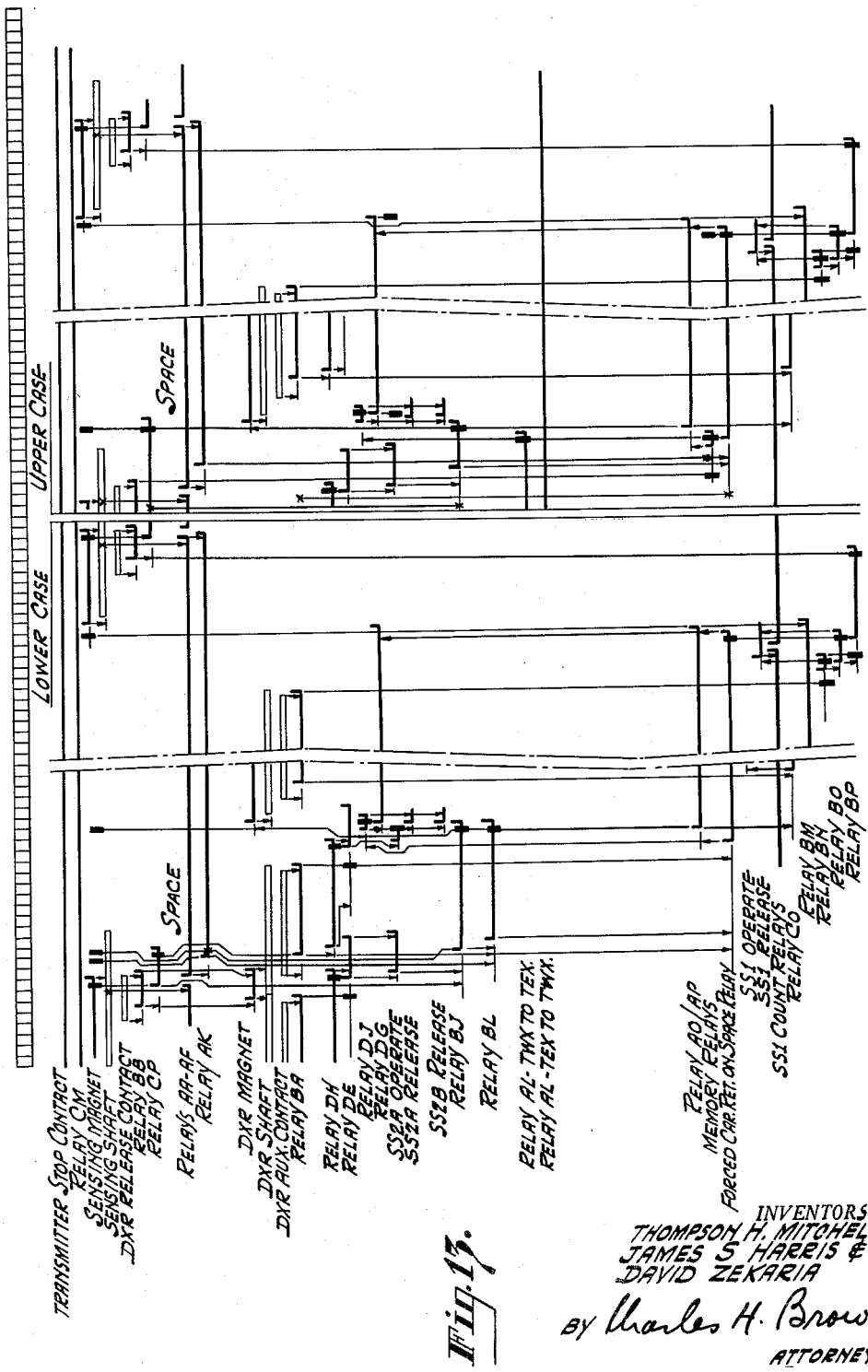

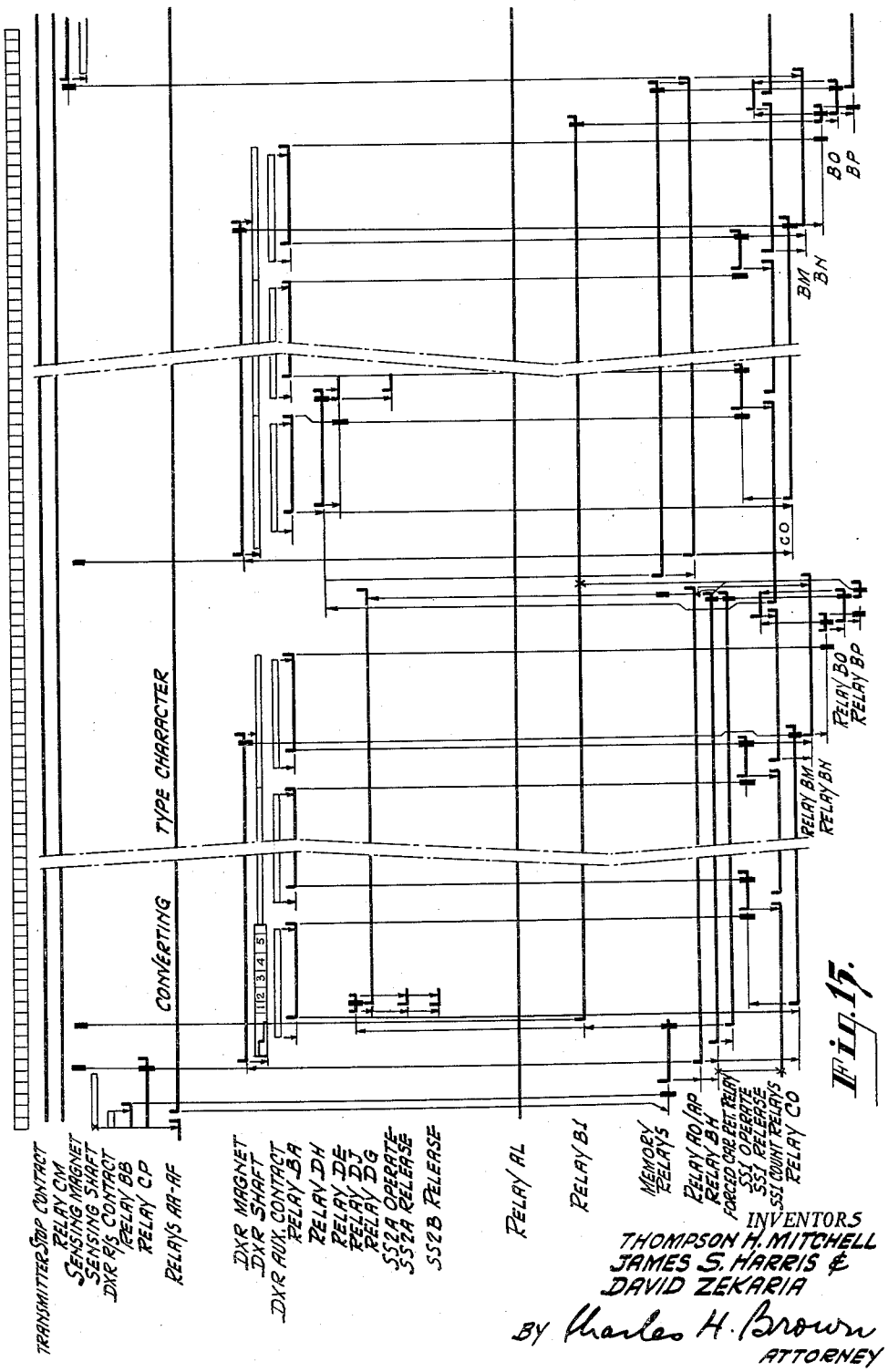

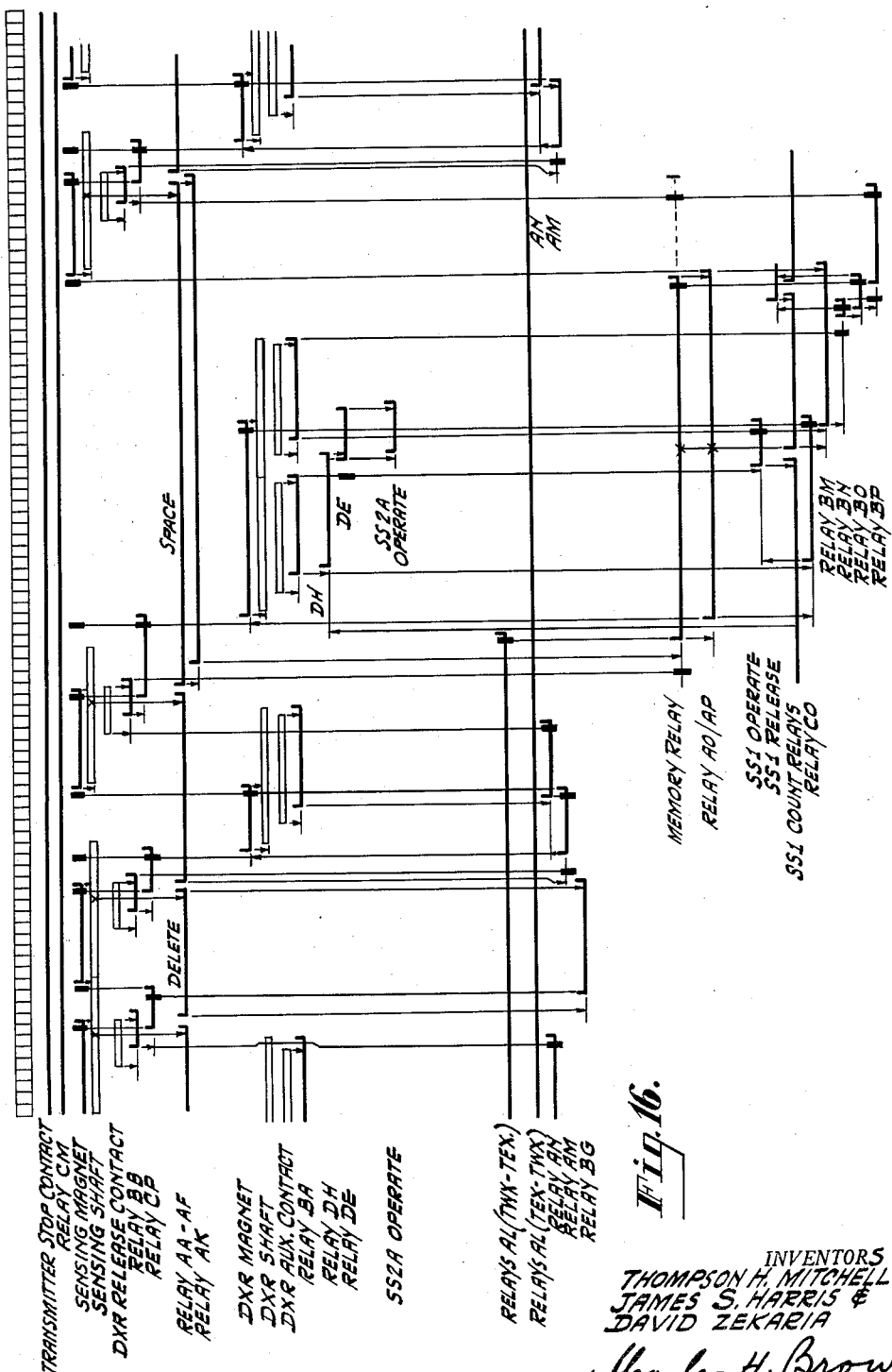

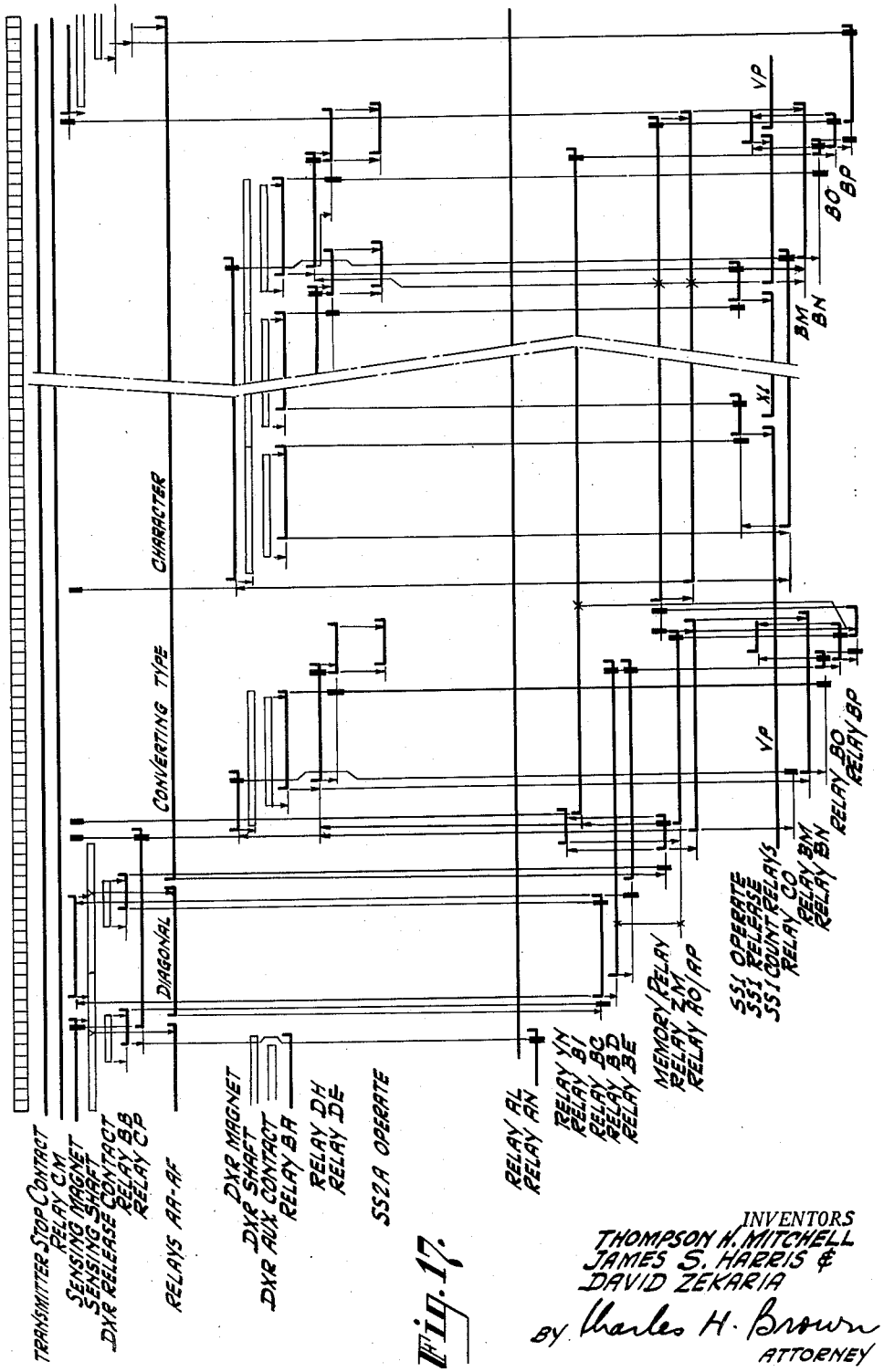

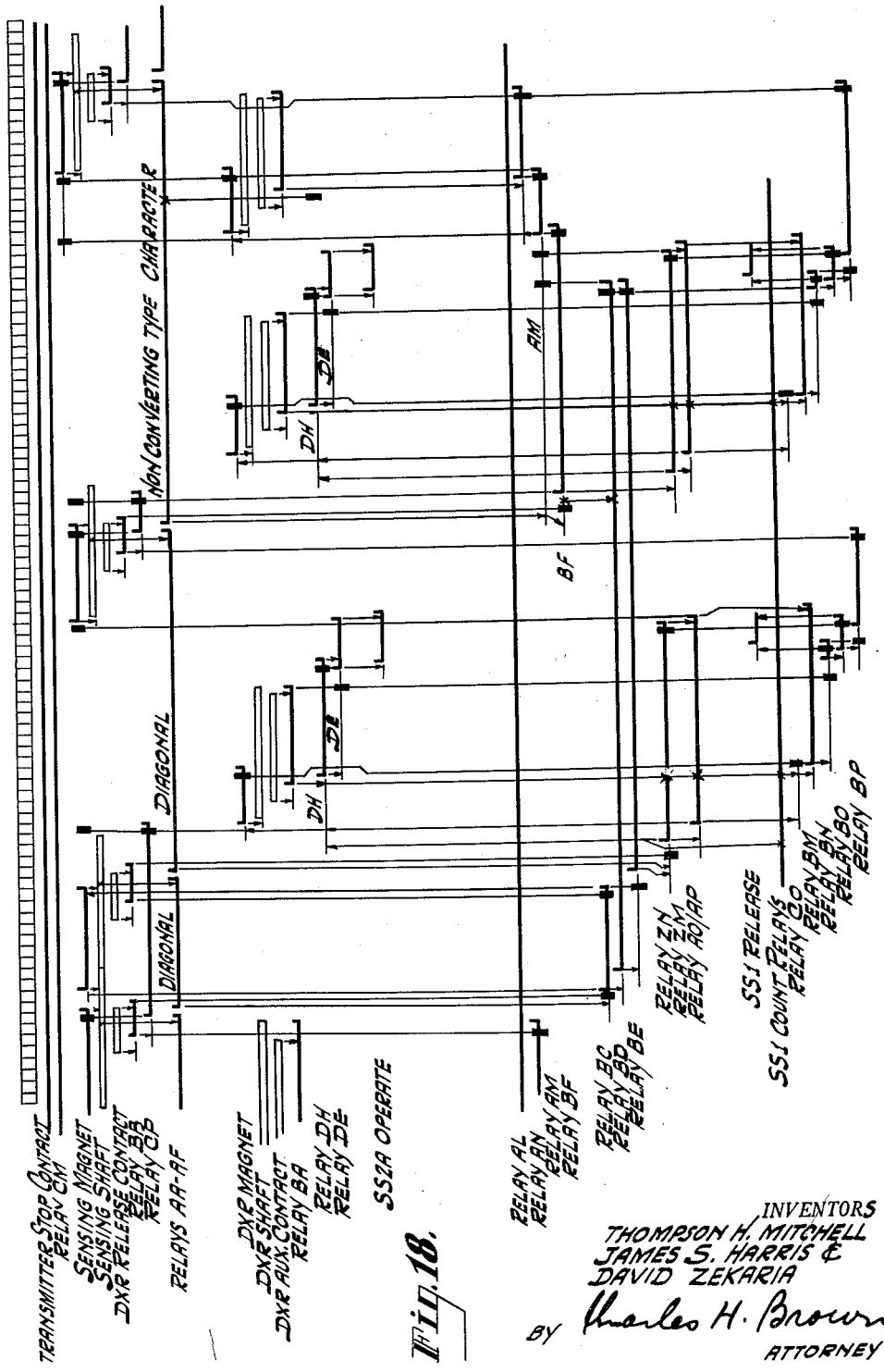

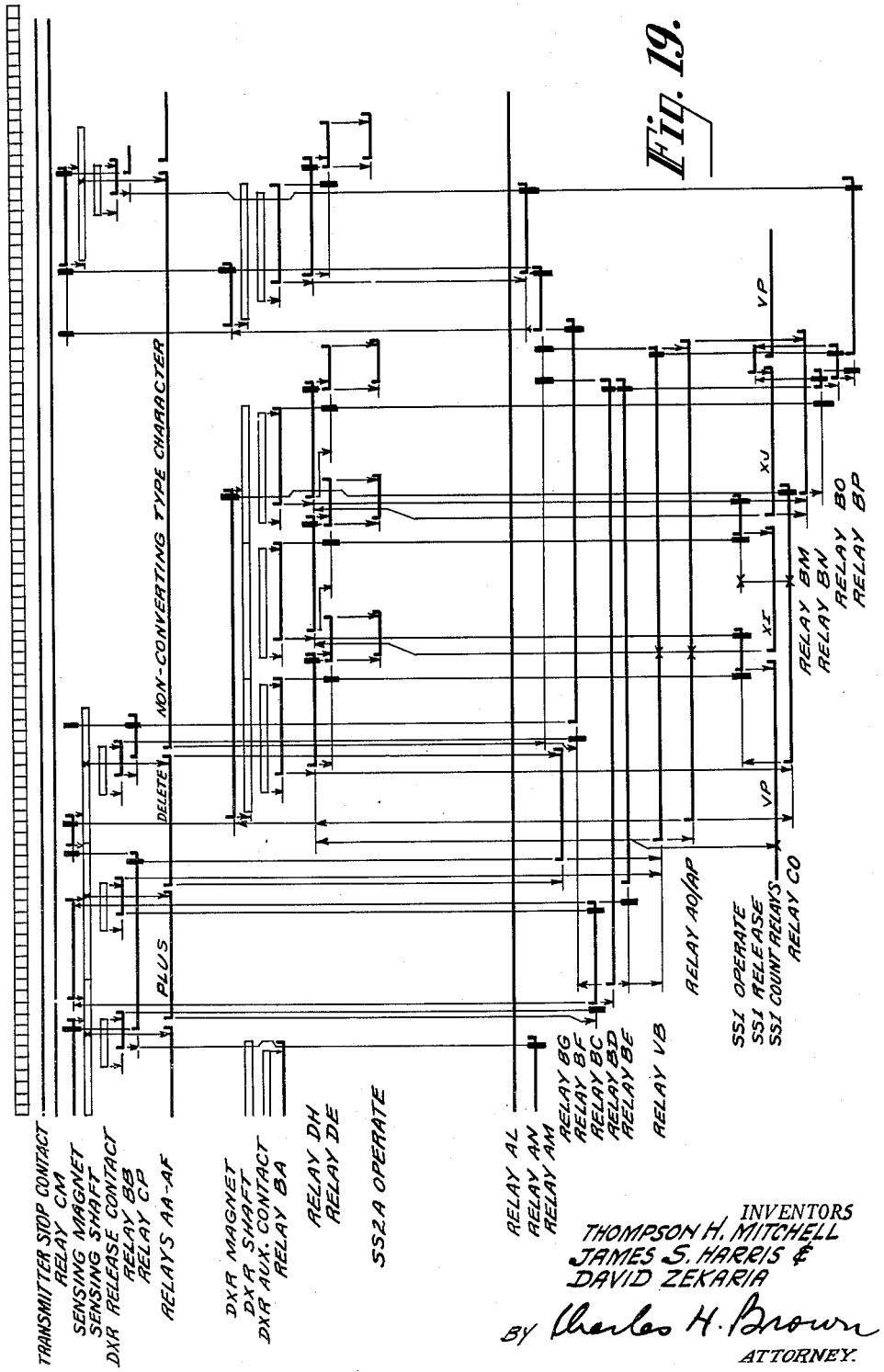

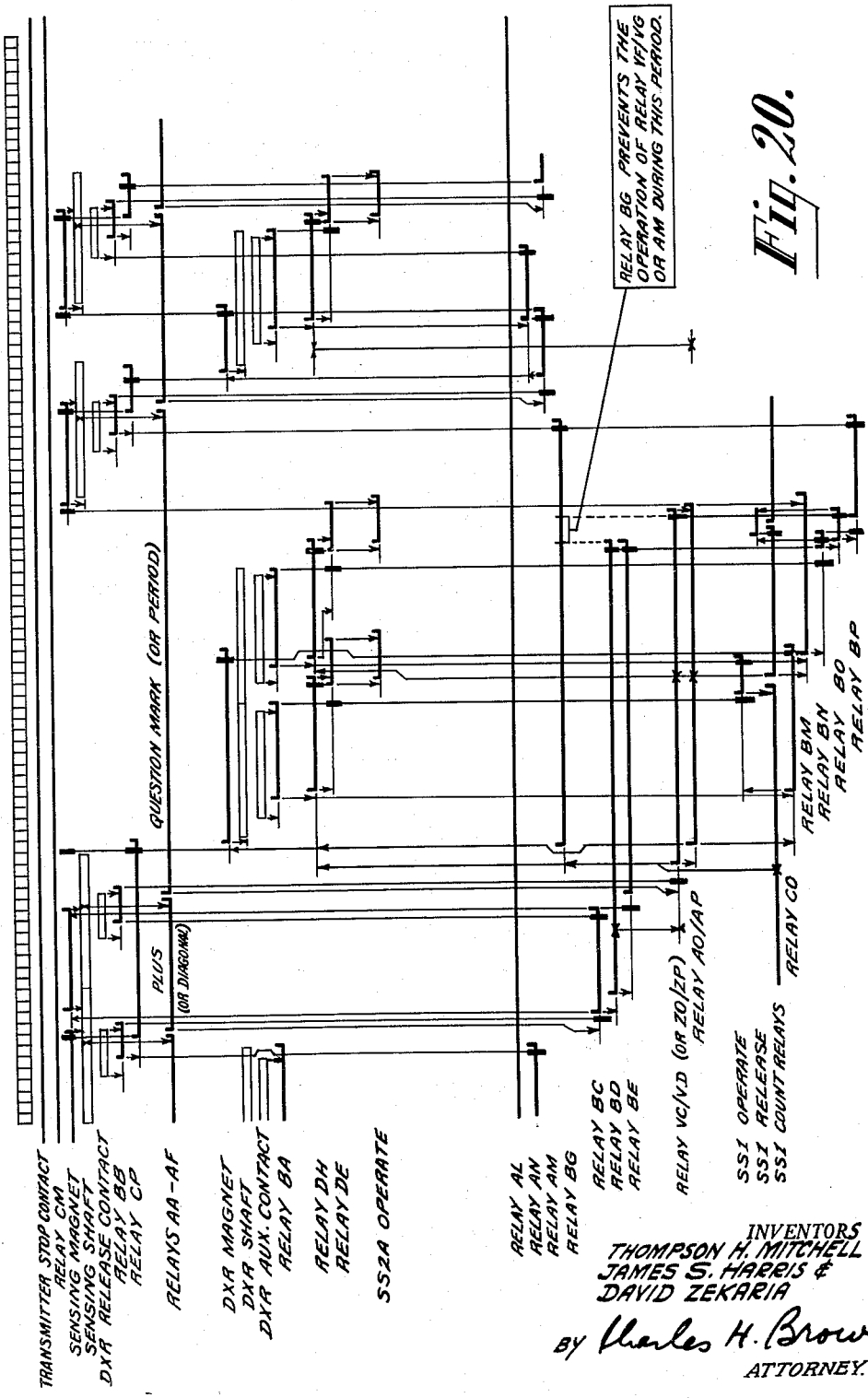

Patented Jan. 16, 1962

3,017,461
COMMUNICATION SYSTEM
Thompson H. Mitchell, Bronxville, N.Y., James S. Harris, Old Greenwich, Conn., and David Zekaria, Jamaica, N.Y., assignors to Radio Corporation of America, a corporation of Delaware
Filed Aug. 10, 1956, Ser. No. 603,381
20 Claims. (Cl. 178—26)

The invention relates to communication systems. It particularly relates to a converter adapted to complete a direct operating circuit between the page printers of two teletypewriter services using different telegraph codes.

Various types of teletypewriter services are known in the art. RCA Communications, Inc., provides, as a service in the United States, an international customer-to-customer teletypewriter exchange service, hereinafter referred to as TEX, which cooperates fully with an equivalent service provided in foreign countries, hereinafter referred to as TELEX. Both the TEX service provided by RCA Communications, Inc., and the TELEX service provided in foreign countries use a telegraph code known in the art as the International No. 2 code alphabet. The American Telephone and Telegraph Company provides, as a service in the United States, a domestic customer-to-customer teletypewriter exchange service, hereinafter referred to as TWX. The TWX service provided by the American Telephone and Telegraph Company uses a telegraph code known in the art as the AT&T Arrangement C code alphabet, hereinafter referred to as the Arrangement C code alphabet.

The International No. 2 code alphabet and the Arrangement C code alphabet are fixed-length telegraph codes, and are both based on a five-unit type of telegraph code. Each of the letter, number, symbol and control function characters used by the TEX and by the TWX services in the respective code alphabets are represented by a predetermined combination of marking and spacing elements. A character may comprise five marking elements, five spacing elements or a combination of five elements including both marking and spacing elements arranged in a predetermined manner. Thirty-two combinations of the marking and spacing elements are available in a five-unit telegraph code, and this number of combinations is used by both the TEX and the TWX services.

The page printers used by the TEX service and by the TWX service include keyboards arranged to be operated in either the upper case, Figures status, or lower case, Letters status. In the lower case, a different letter or control function character is assigned to each of the combinations of marking and spacing elements available. In the upper case, a different number, symbol or control function character is assigned to each of the combinations of marking and spacing elements. The page printers of the TEX and of the TWX services use the same lower case assignments. Most of the upper case assignments used by the two services are also the same. However, certain symbol characters used by both services are not assigned in the respective code alphabets used by the two services to the same combinations of marking and spacing elements. In addition, certain symbol characters, while used by one or the other of the two services, are not used by the TEX and TWX services.

Various other differences exist in the operation of a page printer used in the TEX service as compared to the operation of a page printer used in the TWX service. A page printer used in the TEX service is designed to accommodate sixty-nine characters in a line, while a page printer used in the TWX service is designed to accommodate seventy-two characters in a line. A further difference exists in the manner in which the page printers of the two services are operated to accomplish certain control functions. For example, a page printer used in the TEX service is designed to shift from the upper case to the lower case in response to the control function character Letters. The page printer used in the TWX service, however, is designed to shift from the upper case to the lower case in response to the control function character Space. Because of the differences in operation, any effort to connect a page printer used by one of the services directly to a page printer used by the other service without including some means in the connection for reconciling the differences will result in confusion. Message traffic forwarded between the page printers of the respective services will be garbled and distorted to an extent preventing the proper transmission of a message therebetween.

The present art requires that a central or terminal station located between a customer provided with the TEX service and a customer provided with the TWX service be provided with a page printer used in the TEX service and with a page printer used in the TWX service. The respective page printers at the central station are placed close together so that an operator can manipulate both of them from his position. As a message is received at the central station from one of the customers on the corresponding page printer, the operator retranscribes the message on the keyboard of the other page printer which is connected to the second customer. The operator in this instance becomes the means by which the differences between the two services are reconciled. A communication system formed in this manner, however, has certain definite disadvantages. Operators must be trained in the procedures of both the TWX and TEX services. Since the messages must be retranscribed manually by an operator, the possibility of new errors in the text of the messages is introduced. Variations between operators as to the manner of reconciling the differences between the operation of the page printers used in the two services is also introduced. An operator is required for every connection between the two services, making it prohibitive to expand and operate economically. A large area of operating space is required at the central office, and the operation of the two page printers at the central office in the manner described becomes fatiguing to an operator when the operator is required to handle a large volume of messages.

Among the objects of the invention are: to automatically accomplish the conversion functions necessary to complete a direct operating circuit between the page printers of different operation used in the respective teletypewriter services; to provide an improved converter for use in a circuit completed between the respective page printers for reconciling the differences between the page printers as to the number of characters accommodated in a line by automatically inserting Carriage Return and Line Feed characters in response to a specific character count; to provide an improved converter for use in a circuit completed between the respective page printers for automatically translating only certain incoming characters having a given combination of marking and spacing elements into characters having a different combination of marking and spacing elements on the outgoing circuit; to provide an improved converter for use in a circuit completed between the respective page printers for automatically translating an incoming single character included only in the code used by one of the page printers into a number of characters corresponding to the single character and included in the code used by the other page printer; to provide an improved converter for use in a circuit completed between the respective page printers for automatically inserting Carriage Return and Line Feed characters whenever the space remaining in a line is not sufficient to accommodate the translation of a single incoming character into a number of characters on the outgoing circuit, as determined by a specific character count; to provide an improved converter for use in a circuit completed between the respective page printers for automatically inserting characters representing certain control functions in the outgoing circuit in response to incoming characters representing different control functions and, thereby, rendering the page printers compatible.

The objects of the invention are accomplished by the use of a converter comprising two similar sections. A message signal sent from the page printer used in one of the services to the page printer used in the second service is fed through a first section of the converter which performs the conversion functions necessary to complete a direct operating circuit in the particular direction therebetween. A message signal sent from the page printer used in the second service to the page printer used in the first service is fed through a second section of the converter where the conversion functions necessary to complete a direct operating circuit in the opposite direction therebetween are performed. The respective sections of the converter are of the same general design and operation, and differ in these aspects only to the extent necessary for the respective sections to perform the conversion functions required to complete a direct operating circuit between the page printers in the different directions.

Considering the handling by one section of the converter of a message signal forwarded between the page printers in one direction, the message signal is first fed to a telegraph storage device, for example, a tape perforator. Each character of the signal received includes a combination of elements which are received sequentially in time. As a character is received, the tape perforator operates to record the combination of elements included in the character as holes punched in a tape. For example, the marking elements are recorded as holes, while the spacing elements are recorded as no holes. The arrangement of holes placed in the tape corresponds to the combination of elements included in the character received. The tape is, thereafter, fed through a sensing mechanism which operates to selectively energize a plurality of fan relays located in that section of the converter corresponding to the direction in which the message signal is being forwarded between the page printers of the two services. By the selective energization of the fan relays, the combination of elements in the character received is set up in the contacts of the relays. If the character received is a non-converting type of character, a transmitting distributor is operated according to the combination of elements set up in the contacts of the fan relays to forward the character to the page printer of the service to which the message is directed over a suitable electrical path. A non-converting character is defined as a character which is assigned to the same combination of marking and spacing elements in the code used by one of the services as in the code used by the other service. When a character is received which is a converting type character, the combination of elements included in the character is set up in the contacts of fan relays and causes the selective operation of a group of memory relays. A converting type character is defined as a character which is not assigned to the same combination of marking and spacing elements in the code used by one of the services as in the code used by the other service. The operation of the memory relays prevents the transmitting distributor from forwarding the combination of elements set up in the contacts of the fan relays. The transmitting distributor is operated instead to forward the combination of elements provided by the operation of the memory relays. In certain instances, the memory relays will operate to present a number of characters to the transmitting distributor. In other words, a single character received from the page printer of one of the services is translated into a number of characters which are forwarded to the page printer of the other service in place of the single character originally received by the converter.

The incoming message signal not only includes the regular message characters, but also includes certain control function characters, for example, Letters, Figures, Carriage Return, Line Feed and so on. While the control function characters are necessary to bring about the proper operation of the page printers used by the respective services, they are not characters which are printed in the text of a message by the operation of the page printers. The section of the converter forwards the control function characters in the same manner as it does the regular message characters and, in addition, operates in response to certain control function characters in predetermined instances to insert particular ones of the control function characters in the outgoing message signal to render the page printers used by the respective services compatible. As each message signal is forwarded to a page printer by the operation of the section of the converter used, a switching mechanism is operated to count each regular message character included in the signal. The control function characters are not printed by the page printers, and, therefore, are not included in the count. Because the page printers used by the respective services do not accommodate the same number of characters in a line, it is necessary for the section of the converter used to insert Carriage Return and Line Feed characters following a predetermined count by the switching mechanism. This action serves to adjust the number of characters in a line, as received by the section of the converter, to the proper number in the outgoing message signal for accommodation by the page printer to which the message is forwarded. A feature of the converter of the invention is the use of a circuit arrangement for automatically determining whether or not the remaining space in a line is sufficient to accommodate the number of characters resulting from a translation of a single converting type character into a number of characters by the operation of the memory relays. For example, the symbol character Dollar Sign ($), comprising five elements in one code, must be replaced by the characters DLRS, each comprising five elements, in the other code. If the remaining space in a line is not sufficient to accommodate the translation, Carriage Return and Line Feed characters are automatically inserted in the outgoing signal, causing the characters resulting from the translation to be printed on a succeeding line by the page printer to which the signal is forwarded.

The second section of the converter includes fan relays, memory relays, and a switching mechanism similar in design and operation to the corresponding relays and switching mechanism included in the other section of the converter. As described, a message signal forwarded in one direction between the page printers of the respective services over a path including the converter of the invention is handled by the first section of the converter. A message signal forwarded in the opposite direction is handled by the second section of the converter. Both sections of the converter operate to perform the conversion functions necessary to render the page printers connected therethrough compatible. An additional feature of the invention is the use of interconnections between the different sections of the converter to synchronize the operation of the respective sections and, more particularly, to provide a means for maintaining both sections of the converter in the same case status at all times.

Although the converter of the invention, as described herein, is designed to meet with the requirements resulting from the differences existing between the codes used by two specific teletypewriter services, the converter may conveniently be altered to meet other requirements resulting from differences existing between the codes used by a different set of two teletypewriter services without departing from the spirit of the invention.

A more complete understanding of the invention may be attained by the following description of a specific embodiment of the invention, taken in conjunction with the accompanying drawing, in which:

FIG. 2 is a chart showing the character assignments in the different code alphabets used by the page printers of the respective teletypewriter services;

FIGS. 3 and 4 are charts showing the conversion functions necessary to adjust the differences between the two different code alphabets in such a manner that the page printers of the respective teletypewriter services are rendered compatible;

FIG. 5 is a functional block diagram of one section of the two similar sections of the converter according to the invention;

FIG. 6, which is FIGS. 6a through 6f taken together, is a circuit diagram of one embodiment of the section of the converter constructed according to the invention and adapted to perform the TEX to TWX conversion functions;

FIG. 7, which is FIGS. 7a through 7f taken together, is a circuit diagram of one embodiment of the second section of the converter constructed according to the invention and adapted to perform the TWX to TEX conversion functions;

FIGS. 8a, 8b, 9a, 9b, 10a, 10b and 11 through 20 are timing diagrams which will be used in connection with the circuit diagrams shown in FIGS. 6 and 7 to explain the operation of the respective sections of the converter.

Figure 1:
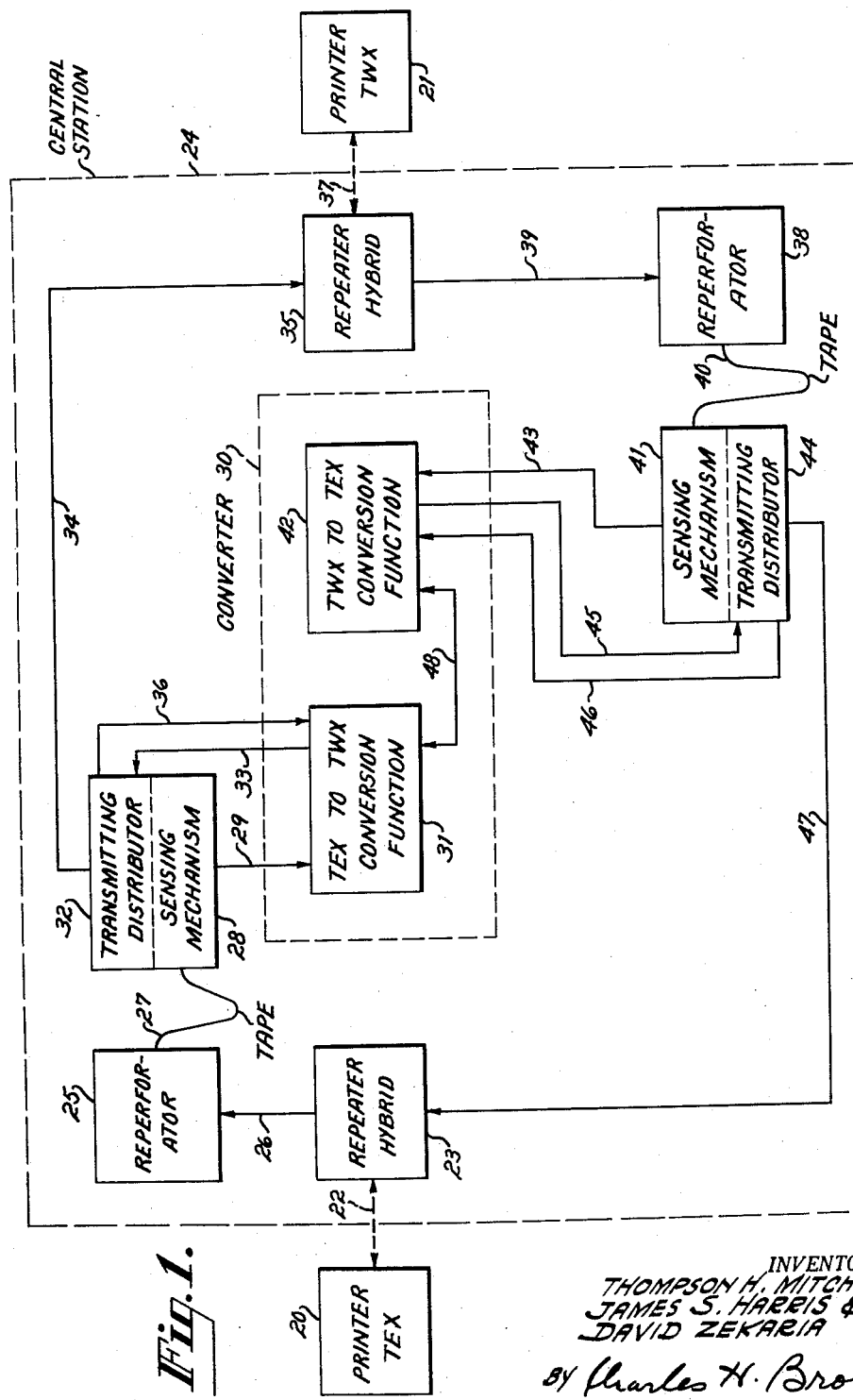
FIG. 1 is a functional block diagram used to explain the orientation of the converter of the invention in a communication system.

Referring to FIG. 1, there is shown a functional block diagram of a communication system including a converter according to the invention. The communication system operates to forward message signals in either direction between a printer 20 of the TEX service and a printer 21 of the TWX service. The printers 20, 21 are page printers of a type commonly used in teletypewriter services and each include a keyboard which is arranged for manual or automatic operation. The printer 20 is operated to forward a message signal using a telegraph code known in the art as the International No. 2 code alphabet, while the printer 21 is operated to forward a message signal using a telegraph code known in the art as the Arrangement C code alphabet. As will be brought out in greater detail, the codes used by the respective printers 20, 21 differ in certain respects so that a converting means must be included in a transmission path completed therebetween in order to render the printers 20, 21 compatible.

The communication system is arranged to forward message signals in only one direction at a time between the printers 20, 21. When a message signal is produced by the operation of printer 20 of the TEX service for transmission to the printer 21 of the TWX service, the five-unit start-stop signal is first forwarded over a transmission path 22 to a repeater hybrid 23 located at a terminal or central station 24. The central station 24 is preferably arranged to provide service to a number of printers in both the TEX and TWX services, in addition to the printers 20, 21 shown in FIG. 1. The transmission path 22 may include a land-line transmission system or a radio frequency transmission system and, in itself, forms no part of the invention. The hybrid 23 is conventional in design and operation, and operates to forward the received signal to a reperforator 25 over a lead 26. The elements of the characters included in the incoming signal, namely, the marking and spacing elements, are received by the reperforator 25 sequentially in time. The reperforator 25 operates to group the elements included in each character, and to reproduce in succession each character as a row of perforations across the width of a tape 27, according to the combination of marking and spacing elements included therein. The tape 27 is fed to a sensing mechanism 28 which translates the perforations on the tape 27 into electrical impulses and forwards the electrical impulses over leads represented by lead 29 to the converter 30. More particularly, the electrical impulses corresponding to the combination of marking and spacing elements in a character are simultaneously fed from the sensing mechanism 28 to a section 31 of the converter 30. In this manner, the characters included in the incoming signal are fed to the section 31 from sensing mechanism 28 on a character-by-character basis. Section 31 of the converter 30 performs the necessary TEX to TWX conversion functions and forwards the converted signal to a transmitting distributor 32 by means of leads represented by lead 33. The transmitting distributor 32 operates to forward the signal to a repeater hybrid 35 over lead 34. As the transmitting distributor 32 forwards each character of the converted signal to the hybrid 35, a pulse is fed from the transmitting distributor 32 back to the section 31 of the converter 30 over lead 36. A switching mechanism included in the section 31 is operated in response to the pulses to count the characters included in the outgoing signal of the type printed by the operation of the printer 21 of the TWX service. The switching mechanism operates to determine the number of characters in a line and to bring about control functions including the automatic insertion of Carriage Return and Line Feed characters necessary to render the printers 20, 21 compatible, as will be described in greater detail. The hybrid 35 operates to forward the outgoing signal from the central station 24 to the printer 21 of the TWX service over a transmission path 37. As in the case of transmission path 22, the transmission path 37 may include either a land-line transmission system or a radio-frequency transmission system.

When a message signal is produced by the operation of the printer 21 of the TWX service for transmission to printer 20 of the TEX service, the five-unit start-stop signal is forwarded over the transmission path 37 to the hybrid 35 at the central station 24. The signal is fed from the hybrid 35 to a reperforator 38 over lead 39. The reperforator 38 operates in the same manner as reperforator 25 and reproduces each character of the incoming signal as perforations in a tape 40. The tape 40 is fed to a sensing mechanism 41 which operates, in turn, to translate the perforations on the tape 40 into electrical impulses. The electrical impulses corresponding to a character are simultaneously fed from the sensing mechanism 41 to a section 42 of the converter 30 by means of leads represented by lead 43. The section 42 performs the necessary TWX to TEX conversion functions and forwards the converted signal to transmitting distributor 44 by means of leads represented by lead 45. The outgoing signal is fed from the transmitting distributor 44 to the hybrid 23 over lead 47. The hybrid 23 operates to forward the outgoing signal to printer 20 of the TEX service over the transmission path 22. As each character in the outgoing signal is fed from the transmitting distributor 44 to the hybrid 23, a pulse is fed from the transmitting distributor 44 back to the section 42 of the converter 30 over lead 46. A switching mechanism which is similar in operation to the switching mechanism located in section 31 of the converter 30 is included in the section 42 and is operated in response to the pulses to determine the number of characters in a line and to bring about control functions necessary to render the printers 20, 21 compatible.

The transmission paths 22 and 37 are to be understood as including the usual routing, switching and terminal control equipment. For example, the transmission path 37 may include a conventional switchboard arrangement through which the TWX printer 21 can be selectively connected to a second TWX printer or to a utilization circuit other than the central station equipment 24. The transmission path 22 may include similar equipment. By way of example, the transmission paths 22 and 37 may include a switching system as shown in United States Patent No. 2,808,452, issued October 1, 1957, for Telegraph Switching System. The reference discloses a system for permitting the selective completion of an electrical path between a subscriber station and any one of a number of utilization circuits or other subscriber stations.

An operating circuit is, therefore, completed in both directions between the printer 20 of the TEX service and the printer 21 of the TWX service through the respective sections 31, 42 of the converter 30. The functions of the reperforator 25, sensing mechanism 28 and the transmitting distributor 32 included in the TEX to TWX circuit are, preferably, performed by a single unit and, for example, a unit known in the art as a standard Model 14 Teletype Typing Reperforator Transmitter Distributor may be used. The functions of the reperforator 38, sensing mechanism 41 and the transmitting distributor 44 included in the TWX to TEX circuit are also, preferably, performed by a single unit. As the operation of the reperforator 38, sensing mechanism 41 and the transmitting distributor 44 is similar to that of the reperforator 25, sensing mechanism 28 and the transmitting distributor 32, respectively, the same type of single unit may be used in the TEX to TWX circuit and in the TWX to TEX circuit for performing the functions of these circuits. An important feature of the invention is the use of interconnections between the sections 31, 42 of the converter 30 represented by lead 48. By means of the interconnections, the case status in which a signal is being read by one of the sections 31 or 42 is indicated to the other section of the converter 30. As a result, both sections 31, 42 of the converter 30 are kept in the same case status at all times.

Figure 2:
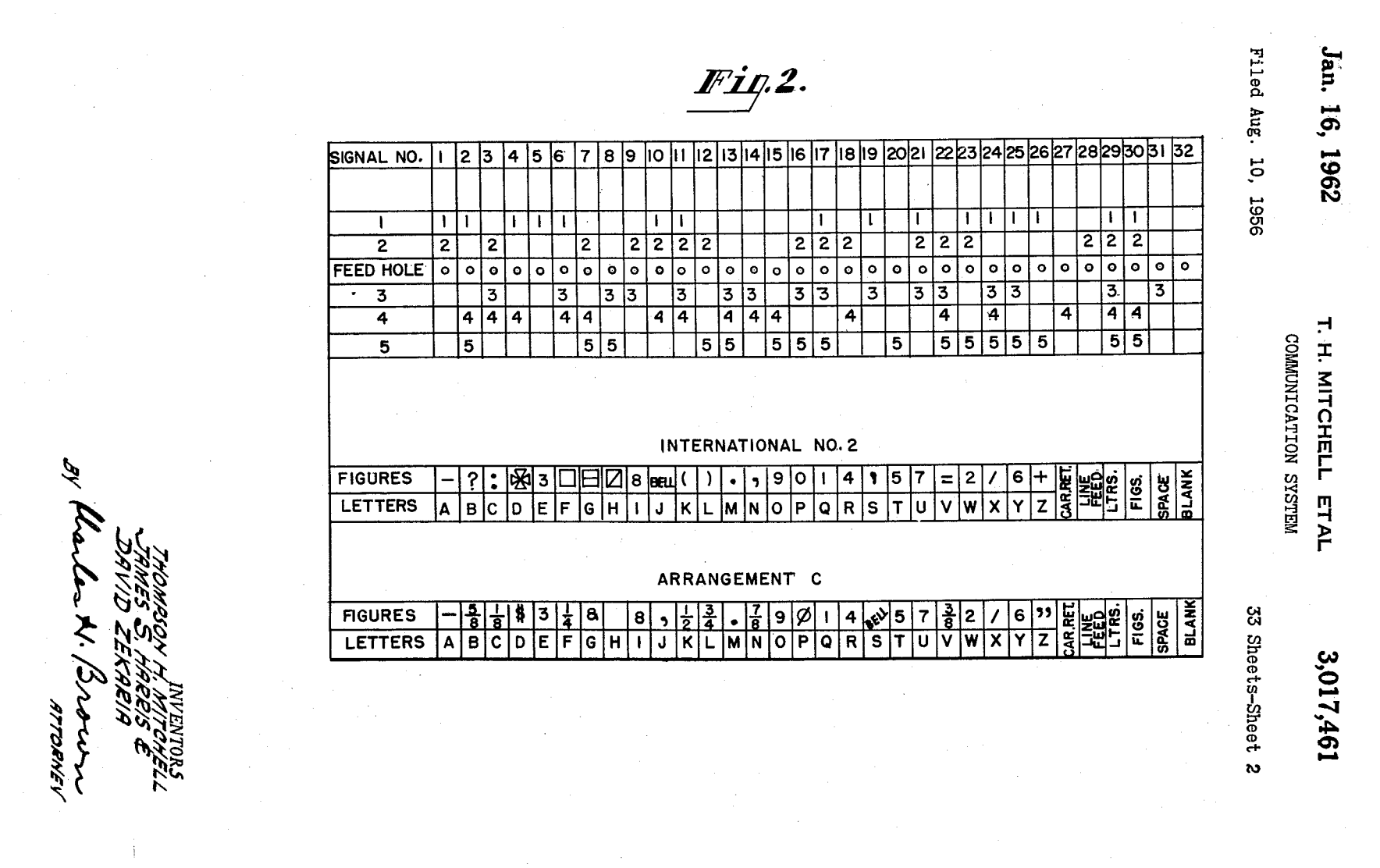

Both the International No. 2 code alphabet used by the printer 20 of the TEX service and the Arrangement C code alphabet used by the printer 21 of the TWX service are based on a five-unit telegraph code. Each character of the respective codes includes a predetermined arrangement of marking and spacing elements. A character may include five marking elements, five spacing elements or a combination of five elements including both marking and spacing elements arranged in a predetermined manner. Referring to FIG. 2, there is shown a chart indicating the character assignments in the International No. 2 code alphabet and in the Arrangement C code alphabet. There are thirty-two possible combinations of marking and spacing elements available in the five-unit telegraph code. These combinations are shown across the top of the chart. The marking elements are indicated as numbered squares, while the spacing elements are indicated as unnumbered squares. An examination of the chart will show that the same character assignments are used in the lower case or Letters status in both of the code alphabets. For example, the character "A" is assigned in the Letters status in both codes to the combination of marking and spacing elements in which the first and second elements are marking and the third, fourth and fifth elements are spacing, the character "B" is assigned in the Letters status in both codes to the combination of marking and spacing elements in which the first, fourth and fifth elements are marking and the second and third elements are spacing, and so on. A further examination of the chart in FIG. 2 will show, however, that certain differences exist between the codes in the upper case or Figures status. Certain symbol characters such as Question Mark (upper case character "B"), Apostrophe (upper case character "S") and Equal Sign (upper case character "V") are provided in the International No. 2 code alphabet, but are not provided at all in the Arrangement C code alphabet. On the other hand, certain symbol characters such as Dollar Sign (upper case character "D"), And (upper case character "G") and Quotation Marks (upper case character "Z") are provided in the Arrangement C code alphabet, but are not provided at all in the International No. 2 code alphabet. Other symbol characters are provided in both of the codes, but are assigned to different combinations of marking and spacing elements in the respective codes. For example, a Comma is an upper case character "N" in the International No. 2 code alphabet, but is the upper case character "J" in the Arrangement C code alphabet.

Because of these differences in the two codes, certain conversion functions must be performed by the converter of the invention to render the printers 20 and 21, shown in FIG. 1, compatible. FIG. 3 is a chart showing the conversion functions necessary to alter a signal produced by the operation of the printer 20 of the TEX service, using the International No. 2 code alphabet, to a form suitable for reception by the printer 21 of the TWX service, using the Arrangement C code alphabet. FIG. 4 is a chart showing the conversion functions necessary to alter a signal produced by the operation of the printer 21 of the TWX service to a form suitable for reception by the printer 20 of the TEX service. To read the charts shown in FIGS. 3 and 4, the character included in the incoming signal is indicated in the first column to the left under TEX signal in and TWX signal in, respectively. Whether a TEX signal or TWX signal is involved will, of course, depend on the direction of the signal through the communication system. The second column in each of the charts shown in FIGS. 3 and 4 represents the intelligence which the converter will transmit as a translation in place of the character received. The third column indicates the equivalent five-unit code combination of each character the converter transmits. When a character is received in an incoming signal by one of the sections 31 or 42 of the converter 30 which is provided in one of the codes but is not provided at all in the other code, the character is replaced by a combination of characters corresponding thereto. For example, as shown in the chart of FIG. 4, the symbol character Dollar Sign provided in the Arrangement C code alphabet but not in the International No. 2 code alphabet is replaced by a combination of characters DLRS. In the case of the Question Mark provided in the International No. 2 code alphabet but not in the Arrangement C code alphabet, the single symbol character is replaced by a combination of characters QUERY, as shown in FIG. 3. In a similar manner, the various symbol characters provided in one of the codes but not in the other are replaced in each case by a combination of characters. The words "Forced Carriage Return" in the first column of the charts shown in FIGS. 3 and 4 indicate that the converter had to insert Carriage Return and Line Feed characters in the outgoing signal to ensure the proper operation of the respective printers 20, 21. The words "Forced Carriage Return on Space" in the first column of the chart shown in FIG. 4 indicate that the character Space was received next to the last character in a line. As a result, the converter section performing the TWX to TEX conversion functions had to insert the character Letters followed by Carriage Return and Line Feed characters, since the character Space shifts the printer 21 of the TWX service from upper case to lower case. By performing the conversion functions indicated in FIGS. 3 and 4, the signal produced by one of the printers 20 or 21 can be altered to a form suitable for reception by the other printer. The charts shown in FIGS. 3 and 4 will be referred to in greater detail during the description of a specific embodiment of the converter according to the invention.

As mentioned in connection with FIG. 1, the converter includes two sections 31 and 42 of similar design. The sections 31 and 42 differ in design and operation according to the different conversion functions which each is required to perform. There is shown in FIG. 5 a functional block diagram of a single section of the converter. While only one section is shown in FIG. 5, the description given for the section will follow generally for the other section of the converter. Each of the blocks shown in FIG. 5 represents a group of relays. As a matter of convenience in describing the fundamental logic used in the converter, a number of two-position switches have been placed between the blocks to provide gating paths for transferring the control actions within the section of the converter. The solid lines with arrowheads are used to indicate the direction and route by which the control information or action is transferred from one block circuitry to another. The phantom or dotted lines, also with arrowheads, indicate the direction and the source from which the controlling action on the respective two-position switches is directed. A line connecting the armature of two switches indicates that both armatures are connected to a common shaft and moved together when operated. In describing the operation of a section of the converter as shown in block form in FIG. 5, only the major conditions of operation will be considered. Special conditions of operation of the respective sections 31, 42 of the converter will be described in detail during the description of a specific embodiment of the converter.

For the sake of description, the section of the converter shown in block form in FIG. 5 will be assumed to correspond to the section 31 of the converter shown in FIG. 1 and included in the TEX to TWX circuit. However, it is to be understood that the description given will follow generally for the section 42 of the converter also shown in FIG. 1 and included in the TWX to TEX circuit. A five-unit start-stop sequential signal produced by the operation of the printer 20 of the TEX service is received at the central station 24, as shown in FIG. 1, and is forwarded over lead 26 to the reperforator 25. The reperforator 25 translates each of the characters including in the incoming signal into an arrangement of holes perforated on the tape 27, according to the particular combination of marking and spacing elements included in each of the characters. The tape 27 is, thereafter, fed through the sensing mechanism 28 which translates the holes in the tape 27 into electrical impulses. The electrical impulses corresponding to a character included in the incoming signal are simultaneously applied over a plurality of leads represented by lead 29 to fan relays 50. As previously described, the incoming signal includes lower case characters and upper case characters. The operation of the section 31 of the converter as shown in block form in FIG. 5 will first be described when lower case characters or characters in Letters status are received. As mentioned in connection with the chart shown in FIG. 2, the character assignments in the lower case or Letters status are the same in both of the respective codes used by the printers 20, 21. The lower case characters received are, therefore, treated by the section 31 of the converter as non-converting type characters in that no conversion thereof is necessary. The lower case characters may be characters which will be printed by the operation of the printer 21 of the TWX service, for example, letter characters. On the other hand, the characters may represent control functions such as Figures, Letters, and so on. These later characters are not printed by the operation of the printer 21 of the TWX service, but serve to control the operation thereof. Assuming at first that impulses are received by the fan relays 50 corresponding to a lower case character which will be printed by the operation of the printer 21 of the TWX service, the impulses are repeated by the operation of the fan relays 50 and are fed to the transmitting distributor 32 over a path including armature 51 and contact 52 of switch S–1A and a plurality of leads represented by lead 33. The transmitting distributor 32 operates to transmit the character in the form of a five-unit start-stop sequential signal to the printer 21 of the TWX service over the path including lead 34 in the manner shown in FIG. 1. Simultaneously with the transmission of the character by the operation of the transmitting distributor 32, the transmitting distributor 32 produces a character count pulse which is fed to an end-of-line indicator 53 over an electrical path including lead 36, contact 54 and armature 55 of switch S–2. The end-of-line indicator 53 operates in response to the pulse to register a count for the particular line upon which the printer 21 of the TWX service is printing characters. The section 31 of the converter will operate in the manner described above to forward all of the lower case letter or print type characters included in the incoming signal to the printer 21 of the TWX service without translation and to count the characters by the operation of the end-of-line indicator 53.

When impulses are received by the fan relays 50 representing a control function character, other than the character Figures, which will not be printed by the operation of the printer 21 of the TWX service, the fan relays 50 repeat the impulses and forward them to the transmitting distributor 32 over the path including armature 51 and contact 52 of switch S–1A and lead 33. The fan relays 50 also sense the reception of a non-print type character and produce a selected control signal which is fed to the appropriate relay of the stunt relays 56 over lead 57. The appropriate relay of the stunt relays 56 is operated and brings about the opening of armature 55 and contact 54 of switch S–2 by control means represented by dotted line 58 drawn from the stunt relays 56 through the contact 59 and armture 60 of the switch S–3B to the armature 55 of switch S–2. When the transmitting distributor 32 operates to forward the control function character to the printer 21 of the TWX service over the electrical path including lead 34, a character count pulse is produced. By opening the armature 55 and contact 54 of switch S–2, the character count pulse is prevented from reaching the end-of-line indicator 53. The operation of switch S–2 in this manner is necessary to prevent the end-of-line indicator 53 from counting the non-print type of characters which are not actually reproduced as printed characters on a line by the operation of the printer 21 of the TWX service.

When impulses corresponding to the character Figures, a control function character, are received by the fan relays 50, the section 31 of the converter will operate in the same manner as it does in response to the reception of any print or non-print type of character to forward the impulses to the transmitting distributor 32. An appropriate relay of the stunt relays 56 is operated to bring about the opening of contact 54 and armature 55 of switch S–2 by the control means represented by dotted line 58, preventing the operation of the end-of-line indicator 53 in response to the character count pulse produced by the transmitting distributor 32. Upon the completion of the transmission of the character Figures by the transmitting distributor 32, however, the section of the converter will assume a Figures or upper case status and locks in this condition until a Letters character is received. The change in status is brought about by the operation of the appropriate relay of the stunt relays 56 in response to the selected control signal fed thereto from the fan relays 50 over lead 57 which causes the armature 51 of switch S–1A to disengage contact 52 and engage contact 61 and also causes armature 62 to engage contact 63 of switch S–1B by control means represented by lead 64. The switches S–1A and S–1B remain in this condition until the case status is changed.

The section 31 of the converter as shown in block form in FIG. 5 is now in the upper case or Figures status. As shown in the chart given in FIG. 2, some of the character assignments in the upper case are the same in both the International No. 2 and Arrangement C code alphabets. The section 31 of the converter, therefore, need not perform conversion functions in response to these particular upper case characters. When impulses representing a non-converting type of character which is also a character of the type printed by the operation of the printer 21 of the TWX service are received by the fan relays 50, the impulses are repeated and fed to the transmitting distributor 32 over the path including armature 51 and contact 61 of switch S–1A, contact 65 and armature 66 of switch S–3A, lead 67 and lead 33. Contact 54 and armature 55 of switch S–2 remain closed so that the character count pulse produced by the operation of the transmitting distributor 32 upon the transmission of the upper case character to the printer 21 of the TWX service is fed to the end-of-line indicator 53 over lead 36. The section 31 of the converter will operate in the manner described in response to the impulses of each of the upper case non-converting type characters which are printed by the operation of the printer 21 of the TWX service.

When the impulses of a non-converting and non-print type of character are received by the fan relays 50, other than the character Letters, the impulses are repeated by the operation of the fan relays 50 and are fed to the transmitting distributor 32 over the path including armature 51 and contact 61 of switch S–1A, contact 65 and armature 66 of switch S–3A, lead 67 and lead 33. The fan relays 50 produce a selected control signal which is fed to an appropriate relay of the stunt relays 56 over lead 57. The appropriate relay of the stunt relays 56 is operated, causing armature 55 and contact 54 of switch S–2 to open by the operation of the control means represented by lead 58. The opening of the armature 55 and contact 54 of switch S–2 prevents the end-of-line indicator 53 from registering a count in response to the character count pulse produced by the operation of the transmitting distributor 32 upon the transmission of the non-converting and non-print type character to the printer 21 of the TWX service. It may be seen, therefore, that the operation of the section of the converter in an upper case status is similar to the operation thereof when in the lower case status, with the exception that the switches S–1A and S–1B are made to assume different conditions depending upon the case status of the section 31 of the converter at a given time.

As pointed out in connection with the chart shown in FIG. 2, certain of the upper case character assignments are different in the International No. 2 code used by the printer 20 of the TEX service as compared to the upper case character assignments in the Arrangement C code alphabet used by the printer 21 of the TWX service. Certain of the upper case characters provided in the International No. 2 code alphabet are not provided at all in the Arrangement C code alphabet. On the other hand, certain upper case characters provided in both the International No. 2 and Arrangement C code alphabets are not assigned to the same combinations of marking and spacing elements in the respective code alphabets. In order to render the printer 20 of the TEX service and the printer 21 of the TWX service compatible, the section 31 of the converter must, therefore, translate these converting type characters to a form suitable for reception by the printer 21 of the TWX service. When the impulses of a converting and print type, upper case character are received by the fan relays 50, the fan relays 50 produce a selected control signal which is fed to an appropriate relay of the memory relays 68 over the path including armature 62 and contact 63 of switch S–1B. The appropriate relay of the memory relays 68 is operated and causes armature 66 of switch S–3A to disengage contact 65 and engage contact 69 and also causes armature 60 of switch S–3B to disengage contact 59 and engage contact 70 by the operation of control means represented by dotted line 71. The memory relays 68 are a group of relays having predetermined stored impulses. When an appropriate relay of the memory relays 68 is operated in response to the selected control signal fed thereto from the fan relays 50 upon the reception by the fan relays 50 of impulses representing a converting type character, the memory relays 68 operate to produce impulses forming a particular five-unit character or character combination, replacing the character included in the incoming signal and requiring translation. The character or combination of characters corresponding to the particular converting type character received by the section 31 of the converter is fed to the transmitting distributor 32 over a path including a memory output stepping switch 72, contact 69 and armature 66 of switch S–3A, lead 67 and lead 33. In the case of a combination of characters, the characters in the combination are fed a character at a time to the transmitting distributor 32. The transmitting distributor 32 operates to transmit the single converted character or each of the characters included in the combination of characters as a five-unit start-stop sequential signal. By causing armature 66 of switch S–3A to disengage contact 65 and engage contact 69, the original character received by the fan relays 50 is prevented from reaching the transmitting distributor 32. Instead, the single character or combination of characters representing a translation of the single incoming character is fed to the transmitting distributor 32 from the memory relays 68. For example, assuming that the upper case letter character "B" or, in other words, the symbol character Question Mark is received by the fan relays 50, the memory relays 68 are operated to forward the combination of characters QUERY to the transmitting distributor 32.

As the memory output stepping switch 72 is operated by the character or combination of characters fed thereto from the memory relays 68, the memory output stepping switch 72 controls the condition of the switch S–2 by the operation of control means represented by dotted line 73 through contact 70 and armature 60 of switch S–3B. As each print type character is fed from the memory output stepping switch 72 to the transmitting distributor 32, the contact 54 and armature 55 of switch S–2 are held in a closed condition. Therefore, as the transmitting distributor 32 operates to transmit the print type characters to the printer 21 of the TWX service, the end-of-line indicator 53 is operated in response to the character count pulses produced by the transmitting distributor 32 and fed to the end-of-line indicator 53 over the path including lead 36. If a non-print type of character is received by the memory output stepping switch 72 from the memory relays 68, the memory output stepping switch 72 operates the control means represented by lead 73 to open contact 54 and armature 55 of switch S–2. The opening of switch S–2 prevents the operation of the end-of-line indicator 53 in response to the character count pulse produced by the transmitting distributor 32 upon the transmission of the non-print type character to the printer 21 of the TWX service. When the single character or combination of characters replacing the single converting type character included in the incoming signal has been completely fed from the memory output stepping switch 72 to the transmitting distributor 32, the memory relays 68 cause the control means represented by dotted line 71 to return switches S–3A and S–3B to their original condition. Armature 66 of switch S–3A disengages contact 69 and engages contact 65, while armature 60 of switch S–3B disengages contact 70 and engages contact 59. The impulses corresponding to the next character included in the incoming signal are, thereafter, fed to the fan relays 50. The type of character received will determine the subsequent operation of the section 31 of the converter in one of the ways described above.

The section 31 of the converter will remain in an upper case or Figures status and will operate in response to either a converting or non-converting type character in the manner described above until impulses corresponding to the control function character Letters are received by the fan relays 50. The impulses of the character Letters are repeated by the fan relays 50 and fed to the transmitting distributor 32 over the path including armature 51 and contact 61 of switch S-1A, contact 65 and armature 66 of switch S-3A, lead 67 and lead 33. Because the character Letters is a non-print type of character, contact 54 and armature 55 of switch S-2 will be held open by the operation of an appropriate one of the relays of the stunt relays 56 in response to a selected control signal produced by the operation of the fan relays 50. It will be remembered that the stunt relays 56 operate to change the condition of the switch S-2 by the operation of control means represented by dotted line 58. Upon the completion of the transmission of the character Letters by the transmitting distributor 32, the operation of the appropriate relay of the stunt relays 56 in response to the selected control signal fed thereto from the fan relays 50 over lead 57 causes armature 51 of switch S-1A to disengage contact 61 and engage contact 52 and also causes armature 62 and contact 63 of switch S-1B to open by the operation of control means represented by the dotted line 64. The section 31 of the converter is now in the lower case or Letters status and remains in this status until impulses corresponding to the character Figures are received by the fan relays 50.

As previously pointed out, the printer 21 of the TWX service is designed to accommodate seventy-two characters in a line, while the printer 20 of the TEX service is designed to accommodate sixty-nine characters in a line. Because of the translation of certain incoming single characters into a combination of characters, more than seventy-two characters might be included in a line before the appearance of the Carriage Return and Line Feed characters normally inserted in the incoming signal by the operation of the printer 20 of the TEX service. The end-of-line indicator 53 registers a count in response to each of the character count pulses fed thereto from the transmitting distributor 32 upon the transmission of each print type character from the transmitting distributor 32 to the printer 21 of the TWX service. Assuming that the end-of-line indicator 53 has just registered the next to last character that can be printed on a line by the operation of the printer 21 of the TWX service and that a new print type character is indicated by the operation of the fan relays 50 in response to the impulses fed thereto from the sensing mechanism 28 over lead 29, the section 31 of the converter will operate in the manner described above to bring about the transmission of the character from the transmitting distributor 32 to the printer 21 of the TWX service. Immediately upon the completion of the transmission of the print type character by the transmitting distributor 32, the end-of-line indicator 53 operates in response to the character count pulse fed thereto from the transmitting distributor 32 to forward a control signal to the forced carriage return and line feed memory relays 74. The forced carriage return and line feed memory relays 74 cause the armature 66 of switch S-3A to disengage contact 65 and engage contact 69 and also cause the armature 60 of switch S-3B to disengage contact 59 and engage contact 70 by the operation of control means represented by dotted line 75. The forced carriage return and line feed memory relays 74 halt the movement of characters included in the incoming signal through the section 31 of the converter and insert in the outgoing signal Carriage Return and Line Feed characters a character at a time. The Carriage Return and Line Feed characters are fed from the forced carriage return and line feed memory relays 74 to the transmitting distributor 32 over the path including the memory output stepping switch 72, contact 69 and armature 66 of switch S-3A, lead 67 and lead 33. Because the Carriage Return and Line Feed characters are non-print type characters, the memory output stepping switch 72 will cause the contact 54 and armature 55 of switch S-2 to open by the operation of the control means represented by the dotted line 73 through the contact 70 and armature 60 of the switch S-3B. The end-of-line indicator 53 is prevented from registering a count in response to the character count pulses produced by the operation of the transmitting distributor 32 upon the transmission of the Carriage Return and Line Feed characters inserted in the outgoing signal by the operation of the forced carriage return and line feed memory relays 74.

Upon the completion of the transmission of the Carriage Return and Line Feed characters by the transmitting distributor 32, the control means represented by the dotted line 75 are operated to cause the armature 66 of switch S-3A to disengage contact 69 and engage contact 65 and, also, to cause armature 60 of switch S-3B to disengage contact 70 and engage contact 59 which causes, in turn, contact 54 and armature 55 of switch S-2 to close. The operation of the forced carriage return and line feed memory relays 74 described above is the same whether the section 31 of the converter be in a lower case, Letters status, or in an upper case, Figures status. Whether the section 31 of the converter is operated in the lower case or upper case depends upon the condition of the switches S-1A and S-1B. As the condition of the switches S-1B and S-1A does not affect the operation of the forced carriage return and line feed memory relays 74, the forced carriage return and line feed memory relays 74 will operate in response to the control signal fed thereto from the end-of-line indicator 53 to automatically insert Carriage Return and Line Feed characters in the outgoing signal in the manner described above regardless of whether the section of the converter is in a lower case or upper case status.

The description of the section 31 of the converter according to the invention included in the TEX to TWX circuit which has been given in connection with FIG. 5 will follow generally for the section 42 of the converter included in the TWX to TEX circuit. The differences in the operation of the two sections 31 and 42 are due only to the specific conversion functions which each section is required to perform. For example, the end-of-line indicator included in the TWX to TEX circuit will operate in a manner similar to the operation of the end-of-line indicator 53 included in the TEX to TWX circuit, as shown in FIG. 5. However, the end-of-line indicator included in the TWX to TEX circuit is operated to ensure that only sixty-nine characters are included in a line of characters in the outgoing signal fed from the converter to the printer 20 of the TEX circuit, whereas the end-of-line indicator 53 included in the TEX to TWX circuit is operated to ensure that only seventy-two characters are included in a line of characters in an outgoing signal fed from the converter to the printer 21 of the TWX service.

Reference will now be made to FIG. 6, FIGS. 6a through 6f taken together, and to FIG. 7, FIGS. 7a through 7f taken together, which show a specific embodiment of the respective sections of a converter according to the invention. FIG. 6 is a circuit diagram, given by way of example, of the section 31 of the converter used to perform the TEX to TWX conversion functions. FIG. 7 is a circuit diagram, given by way of example, of the section 42 of the converter used to perform the TWX to TEX conversion functions. Both the TEX to TWX and TWX to TEX sections of the converter include an arrangement of relay devices which are drawn in accordance with the detached contact method of showing relays, that is the relay contacts are not shown associated with their own relay windings but are instead shown as part of the circuit which they control. By this method, the conditions for operation, holding and release of any relay are clearly shown. The relays are identified by two capital letters. It is assumed that the respective relays are of a type known in the art, comprising two rows of contacts which are opened or closed simultaneously according to the operating condition of the relay. The contacts are all shown in their non-operated position, and the contacts of each of the relays are identified by the two capital letters with a number indicating the number of the contact on the relay and another letter denoting the location of the contact (whether the contact is mounted on the right, R, or left, L, side of the relay looking from the front). Whenever the identifications of two relays are used together and are separated by a diagonal, thus AF/AE, the relays are to be considered as one. In certain instances two relays have been used in place of one because the contact pile up on one relay was not sufficient to perform the functions of the relay. As shown in FIGS. 6 and 7, the windings of relays used in this manner are connected in parallel.

The description of the operation of the respective sections of the converter will be given in connection with timing diagrams shown in FIGS. 8 through 20. The timing diagrams show the actual sequence of operation of the relays involved in providing the various functions performed by the converter. The sequence of operation is to be followed from left to right across the timing diagrams. The initiation of timing action is generated from two sources, one as a result of the rotation of the sensing shaft included in the sensing mechanism operating relay BB, and the other as a result of the rotation of the distributor shaft included in the transmitting distributor operating relay BA. The horizontal lines in the timing diagrams define the operation of the relays, while the vertical lines define the actions of the contacts on the relays. The arrowheads associated with the vertical lines define normally opened contacts and the rectangular-shaped boxes define normally closed contacts on a relay. Each of the graduations indicated at the top of the timing diagrams is equal to thirty degrees of one complete shaft rotation. The timing shown on the diagrams is based upon 368 r.p.m., and the operating and release times of the relays are equivalent degrees of a rotation.

As previously mentioned, the operation of one section of the converter is basically similar to that of the other section of the converter, the operation of the respective sections differing only to the extent necessary to enable each section to perform the particular conversion functions which are required by that section. For the sake of brevity, therefore, the operation of the converter will be described, for the most part, in connection with the circuit diagram of the TEX to TWX section of the converter shown in FIG. 6. However, unless otherwise indicated, it is to be understood that the description also applies to the operation of the circuit diagram of the TWX to TEX section of the converter shown in FIG. 7. The relays and other components included in both sections of the converter which perform the same functions and are similar in operation have been identified in both FIGS. 6 and 7 by the same reference. Mention will be made to the instances in which operation of the TWX to TEX section of the converter differs from that of the TEX to TWX section of the converter. In order to enable the proper operation of the converter in a manner to be described, various interconnections are provided between the respective sections of the converter. These interconnections are represented at the bottom of FIG. 6b by terminals 80 through 88 and at the bottom of FIG. 7b by terminals 80' through 88'. However, in actual practice, the terminals 80 through 88 are connected directly to the terminals 80' through 88', respectively, to provide the necessary interconnections between the respective sections of the converter.

Referring to the timing diagram shown in FIG. 8 and to the circuit diagram of the TEX to TWX section of the converter shown in FIG. 6, the operation of a section of the converter in response to a non-converting type character in both lower and upper case status will first be described. The timing diagram shown in FIG. 8 will also be used to describe the operation of a section of the converter in counting the print type characters included in a message signal received. The description of the operation of a section of the converter to be given in connection with the timing diagram shown in FIG. 8 applies equally well to both the TEX to TWX and TWX to TEX sections of the converter. While reference will be made to the circuit diagram of the TEX to TWX section of the converter shown in FIG. 6, the description may also be followed by referring to the circuit diagram of the TWX to TEX section of the converter shown in FIG. 7. The term ground, as used in the specification, is to be understood as referring to a point of zero or fixed reference potential.

Five characters have been selected for use in describing the operation of the converter in connection with the timing diagram shown in FIG. 8. The characters selected are the letter character "A," the control function character Figures, the number or upper case character "1," the control function character Letters and the letter character "B." As shown in FIG. 2, these characters are non-converting type characters, being assigned to the same combination of signal elements in both the International No. 2 and Arrangement C code alphabets, and no translation thereof is required by the converter. As described in connection with FIGS. 1 and 5, the characters included in an incoming message signal sent from the page printer 20 of the TEX service to the page printer 21 of the TWX service are first reproduced on a tape. The tape is thereafter fed through the five sensing contacts, indicated generally by the reference 79, of a sensing mechanism included, for example, in a Model 14 Teletype Typing Reperforator Transmitter Distributor which, in itself, forms no part of the instant invention. When the first character included in a message signal reproduced on the tape is fed to the sensing contacts 79, a transmitter stop contact 89 is closed. The closing of the transmitter stop contact 89 completes a ground connection to the winding of relay CM, and relay CM operates. Armature 2L and contact 3L of relay CM close, completing a ground connection to the winding 90 of the sensing clutch magnet included in the sensing mechanism over a path including contact 1R and armature 2R of relay CP, contact 8L and armature 7L of relay AK or armature 2R and contact 1R of relay BJ, contact 5L and armature 4L of relay AM, contact 7L and armature 8L of relay AP, contact 1R and armature 2R of relay BK, contact 1R and armature 2R of relay BF and contact 1R and armature 2R of relay BI. The winding 90 of the sensing clutch magnet is energized and allows the sensing clutch to engage, causing the sensing shaft included in the sensing mechanism to rotate. As long as the winding 90 of the sensing clutch magnet is energized before the end of each complete rotation of the sensing shaft, the sensing shaft will continue its rotation. If the winding 90 of the sensing clutch magnet is deenergized while the sensing shaft is rotating and is not reenergized before the end of a complete rotation of the sensing shaft, the sensing shaft will complete a full rotation and then stop. As the sensing shaft continues to rotate to complete the first rotation thereof, a cam provided on the sensing shaft closes a distributor release contact 91. The closing of the distributor release contact 91 completes a ground connection to the winding of relay BB. Armature 2L and contact 3L of relay BB close, completing a ground connection to the winding 92 of the distributor clutch magnet included in the transmitting distributor over a path including armature 2R and contact 1R of relay AL and armature 8L and contact 7L of relay AH.

As in the case of the sensing mechanism, the transmitting distributor may be included in a Model 14 Teletype Typing Reperforator Transmitter Distributor and, in itself, forms no part of the instant invention. The winding 92 of the distributor clutch magnet is energized, causing the distributor clutch to engage the distributor shaft represented diagrammatically at the top of FIG. 6b by the connecting member 93. The distributor shaft is started in its rotation to sequentially complete a circuit between the distributor contacts, indicated generally by the reference 94, and output terminals 95, 96. As represented diagrammatically in FIG. 6b, the connecting member 93 will move in the direction of the arrow to sequentially connect the distributor contacts 94 to the output terminals 95, 96. The distributor shaft will continue to rotate as long as the winding 92 of the distributor clutch magnet is energized before the end of each complete rotation thereof. If the winding 92 of the distributor clutch magnet is deenergized during a rotation of the distributor shaft and is not reenergized before the end of a complete rotation of the distributor shaft, the distributor shaft will complete a full rotation and then stop.

Figure 6A:
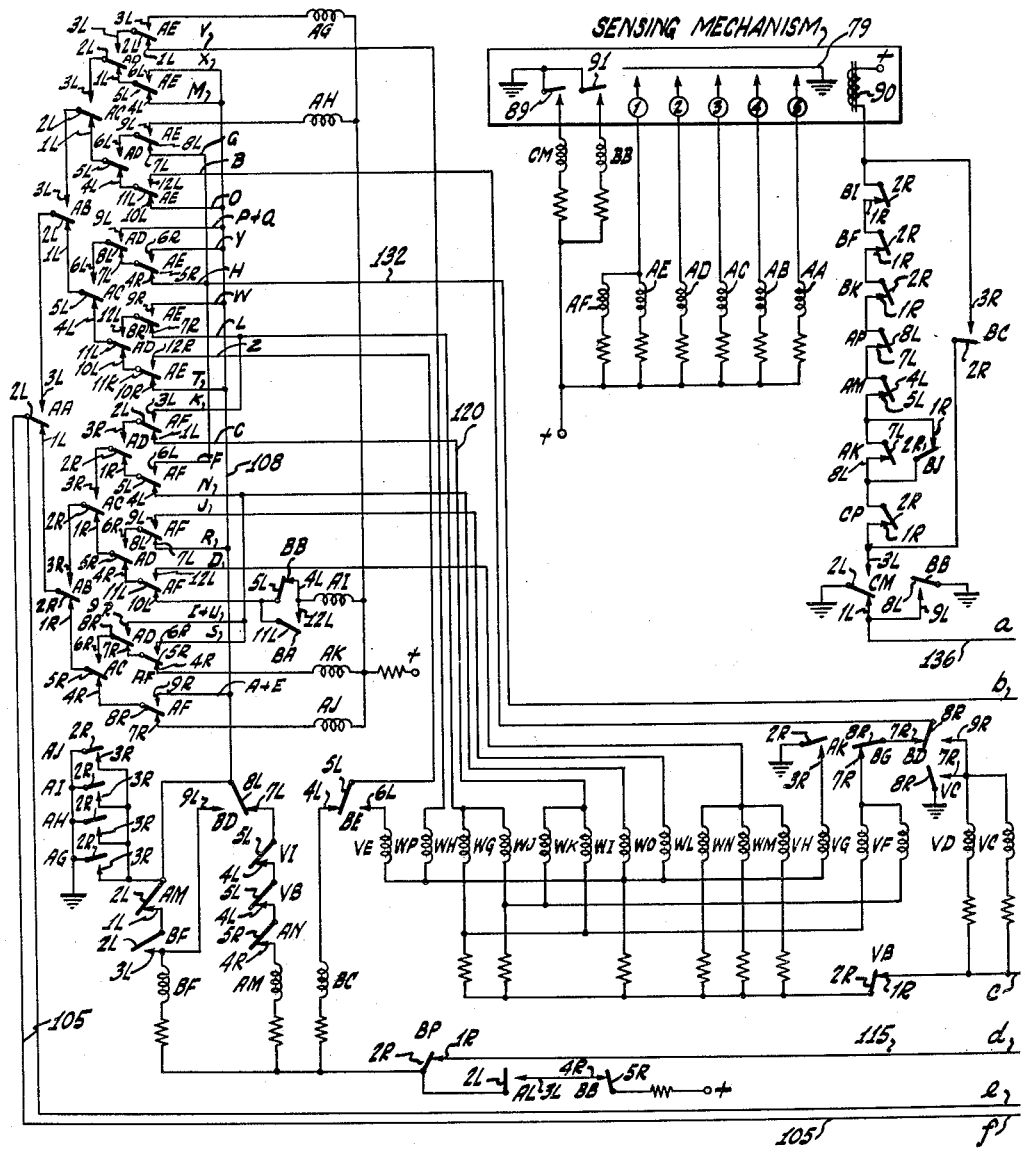
Figure 6C:
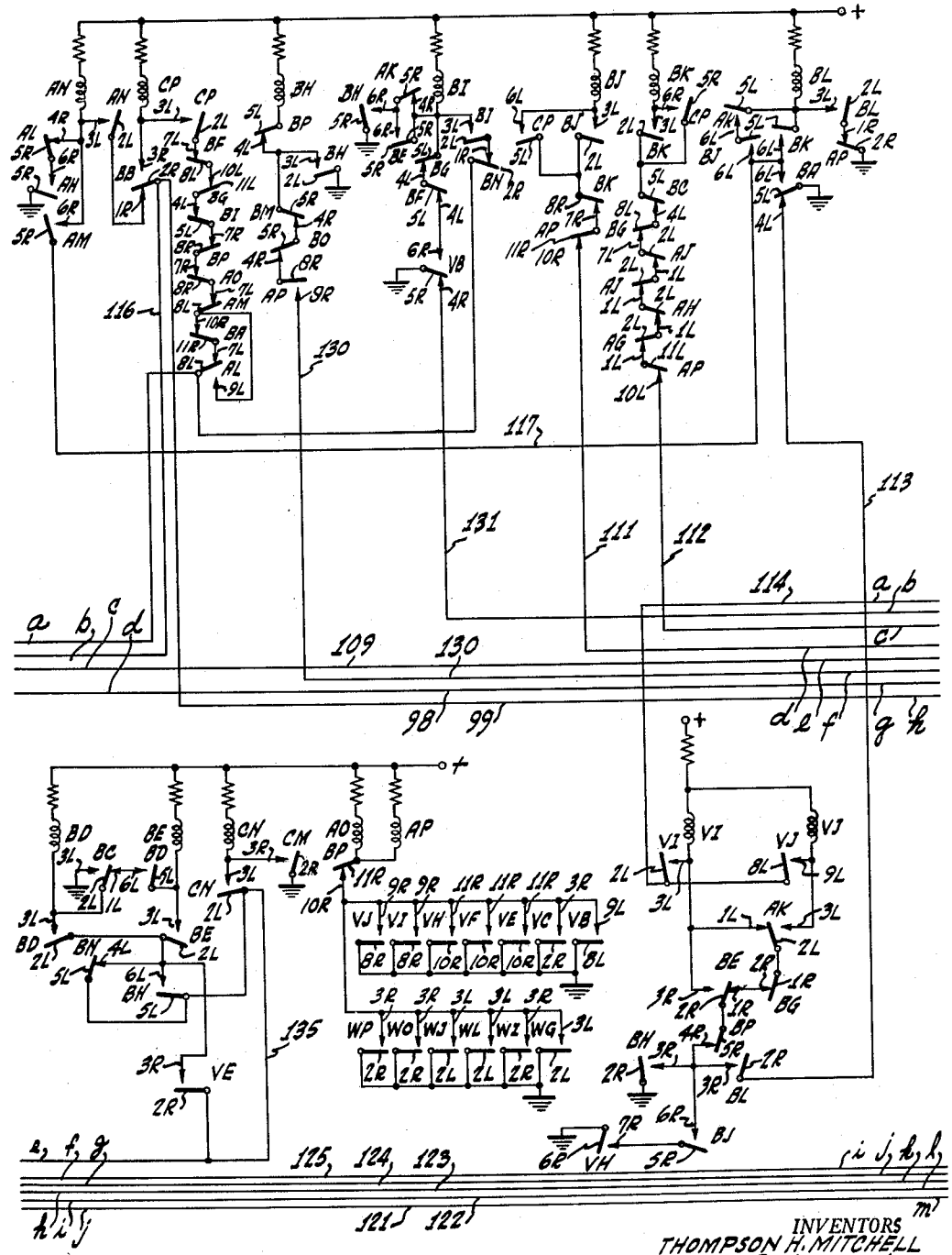

When relay BB is operated, armature 2R and contact 3R of relay BB close and complete a ground connection to the winding of relay CP, FIG. 6c, over a path including switch 97, lead 98 and lead 99. Relay CP is operated, and armature 2L and contact 3L of relay CP close completing a holding circuit for relay CP. Armature 2R and contact 1R of relay CP open, removing the ground connection from the winding 90 of the sensing clutch magnet. However, as pointed out above, the sensing shaft continues to rotate to complete a full rotation thereof. Meanwhile, as the sensing shaft is rotated through the first complete rotation thereof, the five contacts of the sensing contacts 79 are made to read the perforations in the tape which are arranged according to the combination of signal elements included in the first character of the incoming message signal. It has been assumed that the first character is the letter character "A." The point in the rotation of the sensing shaft at which the combination of signal elements is read by the sensing contacts 79 is indicated in the timing diagram by a cross-mark on the vertical line which indicates the operation of the sensing shaft. As shown in FIG. 2, the first and second elements of the letter character "A" are in a marking condition, while the third, fourth and fifth elements of the character are in a spacing condition. The first and second contacts of the sensing contacts 79 close, and a ground connection is made to the windings of fan relays AF/AE and AD. Fan relays AF/AE and AD operate. Relays AF/AE, AD, AC, AB and AA are the fan relays described in connection with FIG. 5. Contact 12R and armature 11R of relay AF and contact 12R and armature 11R of relay AD, at the bottom of FIG. 6b, close. The closing of these contacts provides two actions. A ground connection is made through the respective closed contacts to the first and second lamps of a group of five indicator lamps which may, for example, be neon lamps of a type commonly used in the art, and the first and second lamps are lighted. By the operation of fan relays AF/AE, AD, AC, AB and AA which are selectively operated by the closing of the sensing contacts 79, the group of five indicator lamps will be selectively operated to indicate at any particular time the combination of signal elements present in the sensing contacts 79. The contacts 79 are assumed to be the type which retain a condition corresponding to an arrangement of perforations read on a tape until the sensing contacts 79 are made to read a succeeding arrangement of perforations on the tape, establishing a new condition in the sensing contacts 79 corresponding to the succeeding arrangement of perforations.

The closing of the contacts of fan relays AF and AD also completes a ground connection to the first and second signal contacts of the distributor contacts 94. A circuit is completed from ground to the first signal contact over a path including armature 11R and contact 12R of relay AF, contact 1L and armature 2L of relay AO and lead 100. A circuit is also completed from ground to the second signal contact over a path including armature 11R and contact 12R of relay AD, contact 4L and armature 5L of relay AO and lead 101. As the distributor shaft continues its rotation, the letter character "A" will appear at output terminals 95, 96, as a five-unit start-stop sequential signal. This operation is shown diagrammatically in FIG. 6 by the operation of the connecting member 93 which moves in the direction of the arrow to sequentially connect the start contact, the five signal contacts and the stop contact of the distributor contacts 94 to the output terminals 95, 96. A marking ground will appear on the first and second signal contacts of the distributor contacts 94. As a result, the first and second signal elements of the five-unit signal transmitted from the transmitting distributor are in a marking condition, while the third, fourth and fifth signal elements are in a spacing condition.

As the sensing shaft continues its first rotation, the distributor release contact 91 opens, removing the ground connection from the winding of relay BB. Relay BB becomes inoperative, causing contact 3L and armature 2L of relay BB to open. The ground connection is removed from the winding 92 of the distributor clutch magnet, and the winding 92 is deenergized. The distributor shaft will, however, complete its first rotation. As the distributor shaft continues to rotate to bring about the transmission of the letter character "A," a cam provided on the distributor shaft closes a distributor auxiliary contact 102, completing a ground connection to the winding of relay BA. Relay BA is operated, and contact 10R and armature 11R of relay BA in the holding circuit of relay CP open, disconnecting the ground connection from the winding of relay CP. Relay CP becomes inoperative, and the contact 1R and armature 2R of relay CP close, completing the ground connection to the winding 90 of the sensing clutch magnet. By energizing the winding 90 of the sensing clutch magnet, the sensing shaft is driven so as to begin a second rotation thereof. This action is possible because armature 2L and contact 3L of relay CM remain closed, indicating that there are additional characters to follow.

The operation of relay BA by the closing of the distributor auxiliary contact 102 also brings about the closing of armature 8L and contact 9L of relay BA which provides a ground connection to the winding of relay DH, at the top of FIG. 6f, over a path including the switch 97, lead 98, armature 5R and contact 4R of relay BK, contact 4L and armature 5L of relay AJ, contact 4L and armature 5L of relay AI, contact 4L and armature 5L of relay AH, contact 4L and armature 5L of relay AG and contact 1L and armature 21 of relay AP. Relay DH operates, and contact 3L and armature 2L of relay DH close, completing a holding circuit for relay DH. Armature 2R and contact 3R of relay DH close and prepare relay DE to operate when relay BA becomes inoperative by the opening of the distributor auxiliary contact 102. As the distributor shaft continues to rotate through the first rotation thereof, the cam provided on the shaft permits the distributor auxiliary contact 102 to open, removing the ground connection from the winding of relay BA. Relay BA becomes inoperative, causing armature 8R and contact 7R of relay BA to close. A ground connection is completed to the winding of relay DE over a path including armature 2R and contact 3R of relay DH which were closed by the previous operation of relay DH. Relay DE operates, causing armature 2R and contact 1R of relay DE in the holding circuit of relay DH to open. The ground connection to the winding of relay DH is broken, and relay DH becomes inoperative. Armature 2L and contact 3L of relay DE, the top of FIG. 6e, close and complete a ground connection to the operate winding of a stepping switch SS2A over a path including contact 1R and armature 2R of relay DG, armature 2L and contact 1L of relay DJ and armature 5L and contact 4L of relay DI. The operate winding of stepping switch SS2A is energized, and the stepping switch SS2A registers a character count in the contacts thereof. Contact 21 and armature 31 of the stepping switch SS2A close indicating a count of the first print type character transmitted by the operation of the transmitting distributor, namely, the letter character "A." When relay DH becomes inoperative, armature 2R and contact 3R of relay DH open, removing the ground connection from the winding of relay DE. However, relay DE is a slow release type of relay which is set so that the operation thereof overlaps the next operation of relay BA during the second rotation of the distributor shaft. The relay DH is prevented by the operation of the relay DE in this manner from self-locking through armature 2L and contact 3L of the relay DH. This control on the relay DH prevents a false count from being registered by the operation of the stepping switch SS2A. When relay DE becomes inoperative, contact 3L and armature 2L of relay DE open. The ground connection is removed from the operate winding of the stepping switch SS2A, and the stepping switch SS2A is returned to a standby condition.

While the operation of relays DH, DE and the stepping switch SS2A is taking place, the sensing shaft has begun its second rotation. As the sensing shaft continues its second rotation, the distributor release contact 91 closes, and relay BB is operated. Armature 2L and contact 3L of relay BB close, completing the ground connection to the winding 92 of the distributor clutch magnet over the path including armature 2R and contact 1R of relay AL and armature 8L and contact 7L of relay AH. The winding 92 of the distributor clutch magnet is energized and causes the distributor shaft to begin a second rotation. At the same time, armature 2R and contact 3R of relay BB close, completing the ground connection to the winding of relay CP. Relay CP operates, and the armature 2L and contact 3L of relay CP close, completing the holding circuit for the relay CP. Contact 1R and armature 2R of relay CP open, breaking the ground connection to the winding 90 of the sensing clutch magnet. However, the sensing shaft continues to rotate to complete the second full rotation thereof. The sensing contacts 79 read the perforations on the tape corresponding to the second character included in the incoming message signal at the point in the operation of the sensing shaft indicated by a cross-mark in the timing diagram. The second character is the control function character Figures which includes, as shown in FIG. 2, the first, second, fourth and fifth elements as marking and the third element as spacing. The first and second contacts of the sensing contacts 79 were previously closed by the receipt of the letter character "A." The first and second contacts of the sensing contacts 79 remain closed, and, in addition, the fourth and fifth contacts of the sensing contacts 79 are closed upon the receipt of the control function character Figures. Fan relays AF/AE and AD remain operated. A ground connection is also completed to the windings of fan relays AA and AB, and the relays AA and AB are operated. Contact 12R and armature 11R of relay AF, contact 12R and armature 11R of relay AD, contact 6R and armature 5R of relay AB and contact 6R and armature 5R of relay AA are closed. A ground connection is completed to the first, second, fourth and fifth indicator lamps. These lamps are lighted, indicating the reception by the section of the converter of the control function character Figures. A ground connection is also completed to the first, second, fourth and fifth signal contacts of the distributor contacts 94 placing a marking ground on these signal contacts. The ground connection completed to the first and second signal contacts of the distributor contacts 94 has been previously described. The ground connection to the fourth signal contact of the distributor contacts 94 is completed over a path including armature 5R and contact 6R of relay AB, contact 1R and armature 2R of relay AO and lead 103. The ground connection to the fifth signal contact of the distributor contacts 94 is completed over a path including armature 5R and contact 6R of relay AA, contact 4R and armature 5R of relay AO and lead 104. As the distributor shaft continues its second rotation, the control function character Figures is, therefore, fed to the output terminals 95, 96, as a five-unit start-stop sequential signal.

Upon the operation of fan relays AF/AE, AD, AB and AA, a connection is completed to the winding of stunt relay AH from terminal 80, at the bottom of FIG. 6b, over a path including lead 105, armature 2L and contact 3L of relay AA, armature 2L and contact 3L of relay AB, armature 2L and contact 1L of relay AC, armature 5L and contact 6L of relay AD and armature 8L and contact 9L of relay AE. Referring to the bottom of FIG. 7b, terminal 80′ is connected to ground over a path including lead 106 and the switch 97 located in the TWX to TEX section of the converter. Terminal 80′ located in the TWX to TEX section of the converter is in actual practice connected to the terminal 80 located in the TEX to TWX section of the converter. Therefore, a ground connection is completed from the TWX to TEX section of the converter through terminals 80′, 80 over the path described above to the winding of the stunt relay AH located in the TEX to TWX section of the converter. Stunt relay AH is operated, causing armature 8L and contact 7L of relay AH to open. The opening of the armature 8L and contact 7L of relay AH prevents a ground connection from being completed to the winding 92 of the distributor clutch magnet by a subsequent operation of relay BB in the manner previously described. Armature 5R and contact 6R of relay AH close, completing a ground connection to the winding of relay AN over a path including armature 5R and contact 4R of relay AL. Armature 2L and contact 3L of relay AN close, providing a holding circuit for relay AN including contact 3L and armature 2L of relay AN, contact 1R and armature 2R of relay BB, lead 99, lead 98 and switch 97. Armature 8R and contact 9R of relay AH, at the bottom of FIG. 6b, close, and prepare relay AL to operate when relay CP becomes inoperative.

As the distributor shaft continues to rotate through the second rotation thereof to transmit the control function character Figures, the distributor auxiliary contact 102 closes. Relay BA is operated, and the armature 8L and contact 9L of relay BA close. The closing of these contacts of relay BA normally brings about the operation of relay DH in the manner described above. However, relay AH is operated, and the armature 5L and contact 4L of relay AH included in the operating circuit of relay DH are open. As a result, the ground connection to the winding of relay DH remains broken, and the relay DH is prevented from operating. By holding relay DH inoperative, the stepping switch SS2A is prevented from registering a count. This action is necessary because the character being transmitted by the transmitting distributor, namely, the control function character Figures, is a non-print type of character which is not printed on a line by the operation of the page printer 21 of the TWX service to which the characters included in the outgoing message signal are being directed.

Upon the operation of relay BA, armature 11R and contact 10R of relay BA open, breaking the ground connection to the winding of relay CP. Relay CP becomes inoperative, and the armature 2R and contact 1R of relay CP close, completing the ground connection to the winding 90 of the sensing clutch magnet. The sensing clutch magnet operates to cause the sensing shaft to begin the third rotation thereof, since the armature 2L and contact 31 of relay CM are still closed indicating that there are more characters to follow. Armature 8L and contact 7L of relay CP close, completing a ground connection to the winding of relay AL in the TEX to TWX circuit shown at the bottom of FIG. 6b and to the winding of relay AL included in the TWX to TEX circuit shown at the bottom of FIG. 7b. The ground connection to the winding of the relay AL located in the TWX to TEX circuit is completed over a path including armature 8L and contact 7L of relay CP, armature 8R and contact 9R of relay AH, terminal 84 (at the bottom of FIG. 6b), terminal 84' (at the bottom of FIG. 7b) and armature 5L and contact 4L of the relay CN located in the TWX to TEX circuit. A ground connection is also completed to the winding of the relay AL located in the TEX to TWX circuit over a path including armature 8L and contact 7L of relay CP, armature 8R and contact 9R of relay AH, terminal 84 (at the bottom of FIG. 6b), terminal 84' (at the bottom of FIG. 7b), armature 5L and contact 4L of the relay CN located in the TWX to TEX section of the converter, terminal 86' (at the bottom of FIG. 7b) and terminal 86 (at the bottom of FIG. 6b). The relays AL in both the TEX to TWX and TWX to TEX sections of the converter are operated and are held in an operative condition by a holding circuit completed by the closing of the armature 5L and contact 6L of the respective relays. The holding circuit for the relay AL in the TEX to TWX section of the converter is completed from the winding of the relay AL to ground over a path including contact 6L and armature 5L of relay AL, terminal 87 (at the bottom of FIG. 6b), terminal 87' (at the bottom of FIG. 7b) and the armature 5L of the relay AL located in the TWX to TEX section of the converter. The holding circuit for the winding of relay AL located in the TWX to TEX section of the converter is completed over a path including contact 6L and armature 5L of relay AL in the TWX to TEX section of the converter, contact 4R and armature 5R of relay AG located in the TWX to TEX section of the converter or contact 1R and armature 2R of relay AN located in the TWX to TEX section of the converter, contact 1L and armature 2L of relay YL located in the TWX to TEX section of the converter, contact 7R and armature 8R of relay YI located in the TWX to TEX section of the converter, terminal 83' (at the bottom of FIG. 7b), terminal 83 (at the bottom of FIG. 6b), contact 4R and armature 5R of relay AG located in the TEX to TWX section of the converter or contact 1R and armature 2R of relay AN located in the TEX to TWX section of the converter, lead 116, lead 99, lead 98 and switch 97. As the winding of the relay AL in the TEX to TWX section of the converter is connected to the armature 5L of the relay AL in the TWX to TEX section of the converter, it may be seen that the same holding circuit is used to maintain both of the relays AL operated. The operation of the relays AL places both the TEX to TWX and TWX to TEX sections of the converter in the upper case or Figures status. By the operation of the relays AL in the manner described, both the TEX to TWX and TWX to TEX sections of the converter are placed in the upper case condition and remain in this condition until the proper control functions are provided for shifting the respective sections of the converter back into the lower case.

When the relay AL located in the TEX to TWX circuit shown in FIG. 6 is operated, armature 2R and contact 1R of the relay AL open. As a result the ground connection to the winding 92 of the distributor clutch magnet will continue to be broken when relay AH becomes inoperative and armature 8L and contact 7L of relay AH close. Armature 8L and contact 7L of relay AL open and armature 8L and contact 9L of relay AL close to provide a new holding circuit for the relay CP. The armature 11R and contact 10R of relay BA are removed from the holding circuit of the relay CP. Contact 3L and armature 2L of relay AL, at the bottom of FIG. 6a, close and prepare relay AM to operate when relay AN becomes inoperative.

In the meantime, the sensing shaft continues its third rotation. Relay BB is operated by the closing of the distributor release contact 91. The armature 2L and contact 3L of relay BB close but a ground connection is not completed to the winding 92 of the distributor clutch magnet, as before, since the armature 2R and contact 1R of relay AL and the armature 8L and contact 7L of relay AH are both open. Armature 2R and contact 3R of relay BB close, completing the ground connection to the winding of relay CP. Relay CP operates, and armature 2L and contact 3L of relay CP close to complete the holding circuit for relay CP including the contact 9L and armature 8L of relay AL. Contact 1R and armature 2R of relay BB open, removing the ground connection from the winding of relay AN. Relay AN becomes inoperative. The operation of relay CP causes the armature 2R and contact 1R of relay CP to open, removing the ground connection from the winding 90 of the sensing clutch magnet. The sensing shaft continues, however, to complete the third revolution thereof. The continued rotation of the sensing shaft causes the five contacts of the sensing contacts 79 to read the next group of perforations on the tape which correspond to the next character included in the incoming message signal at the point in the rotation of the sensing shaft indicated by a cross-mark on the timing diagram. It has been assumed that the next character is the number character "1." As shown in FIG. 2, the number character "1" includes the first, second, third and fifth elements in a marking condition, the fourth element being in a spacing condition. The first, second and fifth contacts of the sensing contacts 79, previously closed upon the receipt of the character Figures, remain closed. The third contact of the sensing contacts 79 closes, and the fourth contact of the sensing contacts 79, previously closed, is opened. Fan relays AF/AE, AD and AA remain operated. Fan relay AB becomes inoperative, and a ground connection is made to the winding of fan relay AC through the third contact of the sensing contacts 79 which causes relay AC to be operated. Armature 11R and contact 12R of relay AF, armature 11R and contact 12R of relay AD, armature 8R and contact 9R of relay AC and armature 5R and contact 6R of relay AA close. The closing of these contacts causes the first, second, third and fifth indicator lamps to be lighted, providing a visual indication of the reception by the section of the converter of the number character "1." A marking ground continues to be supplied at the first, second and fifth signal contacts of the distributor contacts 94 in the manner described above. A marking ground is also supplied at the third signal contact of the distributor contacts 94 over a path including armature 8R and contact 9R of relay AC, contact 7L and armature 8L of relay AO and lead 107. When fan relay AB becomes inoperative, armature 2L and contact 3L of relay AB open, breaking the ground connection to the winding of stunt relay AH. Relay AH becomes inoperative.

The distributor shaft has in the meantime completed its second rotation and is stopped, due to the fact that the winding 92 of the distributor clutch magnet was prevented from becoming energized upon the operation of relay BB by the open condition of the armature 2R and contact 1R of relay AL. The distributor auxiliary contact 102 opens, and the relay BA becomes inoperative. The continued rotation of the sensing shaft in its third rotation causes the distributor release contact 91 to open, and relay BB is made inoperative. Armature 5R and contact 4R of relay BB close, completing a path from battery to ground for operating relay AM including the armature 5R and contact 4R of relay BB, contact 3L and armature 2L of relay AL, the winding of relay AM, contact 4R and armature 5R of relay AN, contact 4L and armature 5L of relay VB, contact 4L and armature 5L of relay VI, contact 7L and armature 8L of relay BD, lead 108, contact 9L and armature 8L of relay AD, contact 6L and armature 5L of relay AC, contact 1L and armature 2L of relay AB, contact 3L and armature 2L of relay AA, lead 105, terminal 80 (at the bottom of FIG. 6b), terminal 80' (at the bottom of FIG. 7b), lead 106 and the switch 97 located in the TWX to TEX circuit. Relay AM operates, and armature 4L and contact 5L of relay AM open to prevent the energization of the winding 90 of the sensing clutch magnet when relay CP becomes inoperative and the contact 1R and armature 2R of relay CP close. As a result, the sensing shaft completes the third rotation thereof and stops. Contact 7L and armature 8L of relay AM in the holding circuit of relay CP open, breaking the ground connection to the winding of relay CP which causes relay CP to become inoperative. Armature 2R and contact 3R of relay AM close and complete a ground connection to the winding 92 of the distributor clutch magnet which, in turn, causes the distributor shaft to begin the third rotation thereof so as to transmit the number character "1" established in the signal contacts of the distributor contacts 94. As shown in the timing diagram given in FIG. 8, the distributor shaft has been purposely delayed in beginning the third rotation to provide sufficient time for the section of the converter to read the perforations on the tape corresponding to the third or upper case character in the incoming message signal. The section of the converter is given time to determine whether the character will be transmitted by the operation of the transmitting distributor as received or whether the incoming character should be translated so that a conversion is transmitted by the transmitting distributor in place of the character received. The operation of a section of the converter when it is necessary to convert an incoming character before the transmission thereof by the transmitting distributor will be described in connection with the timing diagram shown in FIG. 14. The delay between each rotation of the distributor shaft, as shown in the timing diagram, will occur as long as the converter is in the upper case status, as defined by the relay AL in both sections of the converter being operated.

As the distributor shaft continues through the third rotation thereof, the distributor auxiliary contact 102 closes, and relay BA is operated. Armature 8L and contact 9L of relay BA at the top of FIG. 6f close, completing a ground connection to the winding of relay DH. Relay DH operates in the manner previously described, and the armature 2L and contact 3L of relay DH close to complete the holding circuit for the relay DH. Armature 5L and contact 6L of relay BA at the top, right hand side of FIG. 6c close and complete a ground connection to the winding of relay AN over a path including lead 117 and armature 5R and contact 6R of relay AM. Upon the operation of the relay AN, armature 2L and contact 3L of relay AN close and complete a holding circuit for the relay AN. Contact 4R and armature 5R of relay AN open, breaking the ground connection to the winding of relay AM. Relay AM becomes inoperative, causing the armature 4L and contact 5L of relay AM to close. The ground connection is again completed to the winding 90 of the sensing clutch magnet. The winding 90 of the sensing clutch magnet is energized, and the sensing shaft is made to begin the fourth rotation thereof. This action is possible because the armature 2L and contact 3L of relay CM remain closed, indicating that another character is to follow. As the sensing shaft continues to rotate, the distributor release contact 91 closes, and relay BB is operated. Armature 2R and contact 1R of relay BB included in the holding circuit of relay AN open, breaking the ground connection to the winding of relay AN which becomes inoperative. Armature 2R and contact 3R of relay BB close, completing the ground connection to the winding of relay CP which is operated. The armature 2R and contact 1R of relay CP open, removing the ground connection from the winding 90 of the sensing clutch magnet. The winding 90 of the sensing clutch magnet is deenergized.

Immediately before the distributor shaft comes to a stop following its third rotation during which the number character "1" is fed to the output terminals 95, 96, the distributor auxiliary contact 102 opens. Relay BA is made inoperative. Armature 8R and contact 7R of relay BA close, completing a ground connection to the winding of relay DE over a path including the armature 2R and contact 3R of relay DH. Relay DE operates, and contact 1R and armature 2R of relay DE open, breaking the ground connection to the winding of relay DH. Relay DH becomes inoperative. Contact 3L and armature 2L of relay DE also close, completing a ground connection to the operate winding of the stepping switch SS2A over the path including contact 1R and armature 2R of relay DG, armature 2L and contact 1L of relay DJ and armature 5L and contact 4L of relay DI. The operate winding of the stepping switch SS2A is energized, and the stepping switch SS2A is operated to count the second print type character, namely, the number character "1." As pointed out above, relay DE is a slow release type of relay. When relay DE becomes inoperative, contact 3L and armature 2L of relay DE open, breaking the ground connection to the operate winding of the stepping switch SS2A. The stepping switch is returned to a standby condition.

In the meantime, the five contacts of the sensing contacts 79 read the next group of perforations on the tape corresponding to the next character included in the incoming message signal, namely, the control function character Letters, at the point in the fourth rotation of the sensing shaft indicated by a cross-mark on the timing diagram. As shown in FIG. 2, the control function character Letters includes the first, second, third, fourth and fifth signal elements in a marking condition. The first, second, third and fifth contacts of the sensing contacts 79, previously closed, remain closed. In addition, the fourth contact of the sensing contacts 79 is closed. Fan relays AF/AE, AD, AC, AB and AA are, therefore, all operated. The armature 11R and contact 12R of relay AF, the armature 11R and contact 12R of relay AD, the armature 8R and contact 9R of relay AC, the armature 5R and contact 6R of relay AB and the armature 5R and contact 6R of relay AA are closed. A ground connection is completed to the first, second, third, fourth and fifth indicator lamps, indicating the reception by the section of the converter of the control function character Letters. In addition, a marking ground is placed on each of the five signal contacts of the distributor contacts 94 over the respective paths described above. A path is completed from ground to battery including the switch 97 located in the TWX to TEX circuit, lead 106, terminal 80' (at the bottom of FIG. 7b), terminal 80 (at the bottom of FIG. 6b), lead 105, armature 2L and contact 3L of relay AA, armature 2L and contact 3L of relay AB, armature 2L and contact 3L of relay AC, armature 2L and contact 3L of relay AD, armature 2L and contact 3L of relay AE and the winding of stunt relay AG. Stunt relay AG is operated, and the armature 5L and contact 4L of relay AG included in the operating circuit of relay DH open to prevent the relay DH from operating when relay BA is operated during the next rotation of the distributor shaft. By preventing relay DH from operating, relay DE is also prevented from operating. As a result, the stepping switch SS2A will not be operated to register a count of the non-print type of character, namely, the control function character Letters, transmitted by the transmtiting distributor.

The continued rotation of he sensing shaft in its fourth rotation cuses the distributor release contact 91 to open, and relay BB is made inoperative. Armature 5R and contact 4R of relay BB close, completing an operating circuit for the relay AM from battery to ground over a path including armature 5R and contact 4R of relay BB, contact 3L and armature 2L of relay AL, the winding of relay AM, contact 4R and armature 5R of relay AN, contact 4L and armature 5L of relay VB, contact 4L and armature 5L of relay VI, contact 7L and armature 8L of relay BD and contact 3R and armature 2R of relay AG. Armature 4L and contact 5L of relay AM open, preventing the energization of the winding 90 of the sensing clutch magnet upon the closing of the armature 2R and contact 1R of relay CP when relay CP is made inoperative. The sensing shaft completes the fourth rotation thereof and stops. Armature 8L and contact 7L of relay AM open, breaking the ground connection to the winding of relay CP. Relay CP is made inoperative. Armature 5R and contact 6R of relay AM close to prepare for the operation of relay AN when relay BA is operated during the next rotation of the distributor shaft. Armature 2R and contact 3R of relay AM close, completing a ground connection to the winding 92 of the distributor clutch magnet. The distributor shaft is made to begin its fourth rotation, and the control function character Letters is fed to the output terminals 95, 96, as a five-unit start-stop sequential signal. The rotation of the distributor shaft causes the distributor auxiliary contact 102 to close, and relay BA is operated. Armature 5L and contact 6L of relay BA close, and relay AN is operated in the manner described above. Armature 5R and contact 4R of relay AN open, breaking the ground connection to the winding of relay AM which is made inoperative. Armature 2R and contact 3R of relay AM open, removing the ground connection from the winding 92 of the distributor clutch magnet. The distributor shaft continues the fourth rotation thereof and stops.

When relay AN is operated, armature 2R and contact 1R of relay AN included in the holding circuit of the relay AL in both the TEX to TWX and TWX to TEX sections of the converter open. It is to be noted that contact 4R and armature 5R of relay AG connected in parallel with the contact 1R and armature 2R of relay AN are opened upon the previous operation of stunt relay AG. By making the relay AL in both sections of the converter inoperative, the converter is returned to the lower case or Letters status. As a result, the operation of the distributor clutch magnet and, therefore, the distributor shaft is again controlled by the operation of relay BB instead of by the operation of relay AM, as is the case when the section of the converter is in the upper case status. Armature 8L and contact 9L of relay AL open and armature 8L and contact 7L of relay AL close, returning the holding circuit of relay CP back through the armature 11R and contact 10R of relay BA. Armature 2L and contact 3L of relay AL open and remove battery from the winding of relay AM. Armature 4L and contact 5L of relay AM close, completing the ground connection to the winding 90 of the sensing clutch magnet and the sensing shaft is, in turn, made to begin its fifth rotation. The operation of the section of the converter upon the reception of the letter character "B" is exactly the same as was described in connection with the reception of the letter character "A." The only difference is that a different set of the sensing contacts 79 are closed, causing the proper arrangement of marking grounds to be applied through the contacts of fan relays AF/AE, AD, AC, AB and AA to the five signal contacts of the distributor contacts 94. The stepping switch SS2A is operated in the manner described to register a count of the print type character, namely, the letter character "B."

The TEX to TWX section of the converter, as well as the TWX to TEX section of the converter, will operate in the manner described above in connection with the timing diagram shown in FIG. 8 in response to other non-converting type characters in either lower or upper case status to transmit the characters without translation to the receiving page printer. Means are provided for counting each of the print type, lower or upper case characters by the operation of the stepping switch SS2A. When no more characters are available for transmission by the operation of a section of the converter, the transmitter stop contact 89 opens. Relay CM is made inoperative, and the armature 2L and contact 3L of relay CM open, preventing any further operation of the sensing clutch magnet by removing the ground connection completely from the winding 90 thereof. As a result, the sensing shaft and the distributor shaft will complete their rotations and stop. The sensing shaft and distributor shaft will remain stopped until relay CM is again operated, indicating that characters are again available for transmission by the operation of the section of the converter.

Reference has previously been made to the fact that the page printer 20 used in the TEX service accommodates sixty-nine characters in a line, while the page printer 21 used in the TWX service accommodates seventy-two characters in a line. As pointed out in connection with the functional block diagram of a section of the converter shown in FIG. 5, an end-of-line indicator is provided in each section of the converter to reconcile this difference of the respective page printers. Each section of the converter includes two similar stepping switches SS2A and SS2B which constitute the end-of-line indicator in the respective sections of the converter. Because the page printer 21 used in the TWX service accommodates more characters in a line than does the page printer 20 used in the TEX service, it would appear that no difficulty would be encountered in completing a direct operating circuit over which message signals could be sent to the page printer 21 of the TWX service from the page printer 20 of the TEX service. However, due to the translation of certain incoming characters by the operation of the TEX to TWX section of the converter in a manner to be described, it is possible that more characters may appear in a line before the appearance of the control function characters Carriage Return and Line Feed than can be accommodated in a line by the page printer 21 of the TWX service. It is, therefore, necessary to provide means in the TEX to TWX section of the converter for counting the print type characters included in the outgoing message signal fed to the page printer 21 of the TWX service to insure that only seventy-two characters are included in a line. This control is accomplished by the operation of the stepping switches SS2A and SS2B included in the TEX to TWX section of the converter which operate to bring about the automatic insertion of the control function characters Carriage Return and Line Feed in response to a specific character count.

Referring to the left hand side of the timing diagram shown in FIG. 9 and to the circuit diagram of the TEX to TWX section of the converter shown in FIG. 6, the relays DH and DE are operated in the manner described in connection with the timing diagram shown in FIG. 8 to cause the stepping switch SS2A to count each print type character included in the outgoing message signal transmitted by the transmitting distributor. As each print type character is counted by the operation of the stepping switch SS2A, one set of contacts of the stepping switch SS2A are closed and one set of contacts are opened. Thus, when the first character count is made, contact 21 and armature 31 of the stepping switch SS2A are closed and contact 11 and armature 1 are opened. Upon the second character count, contact 22 and armature 32 of the stepping switch SS2A are closed, and the contact 21 and armature 31 of the stepping switch SS2A open. Armature 2 and contact 12 open, and armature 1 and contact 11 close. Upon the third character count, contact 23 and armature 33 of the stepping switch SS2A close, and the contact 22 and armature 32 of the stepping switch SS2A open. Armature 3 and contact 13 open, and armature 2 and contact 12 close and so on. It will be assumed that the stepping switch SS2A has completed a count of eight print type characters. Contact 28 and armature 38 of the stepping switch SS2A are closed. Upon the rotation of the distributor shaft to transmit the ninth print type character, the relay DH is operated and is held in this condition by the holding circuit referred to above. Contact 3R and armature 2R of relay DH close and prepare for the relay DE to operate when relay BA becomes inoperative by the opening of the distributor auxiliary contact 102. When relay BA becomes inoperative, contact 7R and armature 8R of relay BA close. A ground connection is completed to the winding of relay DE through the armature 2R and contact 3R of relay DH. Relay DE is operated, and the armature 2R and contact 1R of relay DE included in the holding circuit of relay DH open. Relay DH becomes inoperative. Armature 2L and contact 3L of relay DE close, completing a ground connection to the operate winding of the stepping switch SS2A over the path including contact 1R and armature 2R of relay DG, armature 2L and contact 1L of relay DJ and armature 5L and contact 4L of relay DI. The operate winding of the stepping switch SS2A is energized, and the stepping switch SS2A operates to count the ninth print type character. Armature 2R and contact 3R of relay DH open, removing the ground connection from the winding of relay DE. However, because the relay DE is a slow release type of relay, the operation thereof will overlap the next operation of the relay BA.

When the stepping switch SS2A counts the ninth print type character, contact 29 and armature 39 of the stepping switch SS2A close. A ground connection is completed to the winding of relay DI through the contacts of the stepping switch SS2A. Relay DI operates, and the armature 5L and contact 6L of the relay DI close, completing a holding circuit for relay DI over the path including contact 1L and armature 2L of relay DJ, armature 2R and contact 1R of relay DG and contact 3L and armature 2L of relay DE. Contact 4L and armature 5L of relay DI open, removing the ground connection from the operate winding of the stepping switch SS2A. Armature 5R and contact 6R of relay DI close, completing a ground connection to the release winding of the stepping switch SS2A. The release winding of the stepping switch SS2A is energized, and the stepping switch SS2A is reset to its original starting condition. At the same time, contact 3R and armature 2R of relay DI close, completing a ground connection to the operate winding of stepping switch SS2B shown at the top, right hand side of FIG. 6e over the path including contact 1R and armature 2R of relay DJ. The operate winding of the stepping switch SS2B is energized, and the stepping switch SS2B operates to count the ninth print type character. When the slow release relay DE becomes inoperative, contact 3L and armature 2L of relay DE open. The ground connection is removed from the winding of relay DI, and relay DI becomes inoperative. Armature 5R and contact 6R of relay DI open, and the release winding of the stepping switch SS2A is deenergized. Contact 3R and armature 2R of relay DI also open, and the operate winding of the stepping switch SS2B is deenergized. The stepping switch SS2B is returned to a standby condition with the first set of contacts, namely, contact 21 and armature 31 of the stepping switch SS2B, closed. The operation of the stepping switches SS2A and SS2B will continue in the manner described so that each ninth print type character counted by the operation of the stepping switch SS2A is counted by the operation of the stepping switch SS2B. This operation will continue until a specific character count of seventy-two print type characters is completed. The functioning of the stepping switches SS2A and SS2B will follow the same procedure in counting the print type characters in both upper and lower case status. The operation of the section of the converter in the upper case, as defined by the operation of relay AL, does not alter the operation of the stepping switches SS2A and SS2B described above. For the sake of description, the operation of the stepping switches SS2A and SS2B when the section of the converter is in an upper case status is shown on the right hand side of the timing diagram given in FIG. 9.

The operation of the stepping switches SS2A and SS2B, as shown in the timing diagram given in FIG. 9, has been described in connection with the circuit diagram of the TEX to TWX section of the converter given in FIG. 6. However, the operation of the stepping switches SS2A and SS2B constituting the end-of-line indicator included in the circuit of the TWX to TEX section of the converter shown in FIG. 7 is generally the same. The end-of-line indicator included in the TWX to TEX section of the converter must insure that no more than sixty-nine print type characters are included in a line of characters in a message signal fed to the page printer 20 of the TEX service. Instead of counting each ninth print type character by the operation of the stepping switch SS2B, as is the case in the TEX to TWX section of the converter, the contacts of the stepping switch SS2A included in the TWX to TEX section of the converter are arranged so that every ninth print type character counted by the operation of the stepping switch SS2A is counted by the operation of the stepping switch SS2B. The stepping switches SS2A and SS2B continue to be operated in the manner described until a character count of sixty-nine print type characters has been made. The only difference in the operation of the end-of-line indicators included in the respective sections of the converter is that in the TEX to TWX section of the converter each ninth print type character is counted by the operation of the stepping switch SS2B, while in the TWX to TEX section of the converter each tenth print type character is counted by the operation of the stepping switch SS2B.

The operation of a section of the converter in both upper and lower case status when the control function character Carriage Return is received as part of the incoming message signal will now be described in connection with the timing diagram shown in FIG. 10. The operation of a section of the converter in the lower case status is shown on the left hand side of the timing diagram, while the operation in the upper case status is shown on the right hand side of the timing diagram. Similar means are provided in the respective sections of the converter for returning the stepping switches SS2A and SS2B to their original starting conditions when the control function character Carriage Return is received. This is, of course, necessary to insure that the end-of-line indicators included in the respective sections of the converter will make a proper count of the print type characters included in the succeeding line of characters forwarded for reception by the page printer of the TEX or TWX services. The operation of the circuit diagram of the TEX to TWX section of the converter shown in FIG. 6 will be referred to in connection with the timing diagram given in FIG. 10. However, it is to be again understood that the description applies equally well to the operation of the TWX to TEX section of the converter shown in FIG. 7.

Assuming, at first, that the TEX to TWX section of the converter is in a lower case status and that a condition corresponding to the control function character Carriage Return has been established in the five contacts of the sensing contacts 79 at the point indicated by a cross-mark in the first rotation of the sensing shaft shown in the timing diagram, the relay AB is operated. This is true because, as shown in FIG. 2, the control function character Carriage Return includes the fourth signal element as marking and the first, second, third and fifth signal elements as spacing. As a result, the fourth contact of the sensing contacts 79 is closed, completing a ground connection to the winding of relay AB. A circuit is completed from ground to battery including the switch 97 located in the TWX to TEX section of the converter, terminal 80′ (at the bottom of FIG. 7b), terminal 80 (at the bottom FIG. 6b), lead 105, armature 2L and contact 1L of relay AA, armature 2R and contact 3R of relay AB, armature 2R and contact 1R of relay AC, armature 5R and contact 4R of relay AD, armature 11L and contact 10L of relay AF, armature 5L and contact 4L of relay BB and the winding of stunt relay AI. Stunt relay AI is operated. It is assumed that relay CP has been operated by the rotation of the sensing shaft during which the condition corresponding to the control function character Carriage Return has been established in the sensing contacts 79. It is also assumed that the relay DE has been operated by the operation of relay DH during the rotation of the distributor shaft by which a print type character immediately preceding the control function character Carriage Return in the incoming message signal has been transmitted. The relay DE functions to energize the operate winding of the stepping switch SS2A, and the stepping switch SS2A counts the print type character. The distributor shaft is made to begin its rotation to bring about the transmission of the control function character Carriage Return in the manner described above. As the distributor shaft continues its rotation, the distributor auxiliary contact 102 closes to operate relay BA. Upon the operation of relay BA, relay CP becomes inoperative to allow the sensing shaft to begin another rotation. The above circuit operations of a section of the converter in a lower case status were described in connection with the timing diagram given in FIG. 8.

When relay AI is operated, armature 5R and contact 6R of relay AI close, completing a ground connection to the winding of relay DJ, shown at the top, left hand side of FIG. 6f, over a path including contact 7R and armature 8R of relay AL and armature 2L and contact 1L of relay DG. Relay DJ is operated. Armature 5L and contact 4L of relay AI included in the operating circuit of relay DH open and prevent relay DH from operating upon the closing of contact 9L and armature 8L of relay BA when relay BA operates. This action prevents a count from being registered by the stepping switch SS2A, due to the fact that a non-print type of character, namely, the control function character Carriage Return, is being transmitted by the transmitting distributor. When relay DJ operates, contact 1L and armature 2L of relay DJ open. The ground connection to the operate winding of the stepping switch SS2A is broken, and the stepping switch SS2A, previously operated to count the print type character preceding the control function character Carriage Return in the incoming message signal, is returned to a standby condition. Contact 6R and armature 5R of relay DJ close, completing a ground connection to the release winding of the stepping switch SS2A. The release winding of stepping switch SS2A is energized, causing the stepping switch SS2A to return to its original starting condition. Armature 2R and contact 3R of relay DJ also close, completing a ground connection to the release winding of the stepping switch SS2B. The release winding of the stepping switch SS2B is energized and the stepping switch SS2B is returned to its original starting condition. It should be noted that contact 1R and armature 2R of relay DJ open at this time to prevent the operate winding of the stepping switch SS2B from being energized if the control function character Carriage Return is received at the same time that the stepping switch SS2A is counting a ninth print type character transmitted by the transmitting distributor.

When relay DJ operates, armature 8R and contact 9R of relay DJ close, completing a ground connection to the winding of relay DG, shown at the top, left hand side of FIG. 6f. Armature 2L and contact 3L of relay DG close, providing a holding circuit for relay DG over a path including armature 5R and contact 6R of relay AI and contact 7R and armature 8R of relay AL. Armature 2L and contact 1L of relay DG open, removing the ground connection from the winding of relay DJ. Relay DJ is made inoperative. Contact 6R and armature 5R of relay DJ and contact 3R and armature 2R of relay DJ open, removing the ground connection from the release windings of the stepping switches SS2A and SS2B, respectively. The release windings of the respective stepping switches SS2A and SS2B are deenergized. As the sensing shaft continues its rotation, relay BB is operated. Relay CP is operated, and the winding 92 of the distributor clutch magnet is energized to cause the distributor shaft to begin another rotation. Armature 5L and contact 4L of relay BB in the operating circuit of stunt relay AI open. However, this action has no effect on the operation of stunt relay AI since contact 12L and armature 11L of relay BA are now closed. This is true because the closed contacts of relay BA are in parallel with the open contacts of relay BB in the operating circuit of stunt relay AI. When relay BA becomes inoperative due to the opening of the distributor auxiliary contact 102 by the continued rotation of the distributor shaft, contact 12L and armature 11L of relay BA open. Stunt relay AI becomes inoperative. Armature 5R and contact 6R of relay AI open, and the ground connection is removed from the winding of relay DG. Relay DG becomes inoperative. The section of the converter will, thereafter, continue to operate in the manner described in connection with the timing diagram given in FIG. 8. The reception of the control function Carriage Return as a part of the incoming message signal has caused the stepping switches SS2A and SS2B constituting the end-of-line indicator to be reset to their original starting conditions.

The operation of the section of the converter in the upper case status, shown at the right hand side of the timing diagram given in FIG. 10, differs from that of the section of the converter in the lower case status only in that the relay DJ is operated by the closing of the contact 9R and armature 8R of relay AM included in the operating circuit of relay DJ. Relay AM is operated through the closed contacts of the selectively operated fan relays AF/AE, AD, AC, AB and AA in the manner described above. The contact 7R and armature 8R of relay AL which are closed to complete the operating circuit for relay DJ when the section of the converter is in the lower case status are opened by the operation of relay AL when the section of the converter is in the upper case status. As the armature 8R and contact 9R of relay AM are connected in parallel with the armature 8R and contact 7R of relay AL, the operating circuit for relay DJ is completed by the closing of the contact 9R and armature 8R of relay AM when the section of the converter is in the upper case status.

The operation of a section of the converter in lower case status when the end-of-line indicator comprising the stepping switches SS2A and SS2B completes a count of print type characters indicating that the end of a line has been reached will now be described in connection with the timing diagram shown in FIG. 11. The operation of the section of the converter is such that the stepping switches SS2A and SS2B are reset to their original starting conditions. In addition, the control function characters Carriage Return and Line Feed are automatically inserted in the outgoing message signal so that the receiving page printer is returned to the left hand margin to begin the printing of subsequent characters included in the outgoing message signal on a new line. The description will again be given in connection with the circuit diagram of the TEX to TWX section of the converter shown in FIG. 6. However, the description also applies to the operation of the circuit diagram of the TWX to TEX section of the converter shown in FIG. 7. The difference in the operation of the respective sections of the converter is based for the most part on the different count of print type characters obtained by the end-of-line indicators included in the respective sections of the converter. In the case of the TEX to TWX section of the converter, the count will be seventy-two characters to a line, while in the TWX to TEX section of the converter the count will be sixty-nine characters to a line.

When the sixty-third print type character has been counted by the operation of the stepping switch SS2A in the TEX to TWX section of the converter, the stepping switch SS2B is operated for the seventh time. Each operation of the stepping switch SS2B causes a new set of contacts thereof to close and the set of contacts thereof previously closed to open. Thus, when the stepping switch SS2B completes its first count, armature 31 and contact 21 of the stepping switch SS2B are closed. Upon the second count by the stepping switch SS2B, armature 32 and contact 22 of the stepping switch SS2B close, and the armature 31 and contact 21 open. Upon the third count by the stepping switch SS2B, armature 33 and contact 23 of the stepping switch SS2B closes, and the armature 32 and contact 22 open and so on. When the stepping switch SS2B completes the seventh count, armature 37 and contact 27 of the stepping switch SS2B are closed, and the remaining contacts of the stepping switch SS2B are open. It will be assumed that the stepping switches SS2A and SS2B have completed a count of the seventieth print type character transmitted by the operation of the transmitting distributor. Armature 37 and contact 27 of the stepping switch SS2B are closed. Armature 37 and contact 27 of the stepping switch SS2A are also closed indicating the count of the seventh print type character following the operation of the stepping switch SS2B to register the sixty-third print type character. Armature 7 and contact 17 of stepping switch SS2A are open. It will also be assumed that the next character following the seventieth print type character is a control function character other than Carriage Return or Space. This condition has been selected to show that, once the seventieth count has been made by the stepping switches SS2A and SS2B, relay BJ is prepared for operation when the sensing shaft continues its rotation to read the perforations on the tape corresponding to the next character in the incoming message signal. Relay BJ will operate whether or not the next character is a print type character.

As the sensing shaft continues its rotation, a condition corresponding to the control function character received following the seventieth print type character is established in the five contacts of the sensing contacts 79. Relay BB and, in turn, relay CP are operated by the closing of the distributor release contact 91. Armature 2L and contact 3L of relay BB close. The winding 92 of the distributor clutch magnet is energized to cause the distributor shaft to continue into a further rotation for transmitting the control function character. Contact 1R and armature 2R of relay CP open, removing the ground connection from the winding 90 of the sensing clutch magnet. The sensing shaft, however, continues to complete a full rotation. Armature 5L and contact 6L of relay CP close and prepare relay BJ, shown at the top of FIG. 6c, to operate when the stepping switch SS2A registers a count of the seventieth print type character. The stepping switch SS2A is operated in the manner described above through the operation of relays DH and DE to count the seventieth print type character immediately preceding the control function character in the incoming message signal. A circuit is completed from ground to battery including armature 5L and contact 4L of relay AP (at the left of FIG. 6b), lead 109, armature 37 and contact 27 of stepping switch SS2B, lead 110, contact 18 and armature 8 of stepping switch SS2A, contact 27 and armature 37 of stepping switch SS2A, lead 111, contact 10R and armature 11R of relay AP, contact 7R and armature 8R of relay BK, armature 5L and contact 6L of relay CP and the winding of relay BJ. Relay BJ is operated. The fan relays AF/AE, AD, AC, AB and AA are selectively operated according to the arrangement of signal elements in the control function character read by the five contacts of the sensing contacts 79. Either the Letters stunt relay AG, Figures stunt relay AH or Blank stunt relay AJ will be operated through the closed contacts of the fan relays AF/AE, AD, AC, AB and AA in the manner described in connection with the timing diagram given in FIG. 8. The operation of either stunt relay AG, AH, or AJ, which each include normally closed contacts in the operating circuit of relay DH, prevents relays DH and DE from operating. As a result, the stepping switch SS2A is not operated to count the control function character transmitted by the operation of the transmitting distributor.

As the distributor shaft continues its rotation to bring about the transmission of the control function character received, the distributor auxiliary contact 102 closes. Relay BA is operated which, in turn, causes relay CP to become inoperative. Contact 1R and armature 2R of relay CP close, completing the ground connection to the winding 90 of the sensing clutch magnet. The energization of the winding 90 of the sensing clutch magnet causes the sensing shaft to begin the next rotation thereof during which a condition corresponding to the next or seventy-first print type character included in the incoming message signal is established in the five contacts of the sensing contacts 79. It will be assumed that the next character is a non-converting, print type character. The continued rotation of the sensing shaft causes the operation of relay BB which, in turn, causes the operation of the distributor clutch magnet. The distributor shaft is made to begin another rotation to bring about the transmission of the seventy-first print type character. While the distributor shaft completes its rotation to bring about the transmission of the seventy-first print type character, the sensing shaft also completes its rotation. Relay CP is operated by the operation of relay BB, and the contact 1R and armature 2R of relay CP open to remove the ground connection from the winding 90 of the sensing clutch magnet. The winding 90 of the sensing clutch magnet is deenergized.

As the distributor shaft continues its rotation to bring about the transmission of the seventy-first print type character, the distributor auxiliary contact 102 closes, and relay BA is operated. Relay CP becomes inoperative, and the winding 90 of the sensing clutch magnet is energized by the closing of contact 1R and armature 2R of relay CP. The sensing shaft is made to begin another rotation. Relay BB is operated which, in turn, causes the operation of relay CP. As the sensing shaft continues to rotate, a condition corresponding to the arrangement of signal elements in the next character is established in the five contacts of the sensing contacts 79. It will be assumed that the next character is a print type character, and that, therefore, the seventy-second print type character has been received. The operation of relay BB causes the winding 92 of the distributor clutch magnet to be energized. The distributor shaft begins a rotation to bring about the transmission of the seventy-second print type character. When relay CP operates, contact 6R and armature 5R of relay CP close to prepare relay BK to operate when the stepping switch SS2A registers a count for the seventy-first print type character. The stepping switch SS2A is thereafter operated by the operation of the relays DH and DE in the manner described above to count the seventy-first print type character. Armature 8 and contact 18 of the stepping switch SS2A open, breaking the ground connection to the winding of relay BJ. Relay BJ is made inoperative. A circuit is completed from ground to battery including contact 4L and armature 5L of relay AP, lead 109, armature 37 and contact 27 of stepping switch SS2B, lead 110, contact 28 and armature 38 of stepping switch SS2A, lead 112, contact 10L and armature 11L of relay AP, armature 2L and contact 1L of relay AG, armature 2L and contact 1L of relay AH, armature 2L and contact 1L of relay AI, armature 2L and contact 1L of relay AJ, armature 8L and contact 7L of relay BG, armature 5L and contact 4L of relay BC, armature 5R and contact 6R of relay CP and the winding of relay BK. Relay BK is operated. It should be noted that if the character received following the seventy-first print type character had been a non-print type character instead of a print type character, the normally closed contacts of stunt relay AG, AH, AI or AJ just mentioned as being included in the operating circuit of relay BK would be open. Relay BK, therefore, cannot operate until a condition corresponding to a print type character is established in the five contacts of the sensing contacts 79 and the stepping switches SS2A and SS2B have completed a count of seventy-one print type characters.

When relay BK operates, contact 6L and armature 5L of relay BK close to prepare relay BL to operate when armature 5L and contact 6L of relay BA close. Armature 2R and contact 1R of relay BK open and prevent a ground connection from being completed to the winding 90 of the sensing clutch magnet when armature 2R and contact 1R of relay CP close upon relay CP being made inoperative. As the distributor shaft continues to rotate to transmit the seventy-second print type character, the distributor auxiliary contact 102 closes, and relay BA is operated. Armature 5L and contact 6L of relay BA close, completing the ground connection to the winding of relay BL over the path including armature 5L and contact 6L of relay BK. Relay BL operates, and contact 3L and armature 2L of relay BL close to complete a holding circuit for the relay BL over a path including contact 1R and armature 2R of relay AP. Armature 2R and contact 3R of relay BL close and prepare for the operation of the forced carriage return relay VI, at the bottom-right of FIG. 6c, when relay BA becomes inoperative. Armature 11R and contact 10R of relay BA included in the holding circuit of relay CP open, removing the ground connection from the winding of relay CP. Relay CP becomes inoperative, and armature 2R and contact 1R of relay CP close. Because armature 2R and contact 1R of relay BK are open, the winding 90 of the sensing clutch magnet is not energized. As a result, the sensing shaft will complete the rotation during which a condition corresponding to the seventy-second print type character was established in the five contacts of the sensing contacts 79 and stop. Armature 8L and contact 9L of relay BA included in the operating circuit of relay DH are closed, and relay DH is operated. The operation of relay DH causes the operation of relay DE when the armature 8R and contact 7R of relay BA close upon relay BA being made inoperative by the opening of the distributor auxiliary contact 102. The operate winding of the stepping switch SS2A is energized by the operation of relay DE in the manner described above, and the stepping switch SS2A is operated to count the seventy-second print type character.

When relay BA becomes inoperative, armature 5L and contact 4L of relay BA close to complete an operating circuit for the forced carriage return relay VI over a path including lead 113, armature 2R and contact 3R of relay BL, contact 4R and armature 5R of relay BP, armature 2R and contact 1R of relay BE, contact 2R and armature 1R of relay BG and armature 2L and contact 1L of relay AK. The forced carriage return relay VI operates, and the contact 3L and armature 2L of relay VI close, completing a holding circuit for relay VI including lead 114 and contact 1L and armature 2L of relay BP. Contact 9R and armature 8R of relay VI close, completing a ground connection to the winding of relay AO/AP over a path including contact 10R and armature 11R of relay BP. Armature 2R and contact 3R of relay VI close, completing a ground connection to the winding of relay DJ over a path including armature 2L and contact 1L of relay DG. Relay DJ is operated. Armature 5R and contact 6R of relay VI close, completing a ground connection to the winding of slave memory relay WF. Relay WF operates. Various contacts of the slave memory relay WF close to complete marking grounds to the signal contacts of the distributor contacts 94. The manner in which the marking grounds are applied to the signal contacts of the distributor contacts 94 by the operation of the slave memory relay WF will be described in greater detail in connection with the timing diagram given in FIG. 15. It is sufficient to state at this time that the operation of the slave memory relay WF causes the proper marking grounds to be applied to the signal contacts of the distributor contacts 94 such that the control function characters Carriage Return and Line Feed are transmitted by the operation of the transmitting distributor. When relay AP is operated by the operation of the forced carriage return relay VI, armature 8L and contact 7L of relay AP open. This action prevents the completion of a ground connection to the winding 90 of the sensing clutch magnet, insuring that the sensing shaft will not rotate during the insertion of the control function characters Carriage Return and Line Feed in the outgoing signal by the operation of the section of the converter. Contact 10L and armature 11L of relay AP included in the operating circuit of relay BK open, removing the ground connection from the winding of relay BK. Relay BK becomes inoperative. Armature 2R and contact 1R of relay AP included in the holding circuit of relay BL also open, removing the ground connection from the winding of relay BL. Relay BL becomes inoperative. Armature 5L and contact 6L of relay AP close, completing a ground connection to the winding 92 of the distributor clutch magnet over a path including contact 4L and armature 5L of relay BM. This action starts the distributor shaft rotating to bring about the transmission of two control function characters Carriage Return and, thereafter, two control function characters Line Feed. The operation of the slave memory relay WF in a manner to be described causes the proper marking grounds to be applied to the signal contacts of the distributor contacts 94 so that the control function characters are properly inserted in the outgoing message signal.

When relay DJ is operated by the operation of relay VI, armature 8R and contact 9R of relay DJ close. A ground connection is completed to the winding of relay DG, and relay DG operates. Upon the operation of relay DG, armature 2L and contact 3L of relay DG close, completing a holding circuit for relay DG through contact 3R and armature 2R of relay VI. Contact 1L and armature 2L of relay DG open, removing the ground connection from the winding of relay DJ. Relay DJ becomes inoperative. Relay DG is held operated so long as the forced carriage return relay VI is operated, preventing the operation of the stepping switch SS2A during this period. The armature 2R and contact 1R of relay DG included in the operating circuit of the operate winding of the stepping switch SS2A are held in an open condition.

In addition to causing the operation of relay DG, the operation of relay DJ by the operation of the forced carriage return relay VI causes armature 2L and contact 1L of relay DJ to open. This action removes the ground connection from the operate winding of the stepping switch SS2A, and the stepping switch SS2A is returned to a standby condition. Following the operation of the relay DG, the open condition of the contact 1R and armature 2R of relay DG will maintain the stepping switch SS2A in a standby condition. The operation of relay DJ also causes armature 5R and contact 6R of relay DJ to close. A ground connection is completed to the release winding of the stepping switch SS2A, and the release winding is energized. This action causes the stepping switch SS2A to return to its original starting condition. At the same time, armature 2R and contact 3R of relay DJ close, and a ground connection is completed to the release winding of the stepping switch SS2B. The release winding of the stepping switch SS2B is energized, and the stepping switch SS2B is reset to its original starting condition. It should be noted that the contact 1R and armature 2R of relay DJ open during this period, preventing the completion of a ground connection to the operate winding of the stepping switch SS2B. The stepping switch SS2B is, therefore, prevented from registering a count during this period. When relay DJ is made inoperative by the operation of relay DG, armature 5R and contact 6R of relay DJ and armature 2R and contact 3R of relay DJ open, removing the ground connection from the release windings of the stepping switches SS2A and SS2B, respectively. The release windings of the respective stepping switches are deenergized, and the stepping switches are set in their original starting or standby conditions. When the transmission of the inserted control function characters Carriage Return and Line Feed has been completed, the forced carriage return relay VI becomes inoperative. Armature 2R and contact 3R of relay VI included in the holding circuit of relay DG open, removing the ground connection from the winding of relay DG. Relay DG becomes inoperative. Relay AO/AP is also made inoperative. Armature 8L and contact 7L of relay AP close, completing the ground connection to the winding 90 of the sensing clutch magnet. The winding 90 of the sensing clutch magnet is energized, and the sensing shaft is made to begin a rotation during which a condition corresponding to the next character included in the incoming message signal is established in the five contacts of the sensing contacts 79. The section of the converter will, thereafter, operate in the manner described in connection with the timing diagram given in FIG. 8.

In reviewing the operation of a section of the converter as described in connection with the timing diagram given in FIG. 11, it should be noted that the relay BK will operate only when the reception of the seventy-second print type character is indicated. If this condition does not exist, relay BK is not operated. If the control function character Carriage Return should be received by the section of the converter as a part of the incoming message signal following the seventieth or seventy-first print type character, the stepping switches SS2A and SS2B will be automatically reset to their original starting conditions in the manner described in connection with the timing diagram given in FIG. 10.

While the description of the timing diagram given in FIG. 11 has been made in connection with the circuit diagram of the TEX to TWX section of the converter shown in FIG. 6, it must be remembered that the description also applies to the circuit of the TWX to TEX section of the converter shown in FIG. 7. The forced carriage return relay in the TWX to TEX sections of the converter is identified by the capital letters YJ/YK. The operation of and the functions performed by the forced carriage return relay YJ/YK in the TWX to TEX section of the converter are the same as the operation of and functions performed by the forced carriage return relay VI in the TEX to TWX section of the converter. The TWX to TEX section of the converter is operated in the same manner as the TEX to TWX section of the converter to reset the stepping switches SS2A and SS2B to their original starting conditions and to insert the control function characters Carriage Return and Line Feed in the outgoing message signal, in response to a specific character count by the operation of the stepping switches SS2A and SS2B. The main difference in the operation of the TWX to TEX section of the converter as compared to the operation of the TEX to TWX section of the converter is the fact that in the TWX to TEX section of the converter the stepping switches SS2A and SS2B are set to complete a count of sixty-nine print type characters in a line. As described above, in the TEX to TWX section of the converter the stepping switches SS2A and SS2B are set to complete a count of seventy-two print type characters.

In the TWX to TEX section of the converter the stepping switch SS2B completes six counts corresponding to a count of sixty print type characters by the operation of the stepping switches SS2A and SS2B. Contact 26 and armature 36 of the stepping switch SS2B are closed. This action prepares for relay BJ to operate when the sixty-seventh print type character has been counted by the operation of the stepping switch SS2A. When the sixty-ninth print type character has been indicated, the operation of the TWX to TEX section of the converter is thereafter the same as that of the TEX to TWX section of the converter when the seventy-second print type character has been indicated. The stepping switches SS2A and SS2B comprising the end-of-line indicator included in the TWX to TEX section of the converter are reset to their original starting conditions, and the control function characters Carriage Return and Line Feed are automatically inserted in the outgoing message signal.

The operation of a section of the converter in the upper case status when the stepping switches SS2A and SS2B complete a count of print type characters indicating the end of a line is shown in the timing diagram given in FIG. 12. The operation of a section of the converter in the upper case status when this condition exists is similar to the operation of a section of the converter in the lower case status, as was described in connection with the timing diagram given in FIG. 11. The affect of the reception of a non-print type character has not been illustrated in the timing diagram given in FIG. 12. However, if such a character is received as part of the incoming message signal, the operation of a section of the converter will be similar to that which occurs when the section of the converter is in a lower case status. In the upper case status, the relay AL is always operated making the relays AM and AN effective to control the operation of the sensing and distributor shafts. The operation of a section of the converter in the upper case status differs from that of the section of the converter in the lower case status, therefore, only in that the relay AL is operated to bring about the proper control functions which define the operation of the section of the converter in the upper case status. When the stepping switches SS2A and SS2B have completed a count of seventy-two print type characters in the TEX to TWX section of the converter or a count of sixty-nine print type characters in the TWX to TEX section of the converter, the character representing the seventy-second or sixty-ninth print type character, respectively, is transmitted by the operation of the transmitting distributor followed by the inserted control function characters Carriage Return and Line Feed. In both cases, the stepping switches SS2A and SS2B are reset to their original starting conditions.

The operation of a section of the converter in the lower or upper case status when the control function character Space is received as the last or next to last character in a line will now be described in connection with the timing diagram given in FIG. 13. It is to be understood, however, that minor alterations may be made to cause the occurrence of the actions to be described when the character Space is received at any other point in a line. While the character Space is not actually printed by the operation of a receiving page printer, the reception of the control function character Space does cause a receiving page printer to skip a character position in a line. In effect, an open character position is printed by the operation of the page printer. The control function character Space must, therefore, be considered as a print type character. When a section of the converter in the lower case status receives the control function character Space as the last or next to last print type character that can be accommodated in a line, the control function character Space is first transmitted by the operation of the transmitting distributor. This action is followed by the transmission of the inserted control function characters Carriage Return and Line Feed. On the other hand, when the control function character Space is received by a section of the converter in the upper case status as the last or next to last print type character that can be accommodated in a line, the control function character Space is deleted from the outgoing message signal. In the operation of the TEX to TWX section of the converter, only the control function characters Carriage Return and Line Feed are inserted in the outgoing message signal. However, as shown in the chart of TWX to TEX conversion functions shown in FIG. 4, the TWX to TEX section of the converter is operated to first insert the control function character Letters in the outgoing message signal and, thereafter, the control function characters Carriage Return and Line Feed. This action is necessary because, as was pointed out above, the page printer 21 of the TWX service is arranged to shift from an upper case to lower case status in response to the control function character Space. However, the page printer 20 of the TEX service will shift from an upper case to lower case status only when the control function character Letters is received. The insertion of the control function character Letters by the operation of the TWX to TEX section of the converter is, therefore, necessary to cause the page printer 20 of the TEX service to shift from an upper case to lower case status, the page printer 21 of the TWX service having been shifted from an upper case to a lower case status upon the transmission of the control function character Space. The operation of a section of the converter in the lower case status is shown on the left hand side of the timing diagram, while the operation of a section of the converter in the upper case status is shown on the right hand side of the timing diagram.

Referring to the left hand side of the timing diagram given in FIG. 13 and to the circuit diagram of the TEX to TWX section of the converter shown in FIG. 6, it will be assumed that the seventieth print type character has been received. It will also be assumed that the sensing shaft has been made to begin a further rotation during the which a condition corresponding to the control function character Space is established in the five contacts of the sensing contacts 79. As shown in FIG. 2, the control function character Space comprises the third signal element as marking and the first, second, fourth and fifth signal elements as spacing. The third contact of the sensing contacts 79 is closed, and fan relay AC is operated. A circuit is completed from ground to battery including the switch 97 located in the TWX to TEX section of the converter, terminal 80' (at the bottom of FIG. 7b), terminal 80 (at the bottom of FIG. 6b), lead 105, armature 2L and contact 1L of relay AA, armature 2R and contact 1R of relay AB, armature 5R and contact 6R of relay AC, armature 8R and contact 7R of relay AD, armature 5R and contact 4R of relay AF and the winding of stunt relay AK. Relay AK is operated. It will be further assumed that the operation of relays DH and DE in the manner described above has caused the stepping switch SS2A to count the seventieth print type character. Contact 27 and armature 37 of the stepping switch SS2A are closed, and the relay BJ is operated in the manner described in connection with the timing diagram given in FIG. 11. Armature 7L and contact 8L of relay AK and contact 1R and armature 2R of relay BJ in the operating circuit of the winding 90 of the sensing clutch magnet open. This action prevents the energization the winding 90 of the sensing clutch magnet when the armature 2R and contact 1R of relay CP close upon relay CP being made inoperative by the operation of relay BA. Armature 5L and contact 6L of relay AK and armature 5L and contact 6L of relay BJ in the operating circuit of relay BL close to prepare for the operation of the relay BL when relay BA is operated by the closing of the distributor auxiliary contact 102. Armature 2L and contact 3L of stunt relay AK close to prepare for the operation of the forced carriage return on space relay VJ.

The continued rotation of the distributor shaft to bring about the transmission of the control function character Space causes the distributor auxiliary contact 102 to close, and relay BA is operated. Armature 11R and contact 10R of relay BA in the holding circuit of relay CP open, and relay CP is made inoperative. As pointed out above, the closing of the armature 2R and contact 1R of relay CP has no affect on the operation of the sensing clutch magnet since the circuit of the winding 90 of the sensing clutch magnet remains broken by the open condition of the contacts of relays AK and BJ. Armature 5L and contact 6L of relay BA close, completing a ground connection to the winding of relay BL over a path including contact 6L and armature 5L of relay BJ and contact 6L and armature 5L of relay AK. Relay BL is operated, and contact 3L and armature 2L of relay BL close. A holding circuit is completed for the relay BL through the contact 1R and armature 2R of relay AP. Armature 8L and contact 9L of relay BA close, and relay DH is operated in the manner described above. Armature 2R and contact 3R of relay DH close to prepare for the operation of relay DE when relay BA becomes inoperative. The continued rotation of the distributor shaft causes the distributor auxiliary contact 102 to open, and relay BA becomes inoperative.

A circuit is completed from ground to battery including armature 5L and contact 4L of relay BA, lead 113, armature 2R and contact 3R of relay BL, contact 4R and armature 5R of relay BP, armature 2R and contact 1R of relay BE, contact 2R and armature 1R of relay BG, armature 2L and contact 3L of relay AK and the winding of relay VJ. The carriage return on space relay VJ is operated, and contact 9L and armature 8L of relay VJ close. A holding circuit is completed for relay VJ over a path including contact 9L and armature 8L of relay VJ, lead 114 and contact 1L and armature 2L of relay BP. Armature 8R and contact 9R of relay VJ close, completing a ground connection to the winding of relay AO/AP through the contact 10R and armature 11R of relay BP. Relay AO/AP is operated. Armature 5R and contact 6R of relay VJ close, completing a ground connection to the winding of relay DJ through armature 2L and contact 1L of relay DG. Relay DJ is operated. Armature 5L and contact 6L of relay VJ close, completing a ground connection to the winding of slave memory relay WF. Relay WF is operated, and the proper marking grounds are applied through the closed contacts of relay WF to the signal contacts of the distributor contacts 94 in a manner to be described in connection with the timing diagram given in FIG. 15. The continued rotation of the distributor shaft brings about the transmission of the inserted control function characters Carriage Return and Line Feed.

When relay AO/AP is operated, armature 8L and contact 7L of relay AP in the operating circuit of the winding 90 of the sensing clutch magnet open, preventing the operation of the sensing clutch magnet and, therefore, the rotation of the sensing shaft during the insertion of the control function characters Carriage Return and Line Feed in the outgoing message signal. Armature 11R and contact 10R of relay AP in the operating circuit of relay BJ open, and relay BJ becomes inoperative. Armature 2R and contact 1R of relay AP in the holding circuit of relay BL also open, and relay BL becomes inoperative. Armature 5L and contact 6L of relay AP close, completing a ground connection to the winding 92 of the distributor clutch magnet through contact 4L and armature 5L of relay BM. The winding 92 of the distributor clutch magnet is energized, and the distributor shaft is made to rotate to bring about the transmission of two control function characters Carriage Return and, thereafter, two control function characters Line Feed.

The operation of the relay DJ causes the release windings of the stepping switches SS2A and SS2B to be energized in the manner described in connection with the timing diagram given in FIG. 11. The stepping switches SS2A and SS2B are both reset to their respective original starting conditions. When the control function characters Carriage Return and Line Feed have been inserted in the outgoing message signal, the forced carriage return on space relay VJ becomes inoperative. Relay DG which is operated by the operation of relay DJ becomes inoperative. When relay VJ becomes inoperative, contact 9R and armature 8R of relay VJ in the operating circuit of relay AO/AP open. Relay AO/AP becomes inoperative, and armature 8L and contact 7L of relay AP in the operating circuit of the winding 90 of the sensing clutch magnet close. The sensing shaft begins a further rotation during which a condition corresponding to the next character in the incoming message signal is established in the sensing contacts 79.

If the control function character Space is not received as the seventy-first print type character and any other print type character is received instead, relay BJ becomes inoperative and relay BK operates in the manner described in connection with the timing diagram given in FIG. 11. If the control function character Space is, thereafter, received as the seventy-second print type character, stunt relay AK is operated and relay VJ is, in turn, operated by the closing of the armature 2L and contact 3L of relay AK. The circuit operations which follow are the same as were described above when the control function character Space is received as the seventy-first print type character.

The operation of the TWX to TEX section of the converter when the control function character space is received as the sixty-eighth or sixty-ninth print type character is similar to that of the TEX to TWX section of the converter when the control function character space is received as the seventy-first or seventy-second print type character. The forced carriage return on space relay has been identified in the circuit diagram of the TWX to TEX section of the converter by the capital letters YL/YM. However, the operation of the relay YL/YM is similar to that of the forced carriage return on space relay VJ in the TEX or TWX section of the converter.

Referring to the right hand side of the timing diagram given in FIG. 13, the operation of a section of the converter in the upper case status when the control function character Space is received as the last or next to last print type character that can be accommodated in a line will be described. It will again be assumed that the seventy-first print type character received by the TEX to TWX section of the converter is the control function character Space. Fan relay AC is operated by the closing of the third contact of the sensing contacts 79. The stunt relay AK is operated by the same operating circuit which causes the operation of relay AK when the section of the converter is in a lower case status. Since the section of the converter is in an upper case status, relay AL is operated. A circuit is completed from ground to battery including armature 2R and contact 3R of relay AK, the winding of memory relay VH (at the bottom of FIG. 6a, armature 2R and contact 1R of relay VB, armature 8L and contact 7L of relay DJ, armature 2L and contact 1L of relay VJ, contact 7L and armature 8L of relay VI, lead 115, contact 1R and armature 2R of relay BP, armature 2L and contact 3L of relay AL and contact 4R and armature 5R of relay BB. Relay VH is operated. It is also assumed that the stepping switches SS2A and SS2B have been operated by the operation of relays DH and DE in the manner described above to count the seventieth print type character. This action causes relay BJ to be operated. Armature 7L and contact 8L of relay AK and contact 1R and armature 2R of relay BJ in the operating circuit of the winding 90 of the sensing clutch magnet open to prevent the operation of the sensing clutch magnet when armature 2R and contact 1R of relay CP close upon relay CP becoming inoperative. Armature 5R and contact 6R of relay BJ close to prepare for the operation of the forced carriage return on space relay VJ when the memory relay VH is operated. However, since the relay VH has operated, the contact 7R and armature 6R of relay VH are closed. A ground connection is completed to the winding of relay VJ over a path including armature 5R and contact 6R of relay BJ, contact 4R and armature 5R of relay BP, armature 2R and contact 1R of relay BE, contact 2R and armature 1R of relay BG and armature 2L and contact 3L of relay AK. Relay VJ is operated. Contact 9L and armature 8L of relay VJ close, completing a holding circuit for relay VJ including lead 114 and contact 1L and armature 2L of relay BP. Contact 1L and armature 2L of relay VJ in the operating circuit of relay VH open, and relay VH becomes inoperative. Armature 5R and contact 6R of relay VJ close, and relay DJ is operated. The circuit operations, thereafter, are the same as were outlined in the description of the operation of a section of the converter in the lower case status. The operation of relay DJ causes the release windings of the stepping switches SS2A and SS2B to be energized, and the stepping switches SS2A and SS2B are each reset to their original starting conditions.

In the operation of the TEX to TWX section of the converter, the operation of the forced carriage return on space relay VJ brings about the insertion of the control function characters Carriage Return and Line Feed in the outgoing message signal. In the operation of the TWX to TEX section of the converter, the operation of the forced carriage return on space relay YL/YM in addition to causing the insertion of the control function characters Carriage Return and Line Feed also causes the insertion of the control function character Letters in the outgoing message signal so that the page printer of the TEX service will be placed in a lower case status. The memory relay YI, at the bottom of FIG. 7a, in the TWX to TEX section of the converter corresponds to the relay VH in the TEX to TWX section of the converter. When the stunt relay AK is operated in the TWX to TEX section of the converter upon the reception of the control function character Space, relay YI is operated. The circuit operations, thereafter, are similar to the circuit operations which occur in the TEX to TWX section of the converter when the relay VH is operated. When the control function character Space is received as the seventy-second print type character in a line by the TEX to TWX section of the converter or as the sixty-ninth print type character by the TWX to TEX section of the converter, the operation of a section of the converter is the same as that to be described in connection with the timing diagram shown in FIG. 15. This is true because the control function character Space in the upper case status is a converting type character, as indicated in the charts given in FIGS. 3 and 4.

As previously described, certain of the characters included in the International No. 2 code alphabet used by the page printer 20 in the TEX service are not included in the Arrangement C code alphabet used by the page printer 21 in the TWX service, and vice versa. The characters which are used in both of the respective code alphabets have been defined as non-converting type characters. The characters which are not used in both of the respective code alphabets have been defined as converting type characters. Reference has been made to the fact that all of the converting type characters are characters in the Figures or upper case status. The various upper case converting type characters included in the International No. 2 code alphabet are shown in the chart given in FIG. 3, while the various upper case converting type characters included in the Arrangement C code alphabet are shown in the chart given in FIG. 4. In each case, the converting type characters received by a section of the converter are translated into a form suitable for reception by the receiving page printer. For example, the colon symbol which is the letter character "C" in the upper case in the International No. 2 code alphabet does not appear at all in the Arrangement C code alphabet. The TEX to TWX section of the converter is operated so that the symbol character Colon appears as the word COLON spelled out in the outgoing message signal fed to the page printer 21 of the TWX service. In a similar manner, the sections of the converter operate to translate each of the converting type characters in the respective code alphabets into a corresponding combination of characters that can be received by the receiving page printer.

When a condition corresponding to a converting type character is established in the five contacts of the sensing contacts 79, it is necessary that the rotation of the sensing shaft be stopped until the translation of the converting type character into a corresponding combination of characters has been completed. Marking grounds must be applied to the signal contacts of the distributor contacts 94 in an order such that the combination of characters representing the translation of a converting type character is inserted in the outgoing message signal a character at a time by the operation of the transmitting distributor. The operation of a section of the converter in translating a converting type character received into a corresponding combination of characters for transmission to a receiving page printer is shown in the timing diagram given in FIG. 14. The operation of fan relays AF/AE, AD, AC, AB and AA by the selective closing of the five contacts of the sensing contacts 79 has been described. Referring to the left hand side of the circuit diagrams shown in FIGS. 6a and 7a, there is shown a grouping of the contacts of the fan relays AF/AE, AD, AC, AB and AA. It has already been shown how various paths are completed through this grouping of the contacts of the fan relays AF/AE, AD, AC, AB and AA to operate the stunt relay AG, stunt relay AH, stunt relay AI and so on. For each condition established in the sensing contacts 79 corresponding to the different upper case characters which may be included in an incoming message signal, the contacts of the fan relays AF/AE, AD, AC, AB and AA will be operated in such an order that a ground connection is completed to a particular one of the output connections of the grouping of the contacts of these relays. The output connections available are identified in FIGS. 6a and 7a by letter characters. The character indicates that a ground connection will be completed to the output connection identified when a condition corresponding to that particular character in upper case status is established in the sensing contacts 79. As may be seen by referring to FIGS. 6a and 7a, there is an output connection for each letter character and control function character included in the International No. 2 and Arrangement C code alphabets, respectively.

Figure 14:
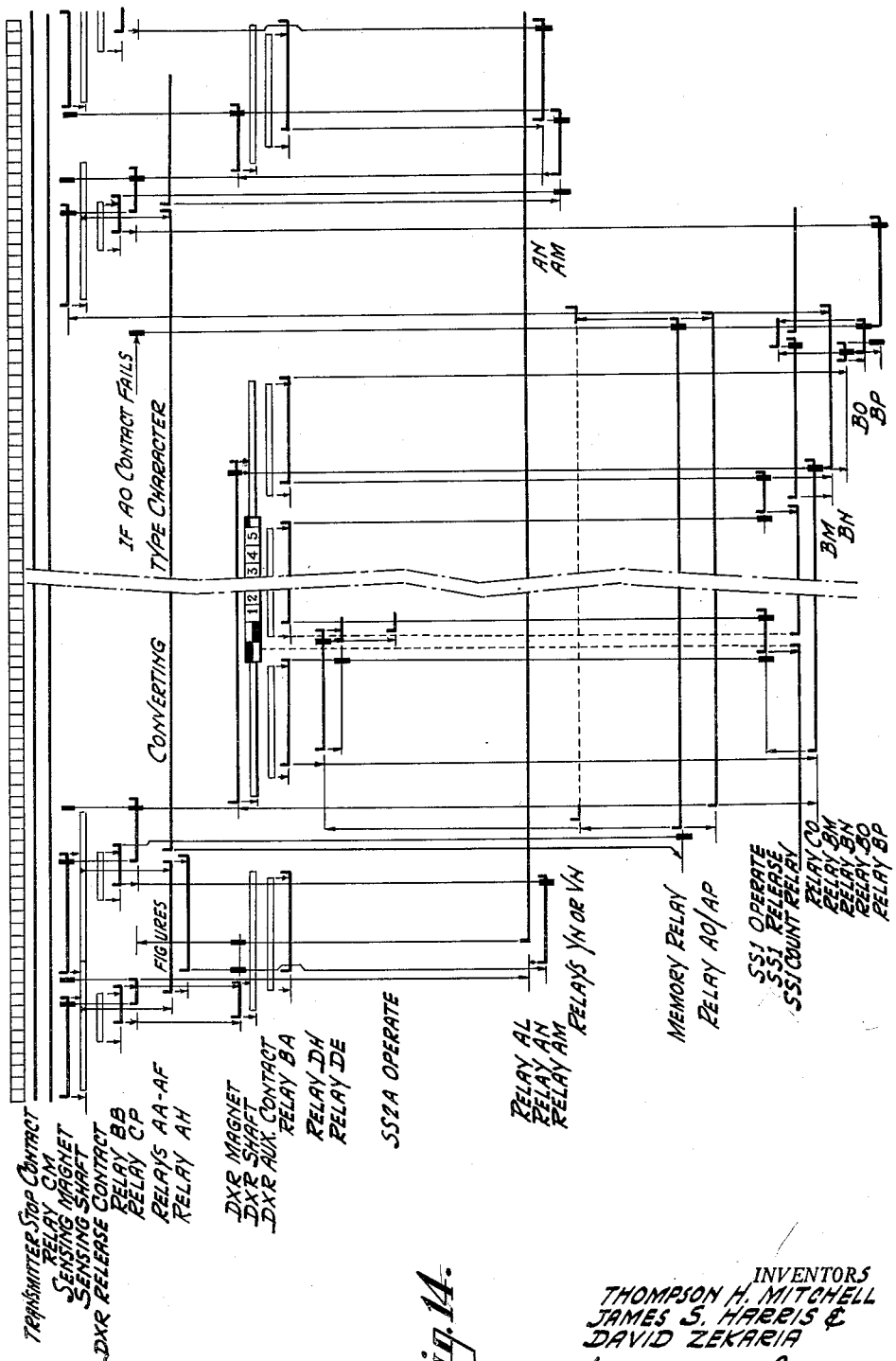

Referring to the timing diagram given in FIG. 14 and to the circuit diagram of the TEX to TWX section of the converter shown in FIG. 6, it will be assumed that, during the first rotation of the sensing shaft indicated in the timing diagram, a condition corresponding to the control function character Figures is established in the sensing contacts 79. As described in connection with the timing diagram given in FIG. 8, the first, second, fourth and fifth contacts of the sensing contacts 79 are closed. Relays AF/AE, AD, AB and AA are operated, and a ground connection is completed through the grouping of the contacts of relays AF/AE, AD, AC, AB and AA to the output connection thereof connected to the winding of relay AH. Relay AH is operated. The control function character Figures is transmitted by the operation of the transmitting distributor in the manner described above, and relay AL is operated also in the manner described above to define the operation of the TEX to TWX section of the converter in upper case status. The sensing shaft will continue into a second rotation during which a condition corresponding to the next character in the incoming message signal is established in the sensing contacts 79. For the sake of description, it will be assumed that the character following the control function character Figures in the incoming message signal is the symbol character Colon.

As shown in FIG. 2, the upper case symbol character Colon, letter character "C" in the upper case, comprises the second, third and fourth signal elements marking, while the first and fifth elements are spacing. The second, third and fourth contacts of the sensing contacts 79 are closed, and fan relays AD, AC and AB are operated. A circuit is completed from ground to battery including the switch 97 located in the TWX to TEX section of the converter, terminal 80' (at the bottom of FIG. 7b), terminal 80 (at the bottom of FIG. 6b), lead 105, armature 2L and contact 1L of relay AA, armature 2R and contact 3R of relay AB, armature 2R and contact 3R of relay AC, armature 2R and contact 3R of relay AD, armature 2L and contact 1L of relay AF, lead 120, the windings of the memory relays WJ and WK which are connected in parallel, armature 2R and contact 1R of relay VB, armature 8L and contact 7L of relay DJ, armature 2L and contact 1L of relay VJ, contact 7L and armature 8L of relay VI, lead 115, contact 1R and armature 2R of relay BP, armature 2L and contact 3L of relay AL and contact 4R and armature 5R of relay BB. It is to be noted that the ground connection is completed via the output connection of the grouping of the contacts of the fan relays AF/AE, AD, AC, AB and AA identified by the letter character "C." Relays WJ and WK are operated. The operating circuit for the relays WJ and WK can be completed only when the armature 2L and contact 3L of relay AL are closed by the operation of the relay AL, defining the operation of the section of the converter in upper case status. The continued rotation of the sensing shaft causes the distributor release contact 91 to open, causing relay BB to become inoperative. The contact 4R and armature 5R of relay BB in the operating circuit of the relays WJ and WK close, permitting the operation of the relays WJ and WK by the operating circuit described above.

When memory relay WJ is operated, armature 2L and contact 3L of relay WJ close. A ground connection is completed to the winding of relay AO/AP through contact 10R and armature 11R of relay BP, and relay AO/AP is operated. Contact 7L and armature 8L of relay AP in the circuit of the winding 90 of the sensing clutch magnet open, preventing the operation of the sensing clutch magnet and, therefore, further rotation of the sensing shaft. As shown in the timing diagram of FIGURE 14 and as will become evident from the following description, relay AP remains operated during the period in which a translation of the received converting type character into a corresponding combination of characters is completed. The sensing clutch magnet remains inoperative during this period. The sensing shaft forming a part of the sensing mechanism is not rotated, and, as a result, the feeding of characters to the sensing contacts 79 and therefore the movement of the tape is halted for the period of the translation. As indicated in FIGURE 1, the reperforator 25 continues to record the incoming characters by perforating the tape 27. Since the characters are temporarily not being read from the tape 27 by the sensing contacts 79, the tape will back-up as additional characters are perforated therein. It is customary to provide a storage bin suitable for holding the tape in a protected fashion between the reperforator 25 and sensing mechanism 28 of FIGURE 1. Such storage facilities are standard equipment on commercial reperforator transmitter distributors and a detailed description thereof is unnecessary. The tape merely gathers in the storage facility from the reperforator 25 until the characters are again read therefrom by sensing contacts 79, following the period of translation.

Armature 8R and contact 7R of relay AO in the holding circuit of relay CP open upon the operation of relay AO/AP, and relay CP becomes inoperative. Armature 5L and contact 6L of relay AP close, completing a ground connection to the winding 92 of the distributor clutch magnet. The operation of the distributor clutch magnet causes the distributor shaft to begin a series of rotations during which a combination of characters corresponding to the received converting type character Colon are transmitted. It is also, of course, necessary that the signal contacts of the distributor contacts 94 be disassociated from the sensing contacts 79 to prevent the condition established in the sensing contacts 79 from being repeated to the signal contacts of the distributor contacts 94 in the manner described in connection with the timing diagram given in FIG. 8. When relay AO/AP is operated, the normally closed contacts of relay AO through which the condition in the sensing contacts 79 is repeated to the signal contacts of the distributor contacts 94 by the selective operation of the fan relays AF/AE, AD, AC, AB and AA are opened. At the same time, other contacts of relay AO close, connecting the signal contacts of the distributor contacts 94 to circuits to be described.

Figure 6D:
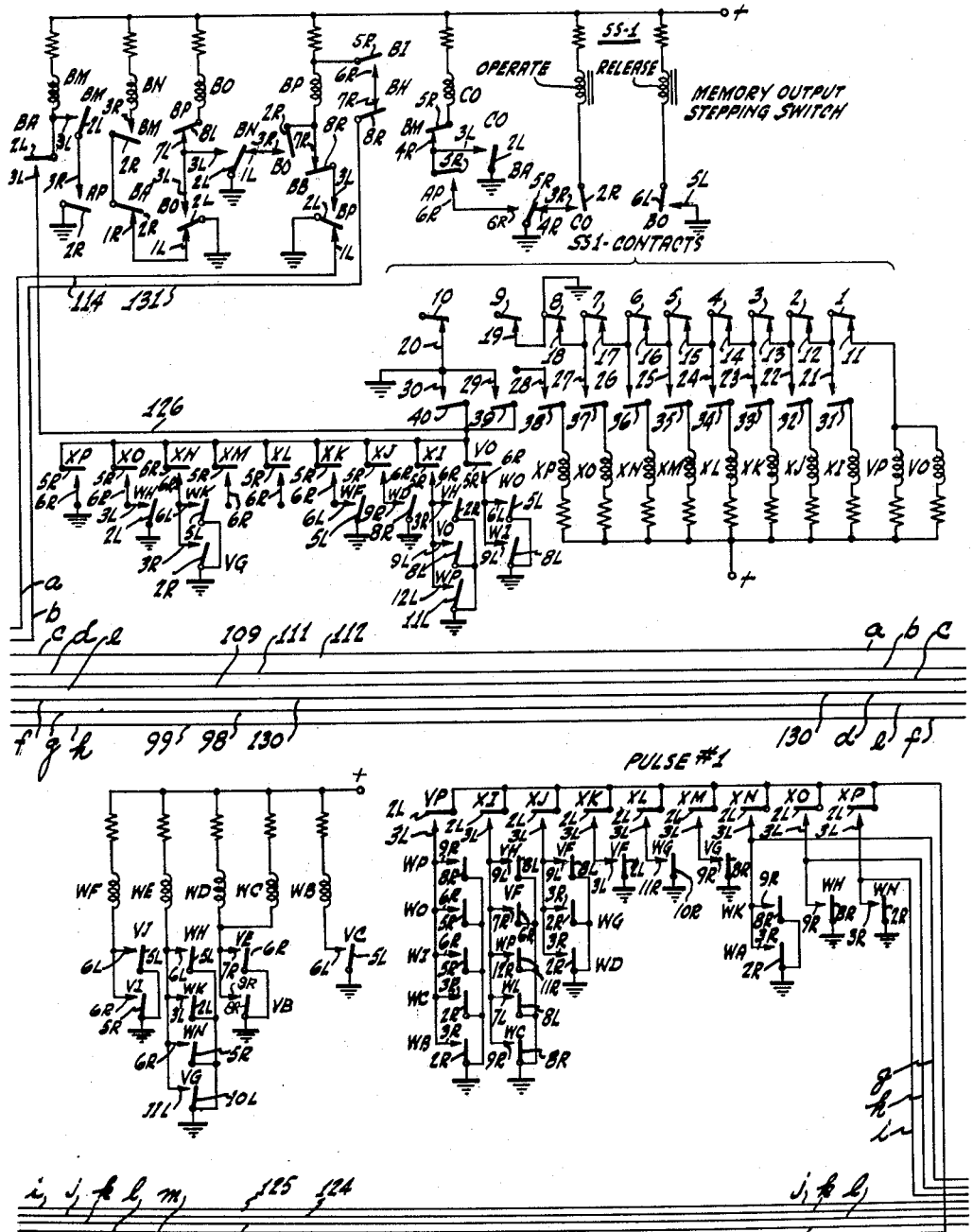

It is evident that some means must be provided for applying the proper marking grounds to the signal contacts of the distributor contacts 94 to obtain the desired arrangement of signal elements in the character transmitted during each rotation of the distributor shaft during the completion of the translation. A memory output stepping switch SS1, at the top-right of FIG. 6d, is used to perform this function. The operation of the stepping switch SS1 defines the successive characters included in a combination of characters inserted in the outgoing message signal in place of the converting type character received. A relay CO functions as an on-off control for the stepping switch SS1. When relay AO/AP operates, contact 6R and armature 5R of relay AP in the operating circuit of relay CO close. As the distributor shaft continues its first rotation in response to the operation of relay AO/AP, the distributor auxiliary contact 102 is closed. Relay BA is operated. Contact 6R and armature 5R of relay BA close, completing a ground connection to the winding of relay CO over a path including contact 6R and armature 5R of relay AP and contact 4R and armature 5R of relay BM. Relay CO is operated, and contact 3L and armature 2L of relay CO close, completing a holding circuit for relay CO. Contact 3R and armature 2R of relay CO in the operating circuit of the operate winding of the stepping switch SS1 are also closed.

Figure 6E:
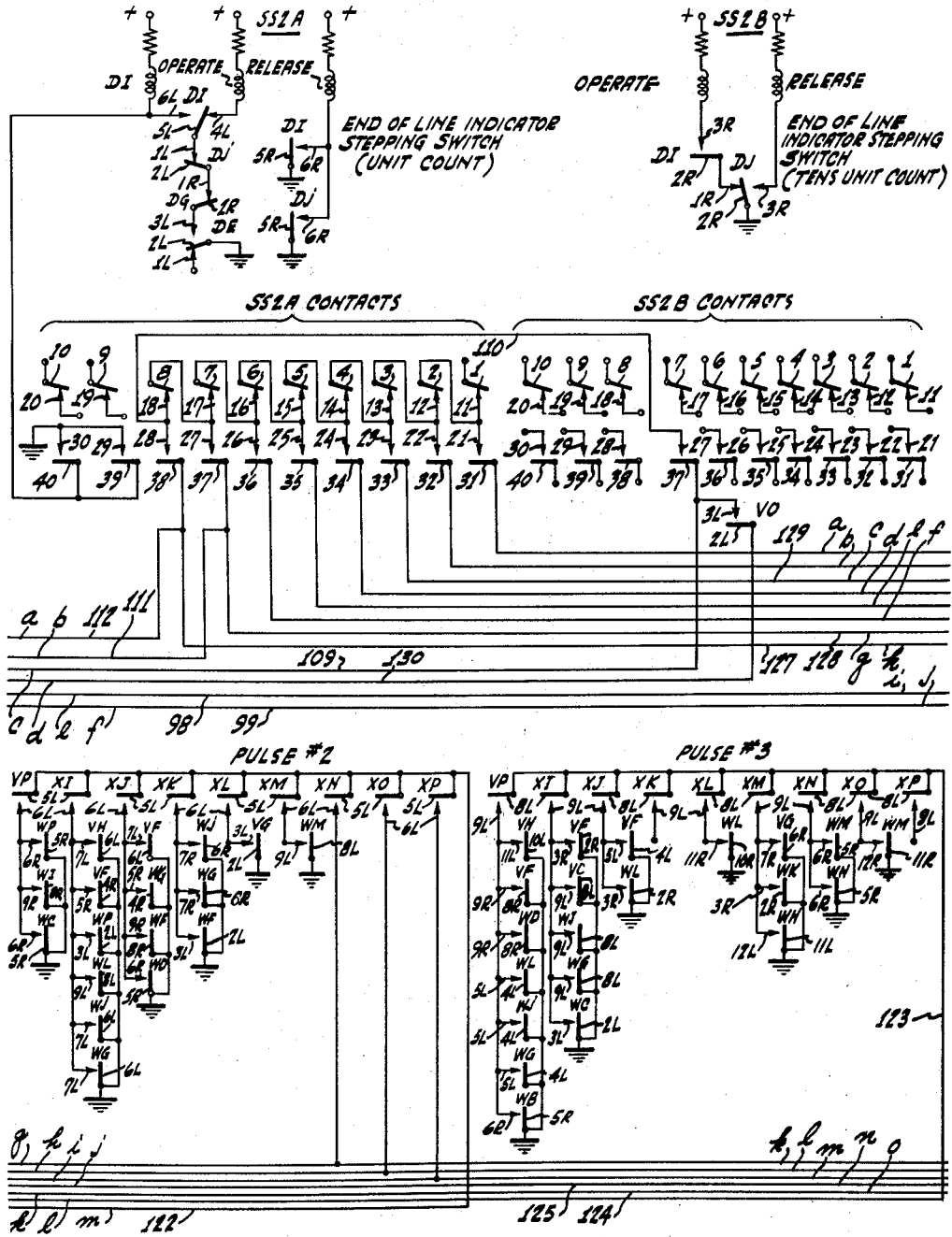

Referring to the memory output stepping switch SS1, it may be seen that, when the stepping switch SS1 is in the original starting condition thereof, a ground connection is completed through various contacts including armature 1 and contact 11 of the stepping switch SS1 to the windings of count relays VO and VP which are connected in parallel. Upon the first operation of the stepping switch SS1, contact 21 and armature 31 of the stepping switch SS1 close, and the ground connection is completed to the winding of count relay XI. Count relay XI is operated, and the opening of the contact 11 and armature 1 of the stepping switch SS1 causes count relays VP and VO to become inoperative. Upon the third operation of the stepping switch SS1, count relay XJ is operated, and count relay XI becomes inoperative. Each additional operation of the stepping switch SS1 causes the operation of one of the count relays XK through XP in succession. As each count relay is operated, the previously operated count relay becomes inoperative. Arranged along the bottom of FIGURES 6d, 6e and 6f are five groups of relay contacts marked Pulse 1 through Pulse 5. The first group of relay contacts marked Pulse 1 is connected to the first signal contact of the distributor contacts 94 over a path including lead 121, contact 3L and armature 2L of relay AO and lead 100. It will be remembered that relay AO/AP is operated by the operation of the memory relay WJ, indicating that the converting type, symbol character Colon has been received and that a translation is required. The second group of relay contacts marked Pulse 2 is connected to the second signal contact of the distributor contacts 94 over a path including lead 122, contact 6L and armature 5L of relay AO and lead 101. The third group of relay contacts marked Pulse 3 is connected to the third signal contact of the distributor contacts 94 over a path including lead 123, contact 9L and armature 8L of relay AO and lead 107. The fourth group of relay contacts marked Pulse 4 is connected to the fourth signal contact of the distributor contacts 94 over a path including lead 124, contact 3R and armature 2R of relay AO and lead 103. The fifth group of relay contacts marked Pulse 5 is connected to the fifth signal contact of the distributor contacts 94 over a path including lead 125, contact 6R and armature 5R of relay AO and lead 104. Across the top of each of the five groups of relay contacts Pulse 1 through Pulse 5 are arranged from left to right contacts of the count relays VP and XI through XP. As pointed out above, these relays are operated in succession by the operation of the stepping switch SS1. Beneath each set of contacts of the count relays VP and XI through XP in each of the five groups of relay contacts Pulse 1 through Pulse 5 are arranged normally open contacts of the various memory relays and of the slave memory relay WF operated by the forced carriage return relays VI and VJ.

In the example given, it has been shown how the memory relays WJ and WK are operated in response to the reception of the symbol character Colon. The contacts of the relay WJ in each of the five groups of relay contacts Pulse 1 through Pulse 5 are closed. The relays VO and VP, which are normally operated, will be operated during the first rotation of the distributor shaft. Contact 3L and armature 2L of relay VP in the first group of relay contacts Pulse 1 are closed. However, none of the relay contacts in the circuit located beneath the closed contacts of relay VP in the first group of relay contacts Pulse 1 are also closed, and a ground connection is not completed to the first signal contact of the distributor contacts 94. Contact 6L and armature 5L of relay VP in the second group of relay contacts Pulse 2, contact 3R and armature 2R of relay VP in the fourth group of relay contacts Pulse 4 and contact 6R and armature 5R of relay VP in the fifth group of relay contacts Pulse 5 are also closed. As none of the relay contacts in the respective circuits located beneath the closed contacts of count relay VP in the groups of relay contacts Pulse No. 2, 4 and 5 are also closed, a ground connection is not completed to the second, fourth and fifth signal contacts of the distributor contacts 94. However, the closed condition of the contact 9L and armature 8L of relay VP in the third group of relay contacts Pulse 3 causes upon the operation of memory relay WJ a path to be completed from ground to the third signal contact of the distributor contacts 94 including armature 4L and contact 5L of relay WJ, contact 9L and armature 8L of relay VP, lead 123, contact 9L and armature 8L of relay AO and lead 107. A marking ground will, therefore, appear only on the third signal contact of the distributor contacts 94, and the continued rotation of the distributor shaft causes the transmission of a character, namely, the control function character Space, comprising the first, second, fourth and fifth signal elements as spacing and the third signal element as marking. It is to be noted that it is necessary that the control function character Space be first transmitted to cause the page printer 21 of the TWX service to shift into a lower case status so that it can receive the lower case letter characters to follow in the combination of characters inserted in the outgoing message signal.

As the distributor shaft completes its first rotation, the distributor auxiliary contact 102 opens. Relay BA becomes inoperative. Contact 4R and armature 5R of relay BA close, completing a ground connection to the operate winding of the stepping switch SS1 through the contact 3R and armature 2R of relay CO. The operate winding of the stepping switch SS1 is energized, and the stepping switch SS1 is operated. Armature 1 and contact 11 of the stepping switch SS1 open, removing the ground connection from the windings of count relays VO and VP. Relays VO and VP become inoperative. Contact 21 and armature 3R of the stepping switch SS1 are closed, and the ground connection is now completed through the contacts of the stepping switch SS1 to the winding of count relay XI. The contacts of count relay XI in each of the groups of relay contacts Pulse 1 through Pulse 5 are closed, and the contacts of relay VP, previously closed, are opened. The continued rotation of the distributor shaft into the second rotation thereof causes the distributor auxiliary contact 102 to close, and relay BA is again operated. Contact 4R and armature 5R of relay BA open, and the operate winding of the stepping switch SS1 is deenergized. A circuit is now completed from ground through the second group of relay contacts Pulse 2 to the second signal contact of the distributor contacts 94 over a path including armature 6L and contact 7L of relay WJ, contact 6L and armature 5L of relay XI, lead 122, contact 6L and armature 5L of relay AO and lead 101. A ground connection is also completed to the third signal contact of the distributor contacts 94 through the third group of relay contacts Pulse 3 over a path including armature 8L and contact 9L of relay WJ, contact 9L and armature 8L of relay XI, lead 123, contact 9L and armature 8L of relay AO and lead 107. A further ground connection is completed to the fourth signal contact of the distributor contacts 94 through the fourth group of relay contacts Pulse 4 over a path including armature 10L and contact 11L of relay WJ, contact 12L and armature 11L of relay XI, lead 124, contact 3R and armature 2R of relay AO and lead 103. A marking ground is, therefore, applied to the second, third and fourth signal contacts of the distributor contacts 94. As the distributor shaft continues its second rotation, a character, namely, the letter character "C," comprising the second, third and fourth signal elements as marking and the first and fifth signal elements as spacing is transmitted by the operation of the transmitting distributor. As the distributor shaft completes its second rotation, the distributor auxiliary contact 102 opens, and relay BA becomes inoperative. Contact 4R and armature 5R of relay BA close, and the stepping switch SS1 is operated to complete the ground connection to the winding of count relay XJ. Relay XJ is operated, and relay XI becomes inoperative. The closing of the contacts of relay XJ in the groups of relay contacts Pulse 1 through Pulse 5 causes marking grounds to be applied to a different group of the signal contacts of the distributor contacts 94.

As the distributor shaft continues its third rotation and relay XJ is operated, a marking ground is applied to the fourth and fifth signal contacts of the distributor contacts 94. The letter character "O" is transmitted by the operation of the transmitting distributor. In the same manner, relay XK is operated during the fourth rotation of the distributor shaft, and the letter character "L," comprising the second and fifth signal elements as marking is transmitted. Relay XL is operated during the fifth rotation of the distributor shaft, and the letter character "O" comprising the fourth and fifth signal elements as marking is transmitted. Relay XM is operated during the sixth rotation of the distributor shaft, and the letter character "N" comprising the third and fourth signal elements as marking is transmitted. Upon the seventh rotation of the distributor shaft, relay XN is operated. The control function character Figures comprising the first, second, fourth and fifth signal elements as marking is transmitted. It is to be noted that the inclusion of the control function character Figures at the end of the translation is necessary to cause the page printer 21 of the TWX service to return to upper case status. Upon the completion of the translation, therefore, the word COLON spelled out character by character will have been inserted in the outgoing message signal in place of the single symbol character Colon received.

The operation of the section of the converter to bring about the translation of any of the other converting type characters will be similar to that described above. Upon the reception of each of the converting type characters, a particular one of the memory relays arranged to the left along the bottom of FIG. 6a is operated. The contacts of the memory relay, which has been operated, in the groups of relay contacts Pulse 1 through Pulse 5 are closed. As the count relays VP and XI through XP are operated in succession by the stepping switch SS1, marking grounds will be applied during each rotation of the distributor shaft to the signal contacts of the distributor contacts 94. The manner in which the marking grounds are applied to the signal contacts of the distributor contacts 94 during each rotation of the distributor shaft will depend on the particular combination of characters which are inserted in the outgoing message signal in place of the converting type character received.

The termination of the translation of a converting type character into a combination of characters is defined by the operation of relay BM. The translation just described includes seven characters, namely, the control function character Space, the letter characters C, O, L, O, N and the control function character Figures. Normally open contacts of count relays VO and XI through XP are arranged in parallel in the operating circuit of relay BM, at the top-left side of FIG. 6d. As described above, upon the seventh operation of the stepping switch SS1 to bring about the transmission of the control function character Figures, relay XN is operated. A ground connection is completed to the winding of relay BM over a path including armature 5L and contact 6L of the memory relay WK, contact 6R and armature 5R of relay XN, lead 126 and contact 3L and armature 2L of relay BA. It is to be noted that relay BA will operate following the start of the seventh rotation of the distributor shaft, and, therefore, relay BM is operated. Contact 3L and armature 2L of relay BM close, and a holding circuit for relay BM is completed through contact 3R and armature 2R of relay AP. Contact 4R and armature 5R of relay BM in the holding circuit of relay CO open, and relay CO becomes inoperative. Contact 4L and armature 5L of relay BM in the operating circuit of the winding 92 of the distributor clutch magnet open, and, as a result, the distributor shaft will complete its seventh rotation and stop. As the distributor shaft completes its seventh rotation, relay BA becomes inoperative. A ground connection is completed to the winding of relay BN over a path including armature 2L and contact 1L of relay BO, contact 1R and armature 2R of relay BA and armature 2R and contact 3R of relay BM. Relay BN is operated. Armature 2L and contact 3L of relay BN close, completing a ground connection to the winding of relay BO through contact 7L and armature 8L of relay BP. Relay BO is operated. Armature 2L and contact 3L of relay BO close, completing a holding circuit for relay BO through contact 7L and armature 8L of relay BP. Armature 2L and contact 1L of relay BO open, and relay BN becomes inoperative. A ground connection is completed to the winding of relay BP over a path including armature 2L and contact 1L of relay BN and contact 3R and armature 2R of relay BO. Relay BP is operated. Armature 2L and contact 3L of relay BP close, completing a holding circuit for relay BP through armature 8R and contact 7R of relay BB.

The operation of relay BP causes armature 2R and contact 1R of relay BP in the operating circuit of the memory relays WJ and WK to open. Relays WJ and WK become inoperative. Armature 2L and contact 3L of relay WJ in the operating circuit of relay AO/AP open, and relay AO/AP becomes inoperative. This latter action completes the circuits by which a condition established in the sensing contacts 79 corresponding to a non-converting type character can be repeated to the signal contacts of the distributor contacts 94 in the manner described in connection with the timing diagram given in FIG. 8. It is to be noted that when relay AO/AP becomes inoperative, the contacts of relay AO through which the circuits were completed from the groups of relay contacts Pulse 1 through Pulse 5 to the respective signal contacts of the distributor contacts 94 are opened. Contact 7L and armature 8L of relay BP in the holding circuit of relay BO open, and relay BO becomes inoperative. Contact 3R and armature 2R of relay AP in the holding circuit of relay BM open, and relay BM becomes inoperative. Contact 7L and armature 8L of relay AP in the operating circuit of the winding 90 of the sensing clutch magnet close, and the sensing shaft is made to begin a rotation during which a condition corresponding to the next character in the incoming message signal is established in the sensing contacts 79. The continued rotation of the sensing shaft causes the distributor release contact 91 to close, and relay BB is operated. Contact 7R and armature 8R of relay BB in the holding circuit of relay BP open, and relay BP becomes inoperative. During the time that the relay BO is operated, the contact 5L and armature 6L of relay BO in the operating circuit of the release winding of the stepping switch SS1 are closed, completing a ground connection to the release winding of the stepping switch SS1. The stepping switch SS1 is reset to its original starting condition in which armature 1 and contact 11 are closed and count relays VO and VP are operated.

While the circuit operations which occur upon the completion of a translation have been described upon the completion of a particular translation, namely, the translation of the symbol character Colon, it may be seen by an examination of the circuit diagram in FIG. 6 that similar circuit operations will occur upon the completion of the translation of the other converting type characters. When a translation is completed in each case, a ground connection is completed to the winding of relay BM through the closed contacts of one of the count relays VO, XI through XP. Relay BM is operated, and the same circuit operations described above will follow.

The operation of the stepping switches SS2A and SS2B to count the number of print type characters in a line has been previously described. Each of the combinations of characters representing a translation of a converting type character received will include print type characters. In the example given above, the first six characters of the combination of characters inserted in the outgoing message signal as a translation of the symbol character Colon, namely, the control function character Space and the five letter characters in the word COLON, are print type characters and must be counted by the operation of the stepping switches SS2A and SS2B. It will be remembered that the operation of the stepping switches SS2A and SS2B is controlled by the operation of relays DH and DE. When relay AO/AP is operated at the start of a translation, armature 2L and contact 3L of relay AP in the operating circuit of relay DH close. Contacts of the count relays VO and XI through XP connected in parallel are placed in the operating circuit of relay DH. In the example given above, when the memory relay WK is operated upon the reception of the symbol character Colon, armature 2L and contact 3L of relay WK in the operating circuit of slave memory relay WE, at the bottom of FIG. 6d, close. A ground connection is completed to the winding of slave memory relay WE, and relay WE is operated. During the first rotation of the distributor shaft when relay VO is operated, a ground connection is completed to the winding of relay DH over a path including armature 2R and contact 3R of relay WE, contact 4L and armature 5L of relay VD, armature 9R and contact 8R of relay VO, contact 3L and armature 2L of relay AP and armature 8L and contact 9L of relay BA. Relay DH is operated. It should be noted that a ground connection is also completed to the winding of relay VN over a path including armature 2R and contact 3R of relay WE, armature 8L and contact 7L of relay WD and contact 1L and armature 2L of relay WO. Relay VN is operated. The function of relay VN (and of the corresponding relay YN in the TWX to TEX section of the converter) will be described in connection with the timing diagram given in FIG. 17. The stepping switches SS2A and SS2B are operated in the manner described above to count the first print type character inserted in the outgoing message signal, namely, the control function character Space. When the count relays XI and XM are operated during the next five rotations of the distributor shaft in the manner described above, a ground connection is completed during each rotation of the distributor shaft to the winding of relay DH through contacts of the relay WE and, in succession, of the count relays XI through XM. During the second rotation of the distributor shaft, the ground connection is completed through armature 5R and contact 6R of relay WE and contact 9R and armature 8R of relay XI. During the third rotation of the distributor shaft, the ground connection is completed through armature 8R and contact 9R of relay WE and contact 9R and armature 8R of relay XJ and so on. The operation of relay DH in the manner described above will cause the stepping switches SS2A and SS2B to count the first six print type characters in the combination of characters inserted in the outgoing message signal as a translation of the converting type, symbol character Colon. It is to be noted that relay DH is not operated upon the operation of count relay XN during the seventh rotation of the distributor shaft. The character transmitted during the seventh rotation of the distributor shaft is the control function character Figures, a non-print type character. The stepping switches SS2A and SS2B are, therefore, not operated to count this character.

The operation of the relay DH and, therefore, the operation of the stepping switches SS2A and SS2B to count the print type characters included in the respective translations of the other converting type characters will follow that outlined above. It is to be noted that, for reasons to be described in connection with the timing diagram given in FIG. 15, the stepping switches SS2A and SS2B are operated to count the print type characters included in a conversion during the initial rotations of the distributor shaft. For example, assuming that the conversion of a converting type character received includes two characters, the first character may be a non-print type character such as the control function character Letters, while the second character is a print type character such as the control function character Space. The contacts of the memory relay operated upon the reception of the converting type character or of a slave memory relay operated by the operation of the memory relay are arranged in the operating circuit of relay DH so that relay DH is operated upon the first rotation of the distributor shaft in the manner described above. The print type character having been counted, relay DH is not operated during the second rotation of the distributor shaft when the print type character is actually transmitted by the operation of the transmitting distributor.

The foregoing description of the operation of a section of the converter in translating a converting type character into a form suitable for reception by a receiving page printer has been directed to the operation of the TEX to TWX section of the converter. The reception of a converting type character causes one or more of the memory relays arranged to the left along the bottom of FIG. 6a to operate. As the contact pile-up on certain of the memory relays is not sufficient to perform all of the functions of the memory relays, the operation of each of these memory relays causes the operation of one of the slave memory relays WB through WE at the bottom of FIG. 6d. The slave memory relays merely serve to compelte certain of the functions performed by the memory relays. Comparison of the circuit diagram of the TEX to TWX section of the converter in FIG. 6 with that of the TWX to TEX section of the converter in FIG. 7 will show that the circuits of the respective sections are essentially identical. It may be seen that the timing diagram given in FIG. 14 is valid for the operation of both sections of the converter. The reception of a converting type character by the TWX to TEX section of the converter will result in the operation of one or more of the memory relays arranged to the left along the bottom of FIG. 7a. The slave memory relays operated by certain of the memory relays are identified at the bottom of FIG. 7d by the capital letters YA and ZB through ZE. Minor differences exist in the way certain of the circuit operations are performed. However, these differences are due only to the particular conversion functions which each section of the converter is required to perform. As may be seen by a comparison of the charts in FIGS. 3 and 4, the conversion functions performed by one section of the converter are not the same as those performed by the other section thereof.

In describing the manner in which a converting type character is translated by the operation of a section of the converter following the circuit operations outlined in the timing diagram given in FIG. 14, it was not stated, but was nevertheless assumed, that sufficient unused character spaces exist on a line to accommodate the number of characters included in a translation. However, this condition may not exist. Means are provided in each section of the converter to test the number of character spaces remaining in a line. If there are an insufficient number of character spaces remaining in a line to accommodate the number of characters in a translation, the control function characters Carriage Return and Line Feed are inserted in the outgoing message signal and the translation is initiated at the left hand margin on a new line.

Referring to the timing diagram given in FIG. 15 and to the circuit diagram of the TEX to TWX section of the converter in FIG. 6, the manner in which the relay DH is operated by the completion of a ground connection to the winding thereof through contacts of the count relay VO and XI through XP has been described above. As pointed out above, the manner in which the ground connections are completed to the winding of relay DH depends upon the particular one of the memory relays operated in response to the reception of a converting type character, the contacts of the memory relay or of a slave memory relay being arranged in the operating circuit of the relay DH. By examining FIGS. 6d, 6e and 6f, it may be seen that, at the closing of the contacts of a memory relay or of a slave memory relay in the operating circuit of relay DH, a ground connection is completed to one or more of the armatures 31 through 38 of the stepping switch SS2A. In the example given above, contacts of the slave memory relay WE in the operating circuit of relay DH are closed upon the reception of the converting type, symbol character Colon. A ground connection is completed to the armature 38 of the stepping switch SS2A over a path including armature 2R and contact 3R of relay WE, contact 4L and armature 5L of relay VD and lead 127. A ground connection is also completed to the armature 37 of the stepping switch SS2A over a path including armature 5R and contact 6R of relay WE and lead 128. In addition, a ground connection is completed through the closed contacts of the slave memory relay WE to the armatures 33, 34, 35 and 36 of the stepping switch SS2A. The translation of the symbol character Colon includes six print type characters. As a result, therefore, a ground connection is completed to the first six armatures 38, 37, 36, 35, 34 and 33 reading from left to right of the stepping switch SS2A. In much the same manner, when any one of the memory relays is operated indicating the need for a translation, a ground connection is completed to a number of the armatures 31 through 38 of stepping switch SS2A, corresponding to the number of print type characters in the translation to be made. It will be remembered that when the stepping switch SS2B has been operated for the seventh time to count the sixty-third print type character, contact 27 and armature 37 of the stepping switch SS2B are closed. The sixty-fourth print type character is counted by the operation of the stepping switch SS2A, and the contact 21 and armature 31 of stepping switch SS2A are closed. As each additional print type character is counted by the operation of the stepping switch SS2A, a different set of the contacts of the stepping switch SS2A are closed reading from right to left.

It will first be assumed that the stepping switch SS2A has counted the sixty-sixth print type character and that the contact 23 and armature 33 of the stepping switch SS2A are closed. Contact 13 and armature 3 of stepping switch SS2A are opened. It will also be assumed that the next character in the incoming message signal is the converting type, symbol character Colon. In determining the number of character spaces remaining in a line, the total number of character spaces in a line is assumed to be seventy-one. This permits a safety factor of one character. The translation of the symbol character Colon includes six print type characters. As only five character spaces remain in the line, there are not sufficient character spaces remaining to accommodate the print type characters in the translation. The slave memory relay WE, which is operated by the operation of memory relay WK, and relay AO/AP operate in the manner described above. Upon the operation of the relays WE and AO/AP, a path is completed from ground to the winding of relay BH including armature 8L and contact 9L of relay WE located in the operating circuit of relay DH, lead 129, armature 33 and contact 23 of the stepping switch SS2A, lead 110, contact 27 and armature 37 of the stepping switch SS2B, contact 3L and armature 2L of relay VO (which is operated during the first rotation of the distributor shaft), lead 130, contact 9R and armature 8R of relay AP, contact 4R and armature 5R of relay BO, contact 4R and armature 5R of relay BN and contact 4L and armature 5L of relay BP. Relay BH is operated, and contact 3L and armature 2L of relay BH close to complete a holding circuit for relay BH. Armature 5R and contact 6R of relay BH close, completing a ground connection to the winding of relay BI over a path including armature 5R and contact 4R of relay AK. Relay BI is operated. Armature 2R and contact 3R of relay BH close, and a ground connection is completed to the winding of the forced carriage return relay VI over a path including contact 4R and armature 5R of relay BP, armature 2R and contact 1R of relay BE, contact 2R and armature 1R of relay BG and armature 2L and contact 1L of relay AK. Relay VI is operated, and contact 3L and armature 2L of relay VI close completing a holding circuit for relay VI over the path including lead 114 and armature 2L and contact 1L of relay BP. Contact 7L and armature 8L of relay VI in the operating circuit of the memory relays WJ and WK open. Relays WJ and WK become inoperative. The operation of the forced carriage return relay VI causes a ground connection to be completed to the winding of relay AO/AP over a path including contact 9R and armature 8R of relay VI, and relay AO/AP is held in an operated condition. It is to be noted that the ground connection previously completed to the winding of relay AO/AP through contact 3L and armature 2L of relay WJ is now broken. Armature 5L and contact 6L of relay VI close, completing a ground connection to the winding of the slave memory relay WF. Relay WF is operated. The slave memory relay WF is operated upon the operation of both the forced carriage return relay VI and the forced carriage return on space relay VJ, due to the fact that the contact pile-up on each of the relays VI and VJ is not sufficient to complete the functions performed by the respective relays. The contacts of the relay WF in the groups of relay contacts Pulse 1 through Pulse 5 are closed. In addition, armature 2R and contact 3R of relay VI in the operating circuit of relay DJ close, and relay DJ is operated. The operation of relay DJ causes the release windings of the stepping switches SS2A and SS2B to be energized, and the stepping switches SS2A and SS2B are both reset to their respective original starting conditions in the manner previously described. As the memory output stepping switch SS1 is operated to cause the operation of the count relays VO/VP and XI through XK in turn, marking grounds are supplied from the five groups of relay contacts Pulse 1 through Pulse 5 to the signal contacts of the distributor contacts 94 during each rotation of the distributor shaft according to the arrangement of marking elements in the characters inserted in the outgoing message signal. An examination of the circuit diagram in FIG. 6 and of the chart shown in FIG. 3 will show that four characters, namely, two control function characters Carriage Return followed by two control function characters Line Feed, are inserted in the outgoing message signal.

During the fourth rotation of the distributor shaft to bring about the transmission of the last control function character Line Feed, armature 5R and contact 6R of relay XK included in the operating circuit of relay BM are closed. A ground connection is completed to the winding of relay BM over a path including armature 5L and contact 6L of relay WF, contact 6R and armature 5R of relay XK, lead 126 and contact 3L and armature 2L of relay BA. Relay BM is operated, and the circuit operations which follow are the same as those which were descrcibed in connection with the timing diagram given in FIG. 14. The completion of the transmission of the control function characters Carriage Return and Line Feed is defined by the operation of the relay BP. The memory output stepping switch SS1 is returned to its original starting condition, and count relays VO and VP are operated. Relay BH will remain operated during the insertion of the control function characters Carriage Return and Line Feed in the outgoing message signal. When relay BP operates, contact 4L and armature 5L of relay BP in the holding circuit of relay BH open. Relay BH is made inoperative. A shunt is completed to ground around the winding of relay BP through armature 5R and contact 6R of relay BI, contact 7R and armature 8R of relay BH, lead 131 and contact 4R and armature 5R of relay VB. Relay BP becomes inoperative. It is to be noted that the prior operation of relay BP also causes the armature 2L and contact 1L of relay BP in the holding circuit of the forced carriage return relay VI to open. Relay VI also becomes inoperative. Contact 7L and armature 8L of relay VI in the operating circuit of memory relays WJ and WK close, and relays WJ and WK are again operated.

It is necessary that two complete combinations of characters be inserted in the outgoing message signal consecutively. The first combination of characters comprises the control function characters Carriage Return and Line Feed. The second combination of characters represents the translation of the converting type character received which, in the example given, is assumed to be the symbol character Colon. During the period that the control function characters Carriage Return and Line Feed and the combination of characters representing a translation of the symbol character Colon are being inserted in the outgoing message signal, the sensing shaft must be prevented from rotating. This is true because a further rotation of the sensing shaft would remove the condition corresponding to the symbol character Colon established in the sensing contacts 79. Normally, the sensing shaft would be made to begin a further rotation when the insertion of the control function characters Carriage Return and Line Feed in the outgoing message signal has been completed. To prevent this action, the operation of relay BH causes the armature 5R and contact 6R of the relay BH in the operating circuit of relay BI to close. A ground connection is completed to the winding of relay BI over a path including armature 5R and contact 4R of relay AK, and relay BI is operated. Contact 3L and armature 2L of relay BI close, completing a holding circuit for relay BI. Contact 1R and armature 2R of relay BI in the circuit of the winding 90 of the sensing magnet open, preventing the operation of the sensing magnet and, therefore, a further rotation of the sensing shaft so long as relay BI is operated. Relay BI will remain operated until the insertion of both the first and second combination of characters in the outgoing message signal has been completed.

When memory relays WJ and WK are operated by the forced carriage return relay VI being made inoperative, the resulting circuit operations are exactly the same as were described in connection with the timing diagram given in FIG. 14. The memory output stepping switch SS1 operates to bring about the transmission of the characters in the translation of the symbol character Colon by the transmitting distributor, namely, the control function character Space, the letter characters in the word COLON and the control function character figures. The point is that the printing of the characters in the translation by the printer 21 of the TWX service will begin at the left hand margin on a new line. When the insertion of the second combination of characters in the outgoing message signal has been completed, relay BM is operated. The operation of relay BM, in turn, causes relay BN to be operated when the distributor shaft has completed its last rotation and relay BA becomes inoperative. Contact 1R and armature 2R of relay BN in the holding circuit of relay BI open, and relay BI becomes inoperative. Armature 2R and contact 1R of relay BI in the circuit of the winding 90 of the sensing magnet close, and the sensing magnet is operated to cause the sensing shaft to begin another rotation. The circuit operations which follow will depend on the condition established in the sensing contacts 79 corresponding to the next character in the incoming message signal.

It has been assumed that the stepping switch SS2A had completed the sixty-sixth count before the translation of the converting type character Colon began. It is clear, however, that if the stepping switch SS2A had completed a count beyond the sixty-sixth count up to and including the seventy-first count, the same circuit operation will occur. In each case, a ground connection is completed through the closed contacts of the slave memory relay WE and of the stepping switch SS2A to the winding of relay BH. Relay BH is operated, resulting in the insertion of the control function characters Carriage Return and Line Feed in the outgoing message signal followed by the characters in the translation of the symbol character Colon. On the other hand, if the stepping switch SS2A had completed only the sixty-fourth or sixty-fifth count, the remaining character spaces in a line are sufficient to accommodate the six characters in the translation which are to be counted. As a ground connection is not completed to either of the armature 31 or 32 of the stepping switch SS2A, relay BH is not operated at the beginning of the translation of the symbol character Colon. The translation of the symbol character Colon will be inserted in the outgoing message signal following the circuit operations outlined in connection with the timing diagram given in FIG. 14.

The reason for arranging the contacts of the memory relays in the operating circuit of relay DH so that the print type characters in a translation are counted by the operation of stepping switches SS2A and SS2B during the initial rotations of the distributor shaft should now be apparent. This arrangement permits a ground connection to be completed to a number of the armatures 31 through 38 of stepping switch SS2A, corresponding to the number of characters in a translation which must be counted. If a single character included in a translation is to be counted, a ground connection is completed only to the armature 38 of stepping switch SS2A. If two characters are to be counted, a ground connection is completed to the armatures 38 and 37 of the stepping switch SS2A and so on. For any translation, therefore, relay BH is operated when the stepping switch has registered a count such that a ground connection is completed to the winding of relay BH through the closed contacts of the stepping switch SS2A, indicating that an insufficient number of character spaces remains in a line to accommodate the print type characters in a translation. If a sufficient number of character spaces remains in a line, relay BH is not operated.

Once the stepping switch SS2A has determined that sufficient character spaces remain in a line to accommodate the print type characters in a translation, means must be provided for preventing the operation of relay BH should the stepping switch SS2A thereafter reach a count such that a ground connection would be completed through the closed contacts of the stepping switch SS2A to the winding of relay BH. The operation of relay BH after a translation has started would cause part of the translation to be printed on one line and the rest on the next line by the insertion of the control function characters Carriage Return and Line Feed in the outgoing message signal. Contact 3L and armature 2L of relay VO are included in the operating circuit of relay BH for this purpose and are normally open. Count relays VO and VP are operated only during the first rotation of the distributor shaft during which the first character of a translation is transmitted. During the subsequent rotations of the distributor shaft when the remaining characters in a translation are transmitted, relays VO and VP are inoperative. Therefore, the operating circuit of relay BH can be completed through contact 3L and armature 2L of relay VO only during the first rotation of the distributor shaft. This ensures that once it has been determined that the number of print type characters in a translation can be accommodated on a line, the translation can continue without interruption.

It may be seen, therefore, that a condition corresponding to the number of print type characters in a translation is established from left to right in the contacts of the stepping switch SS2A. At the same time, a condition corresponding to the number of print type characters in a line which have previously been counted is established from right to left in the contacts of the stepping switch SS2A. When a need for a translation is indicated by the operation of a memory relay, the stepping switch SS2A, in effect, compares the two conditions. If sufficient character spaces remain in a line to accommodate the print type characters in a translation, the translation is started. If an insufficient number of character spaces remain in a line, relay BH is operated. The control function characters Carriage Return and Line Feed are inserted in the outgoing message signal, and the translation is started at the left hand margin of the next line.

The operation of the TEX to TWX section of the converter has been described in connection with the circuit operations outlined in the timing diagram given in FIG. 15 following the circuit operations which occur when a particular converting type character, namely, the symbol character Colon, is to be translated. However, it is to be understood that the circuit operations outlined in the timing diagram apply equally well to the operation of the TEX to TWX section of the converter when any of the other translations are to be made. For any translation, the stepping switch SS2A determines whether or not a sufficient number of character spaces remain in a line to accommodate the number of print type characters therein which, in turn, determines the circuit operations to follow. A comparison of the circuit diagram of the TWX to TEX section of the converter in FIG. 7 with that of the TEX to TWX section of the converter in FIG. 6 will show that the circuit operations outlined in the timing diagram given in FIG. 15 also apply equally well to both sections of the converter. While the conversion functions performed by the TWX to TEX section of the converter are different than those performed by the TEX to TWX section of the converter, it may be seen that the operation of the TWX to TEX section of the converter to determine whether or not sufficient character spaces remain in a line to accommodate the number of print type characters in a translation and to cause the operation of relay BH if sufficient character spaces do not exist is similar to that of the TEX to TWX section of the converter. The operation of the TWX to TEX section of the converter can be determined by referring to the timing diagram in FIG. 15, and a description thereof need not be repeated.

Up to this point, the description has been primarily directed to certain basic circuit operations which are similar in the respective sections of the converter. Most of the conversion functions performed by both the TEX to TWX and TWX to TEX sections of the converter, as shown in the charts given in FIGS. 3 and 4, respectively, are accomplished as a result of these circuit operations. It is felt that the manner in which the various conversion functions are performed can be determined by referring to the circuit diagrams in FIGS. 6 and 7 and to the timing diagrams given in FIGS. 8 through 16 which have been explained above. In most cases, the manner in which the respective sections of the converter translate a single converting type character into another character or combination of characters will be readily apparent. However, in order to ensure an understanding of the manner in which certain of the conversion functions are performed, brief metion will now be made to them.

As shown in the charts given in FIGS. 2 and 3, the International No. 2 code alphabet uses three symbol characters, namely, upper case letter character "F," upper case letter character "G" and upper case letter character "H," which are not used in the Arrangement C code alphabet. These symbols are not readily convertible into a form suitable for reception by the page printer 21 of the TWX service since they are symbol characters which have neither accepted significance nor name. Actually, these upper case, symbol characters should not appear in a message signal sent from the page printer 20 of the TEX service. If they do, they are deleted by the operation of the TEX to TWX section of the converter.

Referring to the left hand side of the timing diagram given in FIG. 16 and to the circuit diagram of the TEX to TWX section of the converter in FIG. 6, it will be assumed that relay AL is operated in both sections of the converter defining the upper case status thereof. As described in connection with the timing diagram given in FIG. 8, normally the reception of a non-converting type, upper case character causes relay AM to operate. The operation of relay AM causes the distributor shaft to begin another rotation, relay CP is made inoperative and the sensing shaft is made to complete its rotation and stop. When relay AM becomes inoperative by the operation of relay AN, the winding 90 of the sensing magnet is energized and the sensing shaft begins another rotation. The deletion of the three symbol characters upper case letter character "F," upper case letter character "G" and upper case letter character "H" is accomplished merely by holding the distributor shaft stopped and permitting the sensing shaft to begin another rotation. When any one of these symbol characters is received, a ground connection is completed through the contacts of the fan relays AF/AE, AD, AC, AB and AA at the left of FIG. 6a to one of the outputs indicated by the capital letter F, G, or H. These outputs are each connected by a lead 132 to the winding of relay BG. Therefore, when either of the three symbol characters in question is received, a ground connection is completed to the winding of relay BG, and relay BG is operated. The operation of relay BG causes contact 10L and armature 11L of relay BG in the holding circuit of relay CP to open. Relay CP becomes inoperative, and the closing of armature 2R and contact 1R of relay CP in the circuit of the winding 90 of the sensing magnet causes the sensing shaft to begin another rotation. The distributor shaft remains stopped, preventing the transmission of the symbol character received by the TEX to TWX section of the converter. When a condittion corresponding to the next character in the incoming message signal is established in the sensing contacts 79, relay BG becomes inoperative. The circuit operations which follow will depend on the type of character received. Assuming that a non-converting, upper case character is received as the next character, relay AM is operated. The circuit operations which follow are the same as were described in connection with the timing diagram given in FIG. 8. It is to be noted that the deletion of the symbol characters upper case letter character "F," upper case letter character "G" and upper case letter character "H" only occurs in the operation of the TEX to TWX section of the converter.

Mention has been made of the fact that the control function character Space in the upper case causes the page printer 21 of the TWX service to return to lower case status. The page printer 20 of the TEX service, however, is returned to a lower case status only by the control function character Letters in the upper case. As a result, the control function character Space must be treated by both sections of the converter as a converting type character. A control function character Space received by the printer 21 of the TWX service must be followed by the control function character Figures inserted by the operation of the TEX to TWX section of the converter in order to return the printer 21 of the TWX service back into an upper case status. A control function character Space received by the printer 20 of the TEX service must be accompanied by the control function character Letters to shift the printer 20 of the TEX service into the lower case status.

Referring to the right hand side of the timing diagram given in FIG. 16, the reception of the control function character Space by a section of the converter, causes the operation of a memory relay. In the TEX to TWX section of the converter, relay VH is operated. In the TWX to TEX section of the converter, relay YI is operated. In either case, the reception of the control function character Space first causes the operation of stunt relay AK by the completion of a ground connection to the winding thereof through the contacts of the fan relays AF/AE, AD, AC, AB and AA. The operation of stunt relay AK, in turn, causes the operation of the memory relay VH in the TEX to TWX section of the converter or of relay YI in the TWX to TEX section of the converter. The resulting circuit operations are similar to those outlined in connection with the timing diagram given in FIG. 14. In the case of the TEX to TWX section of the converter, the memory output stepping switch SS1 is operated so that the control function character Space followed by the control function character Figures is inserted in the outgoing message signal. In the case of the TWX to TEX section of the converter, the memory output stepping switch SS1 is operated so that the control function character Letters followed by the control function character Space is inserted in the outgoing message signal. As the control function character Space occupies one character space in a line, the stepping switches SS2A and SS2B in the respective sections of the converter are operated to complete a single count, indicating the presence of the count or print type character in the line. Should it be necessary to bring about a forced carriage return, the forced carriage return relay on space VJ in the TEX to TWX section of the converter or the forced carriage return on space relay YL/YM in the TWX to TEX section of the converter are operated. This results in the insertion of the control function characters Carriage Return and Line Feed in the outgoing message signal, and the stepping switches SS2A and SS2B are reset to their respective original starting conditions.

As mentioned, the transmission of the control function character Space by the printer 21 of the TWX service causes the printer 21 to shift into lower case status. The resulting operation of the TWX to TEX section of the converter causes the printer 20 of the TEX service to also shift into lower case status. When the memory relay YI in the TWX to TEX section of the converter is operated, contact 7R and armature 8R of relay YI in the holding circuit of both of the relays AL in the respective sections of the converter open. The relays AL become inoperative, and both sections of the converter are returned to lower case status. The relays AL are shown as becoming inoperative on the timing diagram in FIG. 16 when the control function character Space is received by the TWX to TEX section of the converter, leaving both sections of the converter in lower case status. However, as indicated in the timing diagram, relays AL remain operated when the control function character Space is received by the TEX to TWX section of the converter, defining the continued operation of both sections of the converter in upper case status. The timing diagram should not be misconstrued. The relay AL in the TEX to TWX section of the converter and the relay AL in the TWX to TEX section of the converter operate and become inoperative at the same time.

In the International No. 2 code alphabet used by the TEX and TELEX services, the upper case symbol characters Plus and Question Mark are transmitted in combination by a printer at one end of a communication system to indicate that the transmission of a message signal has been completed and that the printer at the other end may respond. As shown in the chart given in FIG. 2, the symbol characters Plus and Question Mark do not appear at all in the Arrangement C code alphabet used by the TWX service. It is necessary, therefore, that the TEX to TWX section of the converter treat both of these symbol characters as converting type characters. As shown in the chart given in FIG. 3, the symbol character Plus is normally translated into a combination of three characters, namely, the symbol characters Dash, Diagonal and Dash, in that order. The symbol character Question Mark is normally translated into a combination of seven characters including the control function character Space, the five letter characters in the word QUERY and the control function character Figures. However, when the symbol characters Plus and Question Mark are transmitted by the printer 20 of the TEX service as a combination, the TEX to TWX section of the converter must recognize the combination and translate this combination of characters into another combination of characters which can be received by the printer 21 of the TWX service. Whenever the symbol character Plus is followed by the symbol character Question Mark in a message signal transmitted by the printer 20 of the TEX service, the TEX to TWX section of the converter is operated to recognize the combination and to substitute for the combination the symbol characters Diagonal and Period, in that order, in the message signal fed to the printer 21 of the TWX service. The symbol characters Diagonal and Period in combination are, therefore, transmitted by the printer 21 of the TWX service to indicate the end of transmission and that the printer 20 of the TEX service may respond. When the symbol character Diagonal is followed by the symbol character Period in a message signal transmitted by the printer 21 of the TWX service, the TWX to TEX section of the converter must recognize the combination and substitute the combination of symbol characters Plus and Question Mark, in that order, in the message signal fed to the printer 20 of the TEX service. However, it should be noted that the symbol characters Diagonal and Period are assigned to the same arrangement of marking and spacing elements in both the Arrangement C and International No. 2 code alphabets. As a result, when the symbol characters Diagonal and Period appear in a message signal transmitted by the printer 21 of the TWX service on an individual basis and not in combination, the TWX to TEX section of the converter forwards each of the characters without translation.

When the symbol character Plus is received as part of an incoming message signal by the TEX to TWX section of the converter, the section of the converter must determine whether the next character is the symbol character Question Mark or some other character in the International No. 2 code alphabet. If the next character is the symbol character Question Mark, the combination of symbol characters Diagonal and Period is inserted in the outgoing message signal. If a character other than the symbol character Question Mark is received, the normal translation of the converting type, symbol character Plus is inserted in the outgoing message signal. In the same manner, when the symbol character Diagonal is received as part of an incoming message signal by the TWX the TEX section of the converter, the TWX to TEX section of the converter must determine whether the next character is the symbol character Period or some other character in the Arrangement C code alphabet. If the next character is the symbol character Period, the combination of symbol characters Plus and Question Mark is inserted in the outgoing message signal. If a character other than the symbol character Period is received, the symbol character Diagonal is inserted in the outgoing message signal without translation.

Referring to the timing diagram given in FIG. 17 and to the circuit diagram of the TWX to TEX section of the converter in FIG. 7, it will first be assumed that the symbol character Diagonal is received followed by a converting type character of the Arrangement C code alphabet. When the symbol character Diagonal is received, a ground connection is completed through the contacts of the fan relays AF/AE, AD, AC, AB and AA at the left of FIG. 7a to the winding of relay BC via the output indicated by the capital letter X. It is to be noted that the symbol character Diagonal is the letter character "X" in the upper case. Relay BC is operated. Contact 3R and armature 2R of relay BC in the circuit of the winding 90 of the sensing magnet close, and the sensing magnet operates to cause the sensing shaft to begin another rotation. When relay BC is operated, contact 3L and armature 2L of relay BC close. A ground connection is completed to the winding of relay BD, and relay BD is operated. When relay BB is operated during the rotation of the sensing shaft, contact 4R and armature 5R of relay BB in the operating circuit of relay BC open. Relay BC is made inoperative. A ground connection is completed to the winding of relay BE through armature 2L and contact 1L of relay BC, and relay BE is operated. The operation of relays BD and BE serve to maintain a condition representing the reception of the symbol character Diagonal in the TWX to TEX section of the converter.

It has been assumed that the next character following the symbol character Diagonal in the incoming message signal is a converting type character. When a condition corresponding to the converting type character is established in the sensing contacts 79, one of the memory relays in the TWX to TEX section of the converter is operated. This action causes relay YN to operate in the manner described in connection with the timing diagram given in FIG. 14. A circuit is completed from ground to battery including armature 2L and contact 3L of relay YN, armature 5R and contact 6R of relay BD, the winding of relay ZM (at the bottom-left of FIG. 7b), armature 8L and contact 7L of relay DJ, contact 4L and armature 5L of relay YL, contact 1L and armature 2L of relay YJ, contact 1R and armature 2R of relay BP, armature 2L and contact 3L of relay AL and contact 4R and armature 5R of relay BB. Relay ZM is operated. Contact 12R and armature 11R of relay ZM close, completing a holding circuit for relay ZM through contact 1L and armature 2L of relay ZP. Armature 5R and contact 6R of relay ZM close, and the slave memory relay ZA is operated. Contacts of relay ZA in the five groups of relay Contacts Pulse 1 through Pulse 5 are closed. The count relay YP, which corresponds to count relay VP in the TEX to TWX section of the converter, of the memory output stepping switch SS1 is operated during the first rotation of the distributor shaft, and marking grounds are applied to the first, third, fourth and fifth signal contacts of the distributor contacts 94. The symbol character Diagonal is transmitted by the transmitting distributor. The circuit operations by which this action occurs have been described in connection with the timing diagram given in FIG. 14. The completion of the transmission of the symbol character Diagonal is defined by the operation of relay BP. Contact 1R and armature 2R of relay BP in the operating circuit of relay ZM open, and relay ZM becomes inoperative. It should be noted that when relay ZM is operated, contact 12L and armature 11L of relay ZM in the operating circuit of relay BI close. Relay BI is operated. Relay BI performs the same functions as were outlined in connection with the timing diagram given in FIG. 15. The open condition of contact 1R and armature 2R of relay BI in the circuit of the winding 90 of the sensing magnet prevents further rotation of the sensing shaft until both the symbol character Diagonal and the translation of the converting type character has been inserted in the outgoing message signal. If the sensing shaft were permitted to rotate following the insertion of the symbol character Diagonal in the outgoing message signal, the condition established in the sensing contacts 79 corresponding to the converting type character would be replaced by a condition corresponding to the character following the converting type character in the incoming message signal. The converting type character would be lost, and the translation thereof would not be inserted in the outgoing message signal. When relay ZM becomes inoperative following the insertion of the symbol character Diagonal in the outgoing message signal, contact 1R and armature 2R of relay ZM close. This completes a shunting circuit around the winding of relay BP through contact 8R and armature 7R of relay BH and contact 6R and armature 5R of relay BI. Relay BP becomes inoperative.

Contact 4L and armature 5L of relay ZM, which are normally closed, are included in the operating circuit of the memory relays. Contact 4L and armature 5L of relay ZM open when relay ZM is operated, and the memory relay operated upon the reception of the converting type character becomes inoperative. When relay ZM becomes inoperative upon the operation of relay BP, contact 4L and armature 5L of relay ZM close. Relay BP becomes inoperative in the manner described above and the operating circuit of the memory relay is again completed through contact 1R and armature 2R of relay BP. The translation of the converting type character then proceeds following the circuit operations outlined in connection with the timing diagram given in FIG. 14, according to the particular one of the memory relays which is operated upon the reception by the TWX to TEX section of the converter of the converting type character.

The operation of the TEX to TWX section of the converter when the symbol character Plus is received followed by the reception of a converting type character of the International No. 2 code alphabet other than the symbol character Question Mark is similar to that described above. Referring to FIG. 6, the reception of the symbol character Plus causes relay BC to operate by a ground connection completed to the winding thereof through the contacts of the fan relays AF/AE, AD, AC, AB and AA via the output marked with the capital letter Z. It is to be noted that the symbol character Plus is the letter character "Z" in the upper case. Relays BD and BE are operated, and relay VN, which corresponds to relay YN in the TWX to TEX section of the converter, is operated by the operation of a memory relay upon the reception of the converting type character which follows the symbol character Plus in the incoming message signal. A circuit is completed from ground to battery including armature 2L and contact 3L of relay VN, armature 5R and contact 6R of relay BD, the winding of relay VB (at the bottom-left of FIG. 6b), armature 8L and contact 7L of relay DJ, armature 2L and contact 1L of relay VJ, contact 7L and armature 8L of relay VI, contact 1R and armature 2R of relay BP, armature 2L and contact 3L of relay AL and contact 4R and armature 5R of relay BB. Relay VB is operated, and contact 9R and armature 8R of relay VB in the operating circuit of slave memory relay WD/WC close. Relay WD/WC is operated, and the contacts of relay WD/WC in the groups of relay contacts Pulse 1 through Pulse 5 close. The circuit operations which follow have previously been described and can be readily determined by referring to the circuit diagram in FIG. 6 and to the timing diagram given in FIG. 17. The translation of the symbol character Plus comprising three symbol characters Dash, Diagonal and Dash, in that order, is inserted in the outgoing message signal. Immediately, thereafter, the characters in the translation of the converting type character received following the symbol character Plus by the TEX to TWX section of the converter are inserted in the outgoing message signal.

Figure 7A:
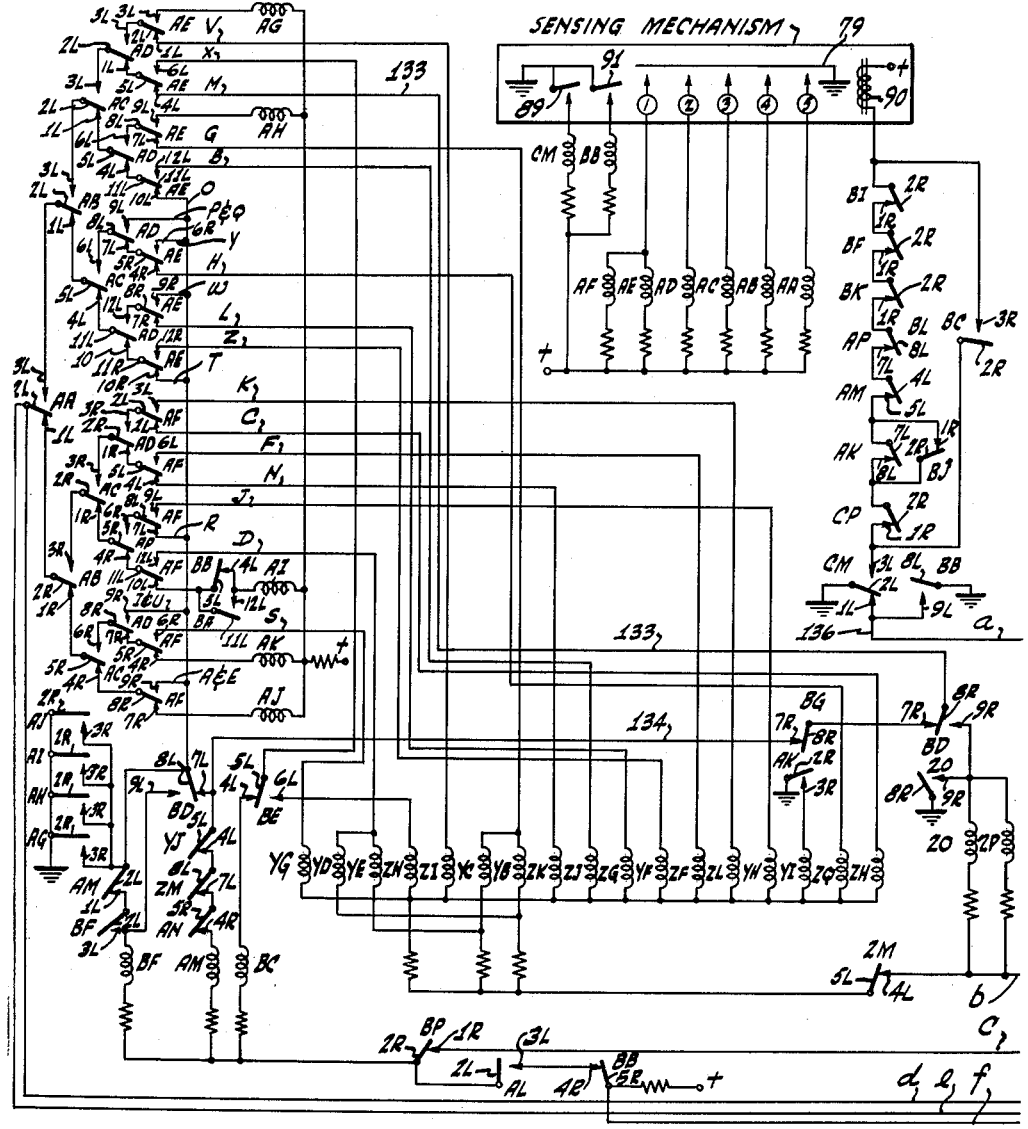
Figure 7C:
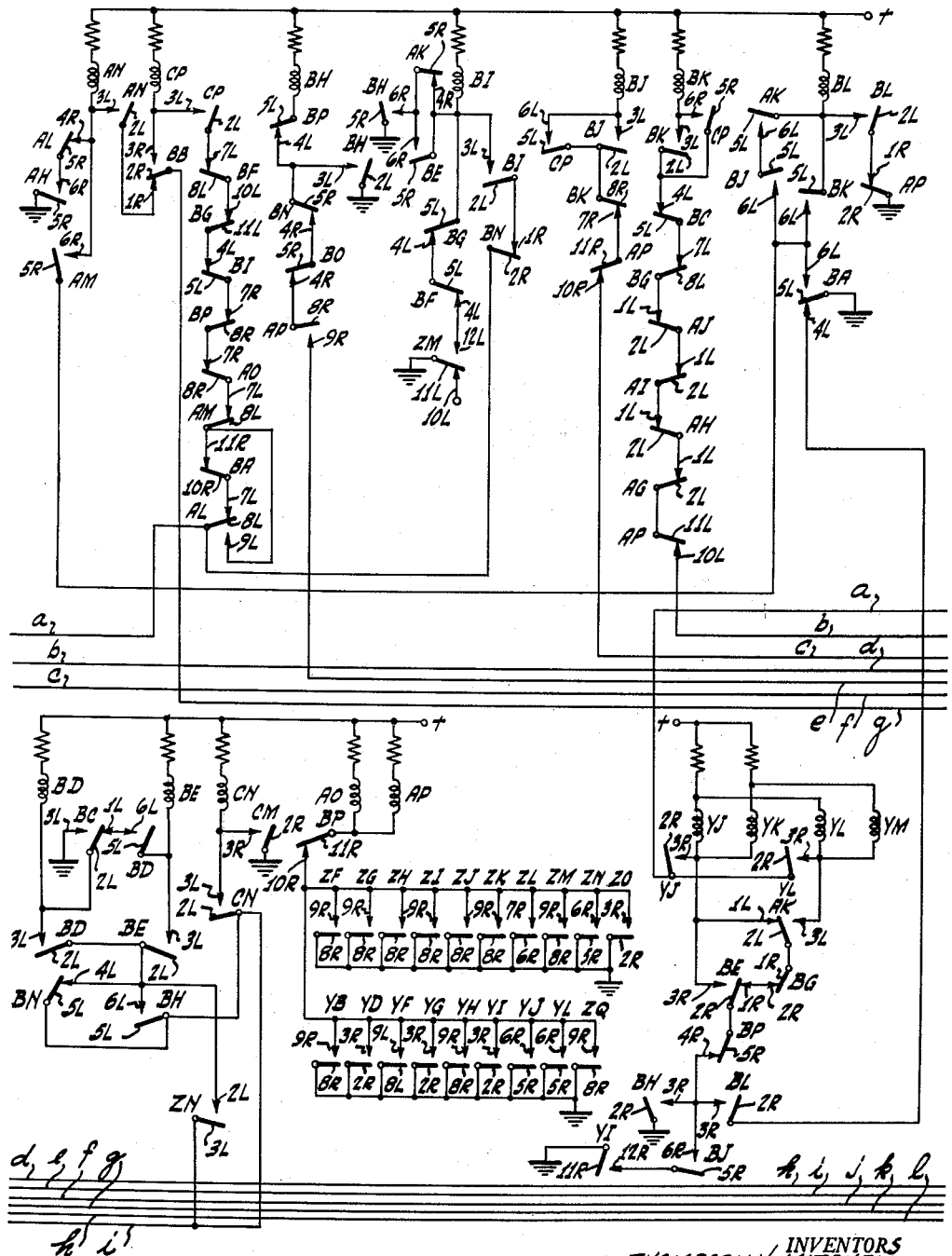
Figure 7D:
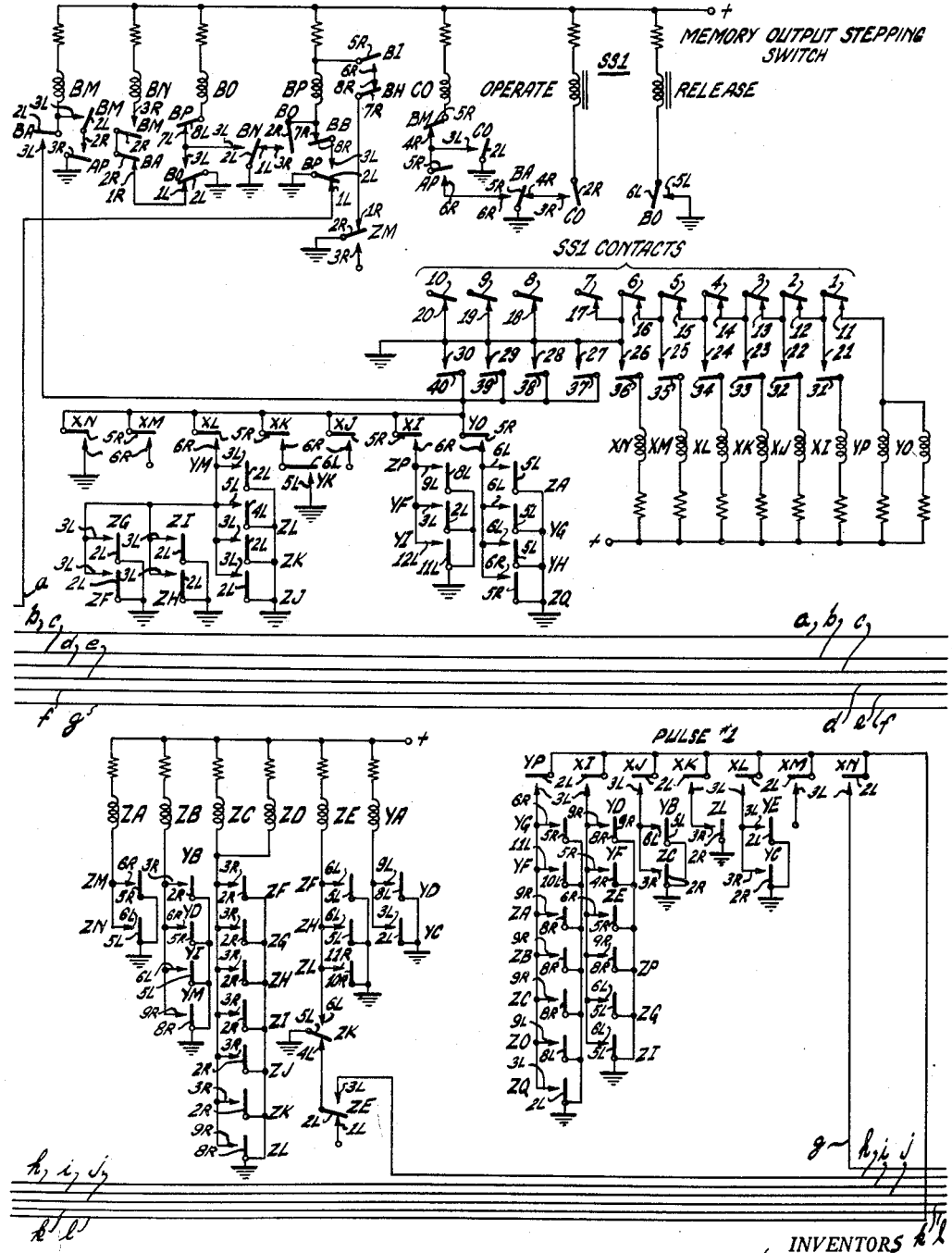
Figure 7E:
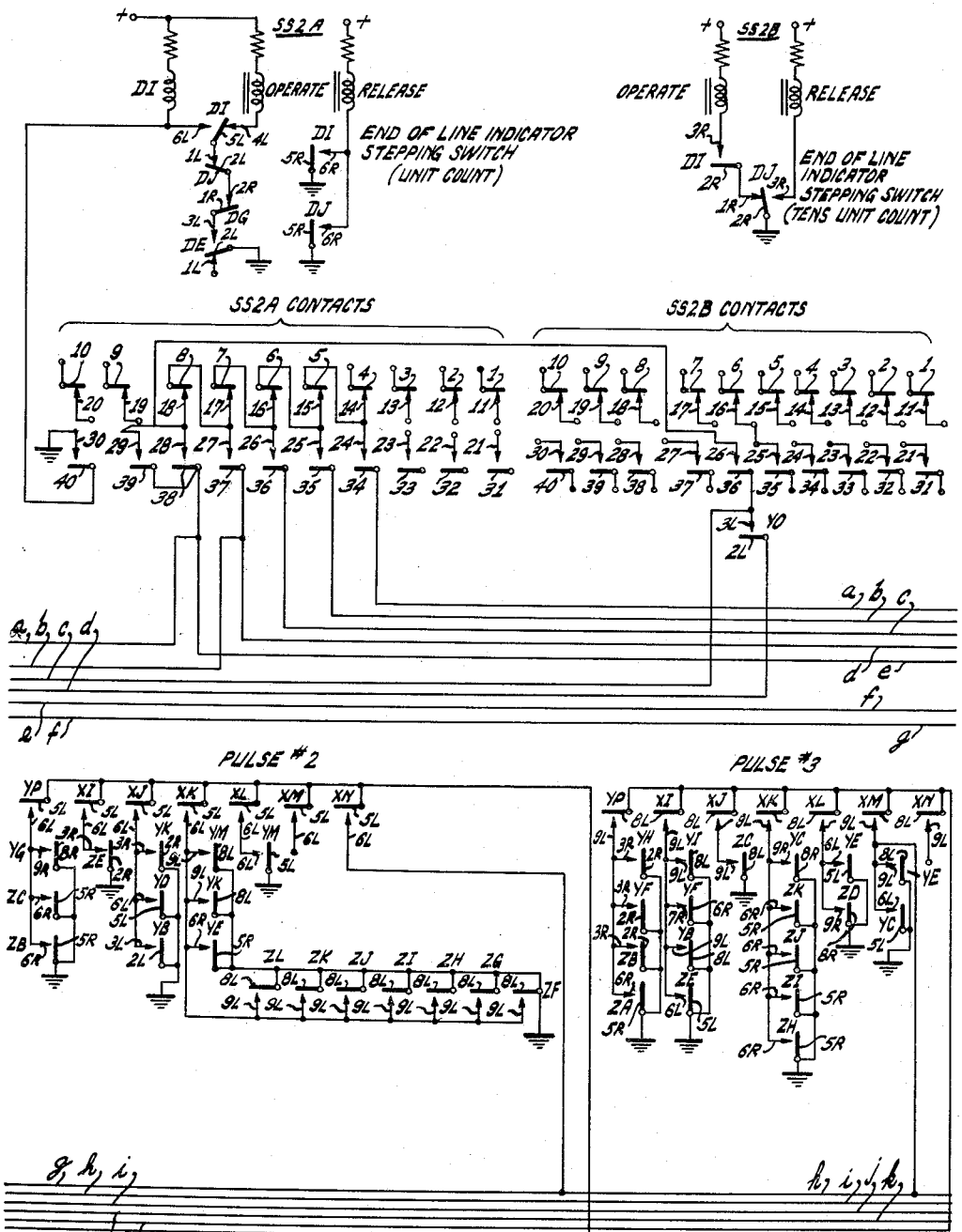
Figure 9B:
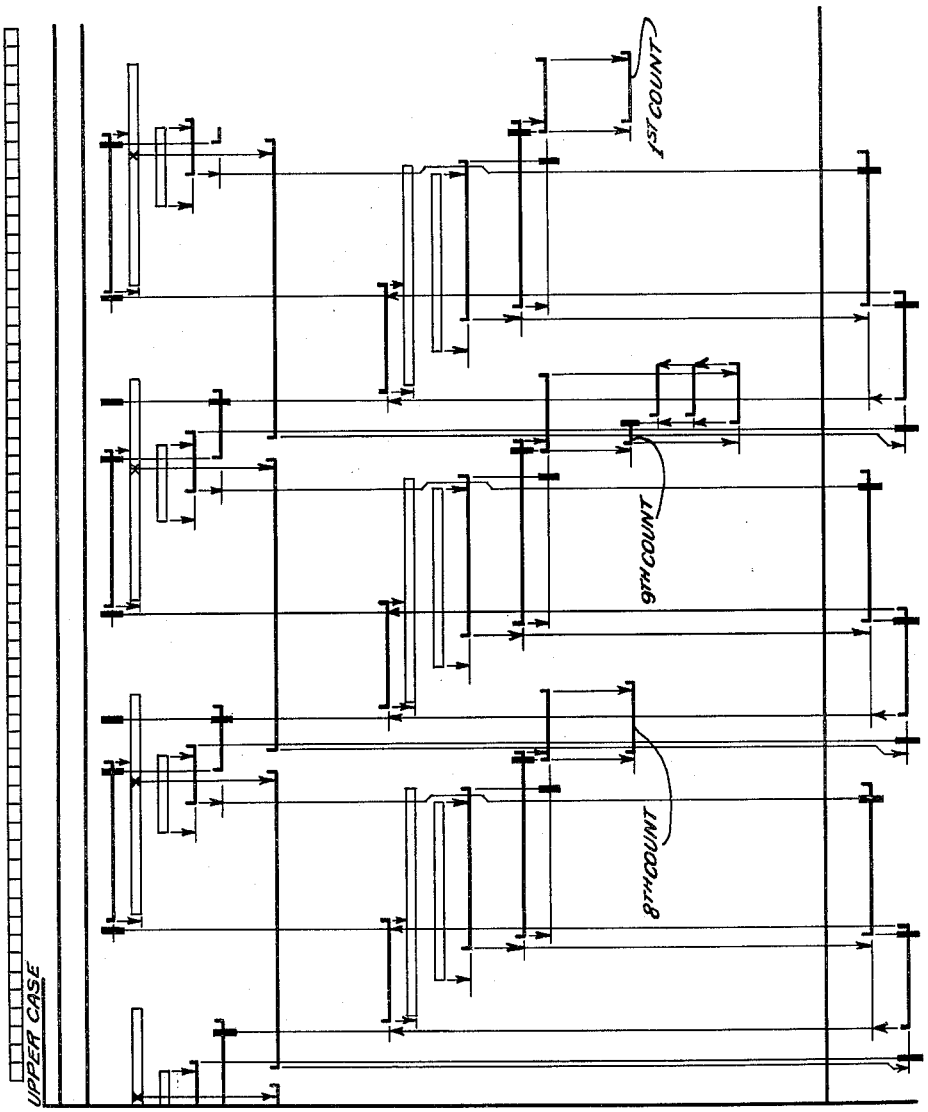
Figure 10B:
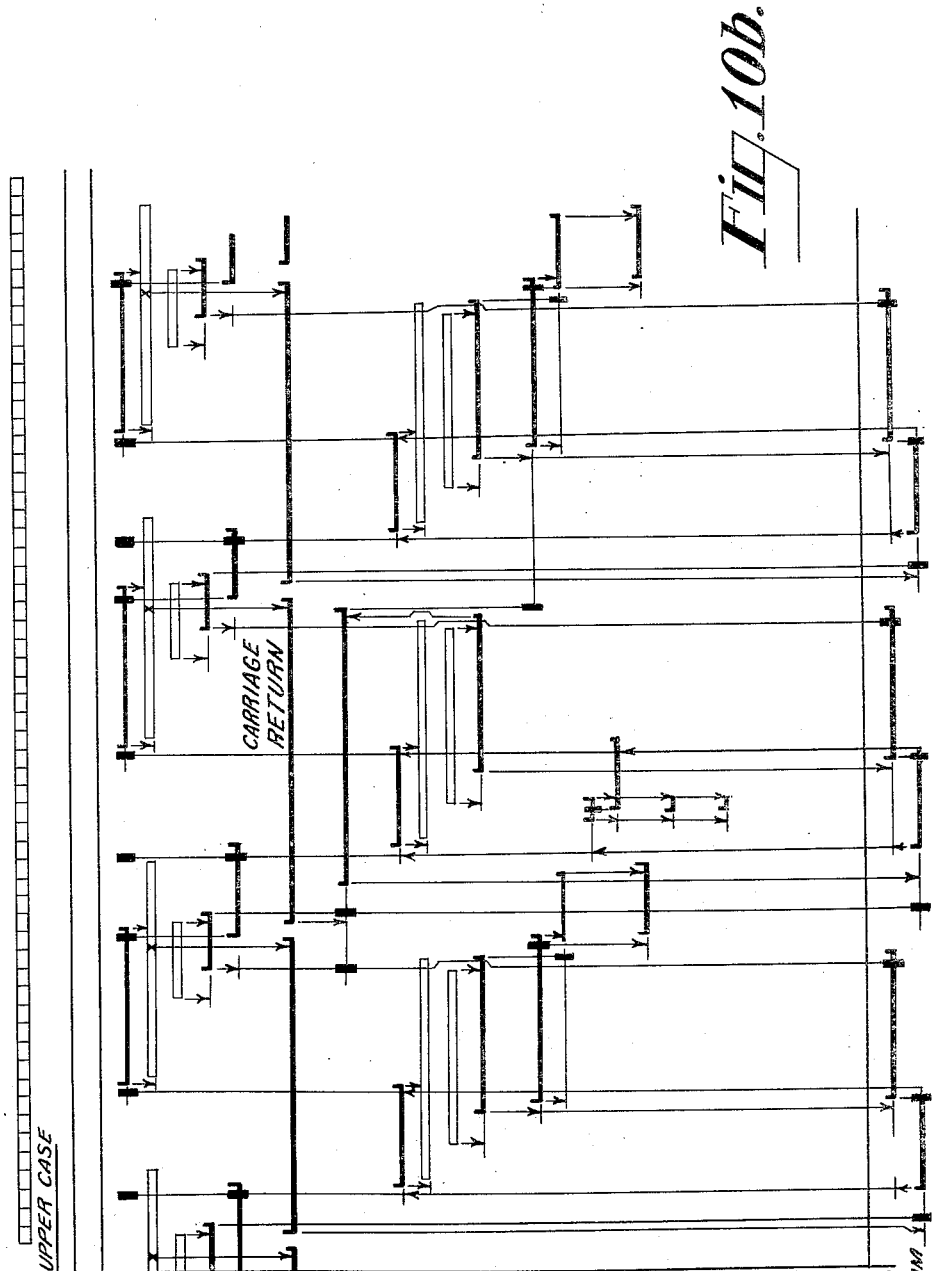

It is possible that a symbol character Plus may follow a symbol character Plus in a message signal transmitted by the printer 20 of the TEX service. Similarly, it is possible that a symbol character Diagonal may follow a symbol character Diagonal in a message signal transmitted by the printer 21 of the TWX service. In either case, the respective sections of the converter must be operated to forward the first symbol character received (or a translation thereof in the case of the TEX to TWX section of the converter) and to hold the second symbol character until the next character in the incoming message signal is determined. Referring to the circuit diagram of the TWX to TEX section of the converter in FIG. 7 and to the timing diagram given in FIG. 18, the reception of the first symbol character Diagonal by the TWX to TEX section of the converter causes relay BC to operate in the manner described in connection with the timing diagram given in FIG. 17. The operation of relay BC permits the sensing shaft to complete another rotation. As the next character in the incoming message signal is assumed to be the symbol character Diagonal, the condition in the sensing contacts 79 established when the first symbol character Diagonal was received remains unchanged. Relay BD is operated by the operation of relay BC. When relay BB is operated during the rotation of the sensing shaft, armature 5R and contact 4R of relay BB in the operating circuit of relay BC open. Relay BC becomes inoperative. Contact 1L and armature 2L of relay BC close, and a ground connection is completed to the winding of relay BE. Relay BE is operated. As shown in FIG. 7a, the operating circuit of relay BC includes armature 5L and contact 4L of relay BE which are normally closed. When relay BE is operated, armature 5L and contact 4L of relay BE open. Armature 5L and contact 6L of relay BE close.

As pointed out above, a condition corresponding to the symbol character Diagonal remains in the sensing contacts 79 upon the further rotation of the sensing shaft by the operation of relay BC. Instead of relay BC being operated, as is the case when the first symbol character Diagonal is received, the operation of relay BE causes the ground connection to be completed via the output X of the contacts of the fan relays AF/AE, AD, AC, AB and AA through armature 5L and contact 6L of relay BE to the winding of relay ZN. Relay ZN is operated. Contact 6L and armature 5L of relay ZN close, completing a ground connection to the winding of slave memory relay ZA. As was described in connection with the timing diagram given in FIG. 17, upon the operation of relay ZA by the operation of relay ZN the symbol character Diagonal is inserted in the outgoing message signal.

When relay ZN is operated, contact 2L and armature 3L of relay ZN close. An additional ground connection is completed to the winding of relay BD and of relay BE. As a result, when relay BN becomes inoperative following the completion of the insertion of the first symbol character Diagonal in the outgoing message signal, relays BD and BE remain operated. It is to be noted that the operation of relay BN causes contact 4L and armature 5L of relay BN in the operation circuit of relays BD and BE to open. Normally, therefore, relays BD and BE are made inoperative upon the operation of relay BN. The continued operation of relays BD and BE by the operation of relay ZN retains the status of the symbol character Diagonal until the next character in the incoming message signal is determined. When relay BP is operated defining the completion of the insertion of the symbol character Diagonal in the outgoing message signal, contact 1R and armature 2R of relay BP in the operating circuit of relay ZN open. Relay ZN becomes inoperative. Contact 6R and armature 5R of relay ZN in the operating circuit of relay AO/AP open, and relay AO/AP becomes inoperative. Contact 7L and armature 8L of relay AP in the circuit of the winding 90 of the sensing magnet close, and the sensing magnet is operated to cause the sensing shaft to begin another rotation. Should the next character be an upper case, converting type character, a condition corresponding thereto is established in the sensing contacts 79. The resulting circuit operations would be the same as were outlined in connection with the timing diagram given in FIG. 17. The second symbol character Diagonal is inserted in the outgoing message signal by the operation of relay ZM. Immediately thereafter, the translation of the converting type character received is inserted in the outgoing message signal.

It will be assumed that the next character is an upper case, non-converting type character. Normally, when an upper case, non-converting type character is received, a ground connection is completed to the winding of relay AM over a path including armature 8L and contact 7L of relay BD. The operation of relay AM in this situation was described in connection with the timing diagram given in FIG. 8. Since relay BD is now operated, contact 7L and armature 8L of relay BD are now open. Referring to FIG. 7a, it may be seen that a ground connection is now completed to the winding of relay BF through armature 8L and contact 9L of relay BD which are closed by the operation of relay BD. Relay BF is, therefore, operated instead of relay AM. Upon the operation of relay BF, a ground connection is completed to the winding of relay ZM over a path including armature 5R and contact 6R of relay BF and armature 5R and contact 6R of relay BD. Relay ZM is operated. The operation of relay ZM causes the second symbol character Diagonal to be inserted in the outgoing message signal. When the insertion of the symbol character Diagonal in the outgoing message signal has been completed, relay BN is operated. Contact 4L and armature 5L of relay BN in the operating circuit of relays BD and BE open, and relays BD and BE now become inoperative. Relay BP operates defining the completion of the insertion of the symbol character Diagonal in the outgoing message signal. Contact 1R and armature 2R of relay BP in the operating circuit of relay ZM open, and relay ZM becomes inoperative.

When relay BD is made inoperative, armature 8L and contact 7L of relay BD in the operating circuit of relay AM close. Relay AM is operated. When relay AM is operated, contact 3R and armature 2R of relay AM in the circuit of the winding 92 of the distributor magnet close. The distributor magnet is operated to cause the distributor shaft to begin another rotation during which the non-converting type character received is transmitted by the transmitting distributor. It is to be noted that the condition established in the sensing contacts 79 corresponding to the non-converting type character is retained during the interval in which the second symbol character Diagonal is inserted in the outgoing message signal. When the insertion has been completed, the non-converting type character is repeated to the signal contacts of the distributor contacts 94 in the manner previously described. The transmission of the non-converting type character is accomplished by the same circuit operations outlined in connection with the timing diagram given in FIG. 8. As shown in the timing diagram given in FIG. 18, the stepping switch SS2A is operated to count both of the symbol characters Diagonal as print type characters by the operation of the relays DH DE.

The operation of the TEX to TWX section of the converter, when a symbol character Plus followed by a second symbol character Plus is received, is similar to that of the TWX to TEX section of the converter when two symbol characters Diagonal are received in succession. The reception of the second symbol character Plus causes relay VE, which corresponds to relay ZN in the TWX to TEX section of the converter, to operate instead of relay BC. Slave memory relay WD in the TEX to TWX section of the converter is operated, resulting in the insertion of the translation of the symbol character Plus in the outgoing message signal. When it has been determined whether the character following the second symbol character Plus in the incoming message signal is a converting or non-converting type character, relay VB, which corresponds to relay ZM in the TWX to TEX section of the converter, is operated. The translation of the second symbol character Plus is inserted in the outgoing message signal. If a non-converting type character is received following the second symbol character Plus, the character is repeated and transmitted by the operation of the transmitting distributor folowing the transmission of the translation of the second symbol character Plus. If the character is a converting type character, the translation thereof is inserted in the outgoing message signal instead. The sequence of operation of the respective relays in the TEX to TWX section of the converter will follow that outlined in the timing diagram given in FIG. 18. It should be noted that, because the symbol character Diagonal is inserted in the outgoing message signal without translation in the operation of the TWX to TEX section of the converter, relay CO is not operated and, therefore, the memory output stepping switch SS1 in the TWX to TEX section of the converter is not stepped beyond its original starting condition in which count relays YO and YP are operated. However, in the operation of the TEX to TWX section of the converter, the symbol character Plus is translated into a combination of three characters. As a result, relay CO is operated twice. The memory output stepping switch SS1 in the TEX to TWX section of the converter is operated twice, causing the count relays VO/VP, XI and XJ to operate in succession. As described above, the operation of count relays VO/VP, XI and XJ brings about the insertion of the three characters in the translation of the symbol character Plus in the outgoing message signal.

The operation of the TEX to TWX section of the converter, when one of the symbol characters corresponding to the letter characters "F, G" and "H" in upper case status follows directly the symbol character Plus in a message signal transmitted by the printer 20 of the TEX service, is outlined in the timing diagram given in FIG. 19. It will be remembered that the symbol characters corresponding to the letter characters "F, G" and "H" in upper case status which appear in the International No. 2 code alphabet are deleted by the operation of the TEX to TWX section of the converter. The circuit operations differ little from those previously described. When a condition corresponding to the symbol character Plus is established in the sensing contacts 79, relay BC is operated. The operation of relay BC permits the sensing shaft to complete another rotation. During the further rotation, relay BC becomes inoperative. Relays BD and BE are operated in the time sequence previously described. A condition corresponding to the letter character "F, G" or "H" in upper case status is established in the sensing contacts 79. Relay BG is operated in the manner described in connection with the timing diagram given in FIG. 16.

As the symbol character Plus is not followed directly by the symbol character Question Mark, it is necessary that the normal translation of the symbol character Plus be inserted in the outgoing message signal. As shown in FIG. 6b, when relay BG is operated, a ground connection is completed to the winding of relay VB over a path including armature 2L and contact 1L of relay VD, armature 5R and contact 6R of relay BG and armature 5R and contact 6R of relay BD. Relay VB is operated, and the normal translation of the symbol character Plus is inserted in the outgoing message signal. This action proceeds by the operation of the memory output stepping switch SS1 in the manner previously described. It will be remembered that the operation of relay BD causes contact 9L and armature 8L of relay BD in the operating circuit of relay BF to close. In the meantime the sensing shaft is permitted to complete another rotation during which a condition corresponding to the next character in the incoming message signal is established in the sensing contacts 79. It is assumed that the next character is a non-converting type character. Relay BF is operated by the completion of a ground connection to the winding thereof over a path including the armature 8L and contact 9L of relay BD. An examination of FIG. 6a will show that a ground connection is completed to the winding of relay VB through armature 5R and contact 6R of relay BF when relay BF is operated. Thus, if the non-converting type character had followed the symbol character Plus instead of the character deleted by the operation of the TEX to TWX section of the converter, relay VB would be operated upon the operation of relay BF. It may be seen, therefore, that the translation of the symbol character Plus will proceed in the same time sequence when a character deleted by the operation of TEX to TWX section of the converter is received as when a non-converting type character is received, following the reception of the symbol character Plus. The character to be deleted is merely left out of the outgoing message signal.

Following the insertion of the translation of the symbol character Plus in the outgoing message signal, relays BD and BE become inoperative by the operation of relay BN. Contact 9L and armature 8L of relay BD in the operating circuit of relay BF open, and armature 9L and contact 7L of relay BD in the operating circuit of relay AM close. Relay AM is operated. Contact 1L and armature 2L of relay AM in a holding circuit of relay BF open, and relay BF becomes inoperative. Contact 3R and armature 2R of relay AM in the circuit of the winding 92 of the distributor magnet close. The operation of the distributor magnet causes the distributor shaft to begin another rotation during which the non-converting type character received following the deleted character is transmitted.

It should be noted that the TWX to TEX section of the converter does not delete any of the characters in the Arrangement C code alphabet. That portion of the above description relating to the operation of relay BG by the reception of one of the letter characters "F, G" or "H" in upper case status should be disregarded in considering the operation of the TWX to TEX section of the converter. If a non-converting type character is received directly following a symbol character Diagonal in a message signal transmitted by printer 21 of the TWX service, the symbol character Diagonal is inserted in the outgoing message signal followed by the non-converting type character. The operation of the TWX to TEX section of the converter to accomplish this action is similar to that outlined on the right hand side of the timing diagram given in FIG. 18.

When relay VB in the TEX to TWX section of the converter is operated, it is possible to complete a ground connection to the winding of relay BI over a path including armature 5R and contact 6R of relay VB, contact 4L and armature 5L of relay BF and contact 4L and armature 5L of relay BG. Relay BI will operate, therefore, in all cases in which relay VB is operated and relays BF and BG are not. Normally, relay BI is operated in the manner described in connection with the timing diagram given in FIG. 15 to prevent the sensing shaft from rotating during the insertion of the control function characters Carriage Return and Line Feed and of the translation of a converting type character in the outgoing message signal. Relay BN is operated upon the completion of the insertion of the translation in the outgoing message signal. Contact 1R and armature 2R of relay BN in the holding circuit of relay BI open, and relay BI becomes inoperative. The sensing shaft is permitted to complete another rotation. Should relay BI operate after relay BN becomes inoperative, due to the operation of relay VB, contact 3L and armature 2L of relay BI close. A holding circuit is completed for relay BI which will hold relay BI operated indefinitely. Contact 1R and armature 2R of relay BI in the circuit of the winding 90 of the sensing magnet remain open, preventing further rotation of the sensing shaft.

From the foregoing, it is obvious that relay BF must remain operated to hold the contact 4L and armature 5L of relay BF in the operating circuit of relay BI open until relay VB becomes inoperative. An examination of the timing diagram in FIG. 19 will show that, if relay AM is operated at the time relay BD becomes inoperative, relay BF will be made inoperative by the open condition of contact 1L and armature 2L of relay AM in the holding circuit of relay BF before relay VB is made inoperative by the operation of relay BP. This action will take place after relay BN is made inoperative by the operation of relay BO. The condition for the indefinite operation of relay BI is, therefore, established. To prevent the operation of relay BI in this manner, contact 4L and armature 5L of relay VB are included in the operating circuit of relay AM. The operation of relay VB causes contact 4L and armature 5L of relay VB to open, preventing the operation of relay AM. Therefore, relay BF cannot be made inoperative by the operation of relay AM so long as relay VB is operated. Relay BF will always become inoperative after relay VB has become inoperative, eliminating the possible operation of relay BI for an indefinite period. While the possible operation of relay BI for an indefinite period has been discussed in connection with the TEX to TWX section of the converter, it should be noted that the same problem exists in the TWX to TEX section of the converter. Contact 7L and armature 8L of relay ZM, which corresponds to relay VB, are included in the operating circuit of relay AM in the TWX to TEX section of the converter, and prevent in a manner similar to that described above the possible indefinite operation of the relay BI in the TWX to TEX section of the converter.

Should the symbol character Plus be followed directly by the symbol character Question Mark in a message signal transmitted by the printer 20 of the TEX service, it is necessary for the TEX to TWX section of the converter to translate the two symbol characters as a combination. The operation of the TEX to TWX section of the converter in response to the reception of the combination is such that a translation comprising the symbol characters Diagonal and Period, in that order, is inserted in the message signal fed to the printer 21 of the TWX service. When the symbol character Diagonal is followed directly by the symbol character Period in a message signal transmitted by the printer 21 of the TWX service, the TWX to TEX section of the converter must translate these two symbol characters as a combination. The operation of the TWX to TEX section of the converter in response to the reception of the combination is such that a translation comprising the symbol characters Plus and Question Mark, in that order, is inserted in the message signal fed to the printer 20 of the TEX service.

The operation of the respective sections of the converter to perform the functions outlined in the previous paragraph will now be described in connection with the timing diagram given in FIG. 20. Referring to the circuit diagram of the TEX to TWX section of the converter in FIG. 6, the reception of the symbol character Plus by the TEX to TWX section of the converter causes the operation of relay BC. The operation of relay BC, in turn, causes relay BD to operate and the sensing shaft to begin another rotation. During the rotation of the sensing shaft, a condition corresponding to the next character in the incoming message signal which is assumed to be the symbol character Question Mark is established in the sensing contacts 79, and relay BB is operated. Relay BC becomes inoperative, and relay BE is operated. The above circuit operations occur in the sequence previously described. An examination of FIG. 6a will show that when the symbol character Question Mark is normally received, a ground connection is completed via the output B of the contacts of fan relays AF/AE, AD, AC, AB and AA (at the left hand side of FIG. 6a) to the winding of memory relay VF/VG over a path including armature 8R and contact 7R of relay BD. It is to be noted that, as shown in the chart given in FIG. 2, the symbol character Question Mark is the letter character "B" in upper case status. Relay VF/VG is operated, and the normal translation of the symbol character Question Mark, namely, the word QUERY, is inserted in the outgoing message signal fed to the printer 21 of the TWX service.

When the symbol character Question Mark follows directly the symbol character Plus, however, memory relay VC/VD is operated instead of relay VF/VG. Relay BD is operated upon the reception of the symbol character Plus. Armature 8R and contact 7R of relay BD in the operating circuit of relay VF/VG open, preventing the operation of relay VF/VG. At the same time, armature 8R and contact 9R of relay BD in the operating circuit of relay VC/VD close. Upon the reception of the symbol character Question Mark, therefore, the ground connection is completed to the winding of relay VC/VD rather than to the winding of relay VF/VG as normally occurs. Relay VC/VD is operated. Upon the operation of relay VC/VD, contact 6L and armature 5L of relay VC in the operating circuit of slave memory relay WB close. Relay WB is operated. A translation of the combination of symbol characters Plus and Question Mark then proceeds by the operation of the memory output stepping switch SS1 in the manner previously described, resulting in the insertion of the symbol characters Diagonal and Period, in that order, in the outgoing message signal fed to the printer 21 of the TWX service. The circuit operations can be readily followed by referring to the timing diagram given in FIG. 20, in view of the detailed description thereof previously presented.

The operation of relay BG to perform various functions has been described in connection with the timing diagrams given in FIGS. 16 and 19. Relay BG performs yet another function which will now be described. Once the relay VC/VD is operated, contact 9R and armature 8R of relay VC close. A holding circuit is completed for relay VC/VD, causing relay VC/VD to remain operated until relay BP is operated defining the completion of the insertion of the translation in the outgoing message signal. It will be remembered that relays BD and BE are made inoperative by the operation of relay BN when it is no longer necessary to maintain a condition defining the reception of the symbol character Plus, as in the present case. This action occurs toward the end of the interval during which a translation is inserted in the outgoing message signal. When relay BD becomes inoperative, contact 7R and armature 8R of relay BD in the operating circuit of relay VF/VG close. If relay VF/VG is permitted to operate, the TEX to TWX section of the converter will thereafter try to bring about the normal translation of the symbol character Question Mark. As relay VC/VD continues to be operated by its holding circuit, it may be seen that the operation of relay VF/VG, in addition to setting up a condition for the start of an unwanted translation, will result in confusion in the operation of the TEX to TWX section of the converter. Relay BG functions to prevent the operation of relay VF/VG.

When relay VC/VD is operated upon the reception of the symbol character Question Mark, contact 3L and armature 2L of relay VD in the operating circuit of relay BG close. Relay BG is operated, and contact 3L and armature 2L of relay BG close to complete a holding circuit for relay BG including contact 1L and armature 2L of relay BB. Contact 7R and armature 8R of relay BG in the operating circuit of relay VF/VG open. Relay BG remains operated beyond the time that relay BP is operated defining the completion of the insertion of the translation in the outgoing message signal. The operation of relay BP causes contact 1R and armature 2R of relay BP in the operating circuit of relays VC/VD and VF/VG to open. Relay VC/VD becomes inoperative, and both relay VC/VD and VF/VG are thereafter held in an inoperative condition. When relay BB is operated during the next rotation of the sensing shaft to establish in the sensing contacts 79 a condition corresponding to the next character, contact 1L and armature 2L of relay BB in the holding circuit of relay BG open. Relay BG becomes inoperative. It is to be noted that the operation of relay BB also causes relay BP to become inoperative. The operation of relay BG, therefore, prevents the undesirable operation of relay VF/VG when relay BD is made inoperative.

The circuit operations which occur when the symbol character Diagonal followed directly by the symbol character Period is received by the TWX to TEX section of the converter are similar to those described above. Referring to the circuit diagram of the TWX to TEX section of the converter in FIG. 7, the reception of the symbol character Diagonal causes relays BC, BD and BE to be operated in the sequence described. When the symbol character Period is received immediately thereafter, a ground connection is completed to the winding of memory relay ZO/ZP over a path including the contact 9R and armature 8R of relay BD. Relay ZO/ZP corresponds to relay VC/VD in the TEX to TWX section of the converter. Upon the operation of relay ZO/ZP the translation of the combination of symbol characters Diagonal and Period proceeds, and the symbol characters Plus and Question Mark, in that order, are inserted in the outgoing message signal. The sequence of operation of the relays in the TWX to TEX section of the converter to perform this function will follow that outlined in the timing diagram given in FIG. 20.

A condition similar to that described in the TEX to TWX section of the converter also exists in the TWX to TEX section of the converter. Referring to FIG. 7, the reception of the symbol character Period, normally, causes the fan relays AF/AE, AD, AC, AB and AA to operate to complete a ground connection to the winding of relay AM via the output marked M of the contacts of the fan relays arranged on the left side of FIG. 7a and over a path including lead 133, armature 8R and contact 7R of relay BD, armature 8R and contact 7R of relay BG, lead 134, armature 5L and contact 4L of relay YJ, armature 8L and contact 7L of relay ZM and armature 5R and contact 4R of relay AN. When the symbol character Period is preceded by the symbol character Diagonal, the reception of the symbol character Diagonal causes the operation of relay BD. Contact 7R and armature 8R of relay BD open, preventing the operation of relay AM. At the same time, contact 9R and armature 8R of relay BD in the operating circuit of relay ZO/ZP close. Therefore, when the symbol character Period is received, the ground connection is completed to the winding of relay ZO/ZP rather than to the winding of relay AM. Relay ZO/ZP operates to bring about the translation referred to above. When the relay BD becomes inoperative upon the operation of relay BN, contact 7R and armature 8R of relay BD close. The condition for operating relay AM is, therefore, established. In order to prevent relay AM from operating before relay BP is operated, relay BG is operated by the operation of relay ZO/ZP. Armature 2L and contact 3L of relay ZP close upon the operation of relay ZO/ZP, completing a ground connection to the winding of relay BG. Contact 7R and armature 8R of relay BG are included in the operating circuit of relay AM, and are held in an open condition for the interval in which relay BG is operated. As relay BG remains operated until after relay BP is operated, any operation of relay AM is prevented. The operation of relay BP, of course, causes contact 1R and armature 2R of relay BP in the operating circuit of both relay AM and relay ZO/ZP to open. Relay ZO/ZP becomes inoperative, and both relay AM and relay ZO/ZP are, thereafter, held in an inoperative condition.

Referring briefly to the timing diagram given in FIG. 8 and to the circuit diagram in either FIG. 6 or FIG. 7 of the respective sections of the converter, it may be seen that contact 7R and armature 8R of relay BP which are normally closed are included in the holding circuit of relay CP. Actually, relay CP is made inoperative before relay BP operates. Should relay CP not become inoperative as intended, the continued operation of relay CP would prevent any further rotation of the sensing shaft, causing cessation of operation within the section of the converter. Armature 8R and contact 7R of relay BP are included in the holding circuit of relay CP as a safety factor. If relay CP should be operated when relay BP operates, the operation of relay BP will cause relay CP to become inoperative. Several safety features of this type are located in the circuits of the respective sections of the converter. They have no significance unless and until some relay or contacts thereof fail to perform in the proper manner to produce a desired result.

From the previous description, it can be seen that the converter comprises two similar sections which operate for the most part entirely independently of one another. However, a feature of the converter is the use of interconnections between the respective sections of the converter to ensure that both sections are in the same case status at all times. The need for such a control is apparent. For example, assuming that a message signal has been transmitted from the printer 20 of the TEX service to the printer 21 of the TWX service and that the last character in the message is a character in lower case, the printer 20 of the TEX service, the printer 21 of the TWX service and the TEX to TWX section of the converter will all be left in the lower case or Letters status. Now, assuming that the printer 21 of the TWX service completes the transmission of a message signal to the printer 20 of the TEX service and that the last character in the message is a character in upper case status, the printer 21 of the TWX service, the printer 20 of the TEX service and the TWX to TEX section of the converter will all be left in upper case or Figures status. Without any control between the respective sections of the converter, one of the sections of the converter would now be in upper case status, while the other remains in lower case status. Printer 20 of the TEX service is in upper case status, while the TEX to TWX section of the converter will still be in lower case status. Obviously, any attempt by the printer 20 of the TEX service to begin the transmission of a message signal in upper case status will result in confusion and the distortion of the message signal, due to the fact that the TEX to TWX section of the converter is in lower case status. Both sections of the converter must be maintained at all times in a case status corresponding to that in which the printer 20 of the TEX service and printer 21 of the TWX service are placed by the operation thereof.

The function of relay AL to define the operation of a section of the converter in upper case status has been described in connection with the timing diagram given in FIG. 8. The reception of the control function character Figures by either section of the converter causes stunt relay AH in that section of the converter to operate. The operation of the stunt relay AH, in turn, causes the relay AL in both sections of the converter to operate. When the relays AL are operated, a holding circuit is completed for the relays AL including contact 4R and armature 5R of stunt relay AG in the TWX to TEX section of the converter and contact 4R and armature 5R of stunt relay AG in the TEX to TWX section of the converter. It will be remembered that the stunt relay AG is operated upon the reception of the control function character Letters. When a control function character Letters is received by one of the sections of the converter, the stunt relay AG in that section of the converter is operated. Contact 4R and armature 5R of the particular stunt relay AG operated upon the reception of the control function character Letters open. The subsequent operation of relay AN causes contact 1R and armature 2R of relay AN connected in parallel with the contact 4R and armature 5R of the relay AG which has been operated to also open. The holding circuit is broken, and the relay AL in both sections of the converter becomes inoperative. As a result, both sections of the converter are simultaneously returned to lower case status. It may be seen, therefore, that the respective sections of the converter are maintained in the same case status at all times by the control exercised simultaneously over the operation of the relay AL in both sections of the converter through the interconnections provided. The case status of the respective sections of the converter will at all times agree with that of the printer 20 of the TEX service and of the printer 21 of the TWX service.

A relay CN is included in each section of the converter to prevent a possible occurrence which would disrupt the operation of the converter. While the operation of relay CN will be described in connection with the TEX to TWX section of the converter, the operation of the relay CN in the TWX to TEX section of the converter is exactly the same. It will be assumed that the printer 21 of the TWX service has just completed the transmission of a message signal and that the last character in the message is the control function character Figures. Relay AH in the TWX to TEX section of the converter is operated, and armature 8R and contact 9R of relay AH located in the TWX to TEX section of the converter close. A ground connection is completed to the winding of the relay AL located in the TEX to TWX section of the converter over a path including armature 8L and contact 7L of the relay CP located in the TWX to TEX section of the converter, armature 8R and contact 9R of the relay AH located in the TWX to TEX section of the converter, terminal 85' (at the bottom of FIG. 7b), terminal 85 (at the bottom of FIG. 6b) and armature 5L and contact 4L of relay CN in the TEX to TWX section of the converter. At the same time, a connection is completed from the grounded side of the winding of relay AL in the TEX to TWX section of the converter to the winding of the relay AL in the TWX to TEX section of the converter over a path including terminal 86 (at the bottom of FIG. 6b) and terminal 86' (at the bottom of FIG. 7b). The relay AL in both sections of the converter is operated. Contact 6L and armature 5L of the respective relays AL close, completing the holding circuit for both relays.

It will now be assumed that the printer 20 of the TEX service proceeds to transmit a message and that the control function character Letters is received by the TEX to TWX section of the converter during the course of the message. Stunt relay AG and relay AN in the TEX to TWX section of the converter are operated. Contact 4R and armature 5R of relay AG and the parallel connected contact 1R and armature 2R of relay AN, located in the TEX to TWX section of the converter and in the holding circuit of the relays AL, open. This action would normally cause the relay AL in the respective sections of the converter to become inoperative. However, it will be remembered that it was assumed that the last character in the message signal received by the TWX to TEX section of the converter was the control function character Figures. A condition corresponding to this character will remain in the sensing contacts 79 of the sensing mechanism associated with the TWX to TEX section of the converter until the first character of a subsequent message signal transmitted by the printer 21 of the TWX service is received. As a result, the relay AH in the TWX to TEX section of the converter remains operated. This action would cause the original operating circuit of the relay AL in the respective sections of the converter to remain operated even though the holding circuit of the relays AL is broken by the operation of the relays AG and AN in the TEX to TWX section of the converter. Both sections of the converter would remain in upper case status.

It may be seen, therefore, that a condition can exist such that both sections of the converter are locked in upper case status, preventing the proper operation of the TEX to TWX section of the converter in forwarding a message signal from the printer 20 of the TEX service to the printer 21 of the TWX service. Relay CN functions to prevent this condition. When the first character included in a message signal transmitted by the printer 20 of the TEX service is received by the TEX to TWX section of the converter, the transmitter stop contact 89 in the sensing mechanism associated with the TEX to TWX section of the converter is closed. Relay CM is operated. Contact 3R and armature 2R of relay CM close, completing a ground connection to the winding of relay CN. Relay CN in the TEX to TWX section of the converter is operated. Contact 3L and armature 2L of relay CN close, and a holding circuit is completed for relay CN over a path including lead 135, terminal 88 (at the bottom of FIG. 6b), terminal 88' (at the bottom of FIG. 7b) and contact 1L and armature 2L of relay BB in the TWX to TEX section of the converter. When relay CN is operated, contact 4L and armature 5L of relay CN (shown at the bottom of FIG. 6b) in the operating circuit of the relays AL open. The original operating circuit of the relays AL including contact 9R and armature 8R of relay AH in the TWX to TEX section of the converter is broken. As a result, when the holding circuit of the relays AL is broken by the operation of relays AG and AN upon the reception by the TEX to TWX section of the converter of the control function character Letters, the relays AL in the respective sections of the converter become inoperative. This action returns both sections of the converter to lower case status.

The relay CN in the TEX to TWX section of the converter will remain operated for the duration of the transmission of the message signal from the printer 20 of the TEX service to the printer 21 of the TWX service. When the transmission of the message signal has been completed, relay CN remains operated by the holding circuit including contact 1L and armature 2L of the relay BB in the TWX to TEX section of the converter. When the printer 21 of the TWX service begins the transmission of a message signal, the sensing shaft of the sensing mechanism associated with the TWX to TEX section of the converter will begin its first rotation. During the first rotation, relay BB in the TWX to TEX section is operated. Contact 1L and armature 2L of the relay BB in the holding circuit of the relay CN in the TEX to TWX section of the converter open, and the relay CN becomes inoperative. The relay CN in the TWX to TEX section of the converter will be operated, and the circuit operations which follow are similar to those described above. The operation of the relay CN in the TWX to TEX section of the converter will prevent both sections of the converter from being locked in upper case status should the last character which was received by the TEX to TWX section of the converter be the control function character Figures. Relay CN located in each section of the converter functions to give control of the case status of both sections of the converter to that section which is in operation, and prevents the possible locking of both sections of the converter in upper case status in the manner described above.

Each section of the converter includes an alarm circuit. The alarm circuit includes a relay CA which is shown in FIG. 6b of the circuit diagram of the TEX to TWX section of the converter and in FIG. 7b of the circuit diagram of the TWX to TEX section of the converter. The description to be given applies equally well to the operation of the alarm circuit in either section of the converter. While the alarm circuit is not necessary to the operation of the converter, it is felt to be necessary when the converter is installed at a remote area. The alarm circuit is used to indicate that a message signal is available for transmission by a section of the converter, but that the sensing shaft is not rotating and, therefore, no transmission of the message signal is taking place. When there is no message signal available for transmission, relay CM is inoperative. Referring to FIGS. 6a and 6b, an electrical path is completed from ground to battery including armature 2L and contact 1L of relay CM, lead 136, capacitor 137 and resistor 138. The winding of relay CA connected in parallel with the capacitor 137 and resistor 138 is energized, and relay CA is operated. If a message signal is available for transmission, relay CM is operated. Armature 2L and contact 1L of relay CM open, breaking the original operating circuit of relay CA. The arrangement including capacitor 137 and resistor 138 connected in parallel with the winding of relay CA tend to make relay CA a slow release relay. The time constant of the arrangement including capacitor 137 and resistor 138 is such that, before relay CA can become inoperative, relay BB is operated during the first rotation of the sensing shaft. An electrical path is completed from ground to battery including armature 8L and contact 9L of relay BB, lead 136, capacitor 137 and resistor 138. This action causes relay CA to remain operated. As relay BB is operated during each subsequent rotation of the sensing shaft, the operating circuit of relay CA is re-energized, causing relay CA to remain operated. It is to be noted that when a translation is being performed, the sensing shaft may be stopped and, therefore, relay BB may remain inoperative for a period of some duration. However, the slow release time of relay CA is set so that relay CA will remain operated for a longer period than is required to complete any normal translation.

If the sensing shaft should remain stopped for a period longer than the slow release time of relay CA, when a message signal is available for transmission (as indicated by the operation of relay CM), relay CA becomes inoperative. This condition could occur due to a breakdown in equipment and so on. An electrical path is completed from ground to battery including a lamp 139, for example, a red light, and armature 1L and contact 3L of relay CA. A further electrical path is completed from ground to battery including armature 1R and contact 3R of relay CA and an alarm device 140, for example, a bell. The operation of the alarm device 140 and lamp 139 serve to alert operating personnel to the condition. If it is desired to turn off the lamp 139 and alarm device 140 or to prevent the operation of the alarm circuit, a switch 141 which is normally open is closed. This action completes a ground connection to the winding of relay CA and causes relay CA to become operated and to remain operated regardless of other circuit operations which may occur.

It is possible that various occasions may arise when it is desirable for the respective sections of the converter to forward a message signal exactly as received without performing any of the conversion functions described above. A switch 97, which is normally closed, is located in each section of the converter to perform this function. This switch 97 located in the TEX to TWX section of the converter is shown at the top of FIG. 6b, while the corresponding switch 97 located in the TWX to TEX section of the converter is shown at the top of FIG. 7b. In each case, the switch 97 is included in the original operating circuit of relay CP. When the switch 97 is opened, therefore, relay CP is prevented from operating. As a result the winding 90 of the sensing magnet will remain energized, and the sensing shaft will continue to rotate so long as there are characters available for transmission, as indicated by the operation of relay CM. It will be remembered that the switch 97 located in the TEX to TWX section of the converter is included in the holding circuit of both of the relays AL located in the respective sections of the converter. While the reception of the control function character figures by one of the sections of the converter will result in the operation of the relays AL, the opening of the switch 97 in the TEX to TWX section of the converter will prevent the completion of the holding circuit for the relays. Both sections of the converter will reutrn to lower case status following the reception of the control function character figures. As a result, all characters included in the incoming message signal, whether converting or non-converting type characters, will be repeated exactly as received. The circuit operations will be the same as normally occur in the transmission of lower case characters, as were described in connection with the timing diagram given in FIG. 8. The converting type characters will be repeated without translation, and the conversion functions normally performed will not occur. In actual practice, the switch 97 in the TEX to TWX section of the converter, shown in FIG. 6b, and the switch 97 in the TWX to TEX section of the converter, shown in FIG. 7b, may be ganged together for simultaneous operation. Also, a single switch 97 may be used with connections completed to the respective sections of the converter in the manner shown in FIGS. 6 and 7. Separate switches 97 have been shown in the respective sections of the converter only for ease of description.

While a specific embodiment of the converter according to the invention has been shown and described in connection with the circuit diagrams given in FIGS. 6 and 7, it is to be understood that the features described may be readily adapted for use in other embodiments of the converter. The respective sections of the converter may be altered to meet the requirements resulting from differences existing between the different codes used by a set of services other than the TEX and TWX services without departing from the spirit of the invention.

What is claimed is:

1. A code converter adapted for use in a communication system including a first device arranged to transmit and receive the upper and lower case characters in a first fixed-length telegraph code and means for receiving the characters in said code to control said first device, a second device arranged to transmit and receive the upper and lower case characters in a second fixed-length telegraph code and means for receiving the characters in said second code to control said second device, said first code differing in certain upper case characters from said second code and said second code differing in certain upper case characters from said first code, said converter comprising, in combination, a first switching circuit, means whereby said first switching circuit is made responsive to said certain upper case characters in said first code transmitted by said first device to perform the conversion functions required to convert said certain characters received to corresponding characters in said second code for transmission to said second device, a second switching circuit, means whereby said second switching circuit is made responsive to said certain characters in said second code transmitted by said second device to perform the conversion functions required to convert the said certain characters received to corresponding characters in said first code for transmission to said first device, and control means coupled to both of said circuits and responsive to the operation of either one of said circuits to cause the other of said circuits to assume a case status corresponding to that of the circuit in operation, whereby said first and said second switching circuits are maintained in the same case status at all times.

2. A code converter adapted for use in a telegraph communication system including a first page printer arranged to receive and transmit the upper and lower case characters in a first fixed-length telegraph code and means for receiving the characters in said code to control said printer, a second page printer arranged to receive and transmit the upper and lower case characters in a second fixed-length telegraph code and means for receiving the characters in said second code to control said second printer, said first code differing in certain upper case characters from said second code and said second code differing in certain upper case characters from said first code, said converter comprising, in combination, a first relay means, means whereby said relay means is made responsive to said certain characters in said first code transmitted by said first printer to perform the conversion functions required to convert said certain characters received by it to corresponding characters in said second code for transmission to said second printer, a second relay means, means whereby said second relay means is made responsive to said certain characters in said second code transmitted by said second printer to perform the conversion functions required to convert said certain characters received by it to corresponding characters in said first code for transmission to said first printer, means coupled between said first and said second relay means to cause either one of said relay means upon the operation thereof to assume control over the case status of said other relay means, whereby said first and said second relay means are maintained in the same case status at all times.

3. In a communication system including a first communication means arranged to transmit and receive the characters in a fixed-length telegraph code and means for receiving the characters in said code to control said communication means, a second communication means arranged to transmit and receive the characters in a second fixed-length telegraph code and means for receiving the characters in said second code to control said second communication means, said first code differing in certain characters from said second code, means for translating certain characters in said first code into characters in said second code and for translating certain characters in said second code into characters in said first code comprising, in combination, a first switching means, means whereby said switching means is made responsive to said certain characters in said first code transmitted by said first communication means to effect a translation of said certain characters received by it into corresponding characters in said second code for transmission to said second communication means, a second switching means, means whereby said second switching means is made responsive to said certain characters in said second code transmitted by said second communication means to effect a translation of said certain characters received by it into corresponding characters in said first code for transmission to said first communication means, and means coupled between said switching means to cause either one of said switching means upon the operation thereof to assume control over the case status of the other of said switching means.

4. In a communication system including a first communication means arranged to transmit and receive the characters in a fixed-length telegraph code and means for receiving the characters in said code to control said communication means, a second communication means arranged to transmit and receive the characters in a second fixed-length telegraph code and means for receiving the characters in said second code to control said second communication means, said first code differing in certain characters from said second code, means for translating certain characters in said first code into characters in said second code and for translating certain characters in said second code into characters in said first code comprising, in combination, a first switching means, means whereby said switching means is made responsive to characters in said first code transmitted by said first communication means to repeat characters other than said certain characters in said first code for transmission to said second communication means, said first switching means being operated upon the reception of said certain characters in said first code to effect a translation of said certain characters received by it into corresponding characters in said second code for transmission to said second communication means, a second switching means, means whereby said second switching means is made responsive to characters in said second code transmitted by said second communication means to repeat characters other than said certain characters in said second code for transmission to said first communication means, said second switching means being made upon the reception of said certain characters in said second code to effect a translation of said certain characters received by it into corresponding characters in said first code for transmission to said first communication means, and means coupled between said first and said second switching means to cause either one of said switching means upon the operation thereof to assume control over the case status of the other of said switching means.

5. In a telegraph communication system including a first page printing means arranged to receive and transmit the characters in a first fixed-length telegraph code and means for receiving the characters in said code to control said printing means, a second page printing means arranged to receive and transmit the characters in a second fixed-length telegraph code and means for receiving the characters in said second code to control said second printing means, said first code differing in certain characters from said second code and said second code differing in certain characters from said first code, a code translating system comprising, in combination, a first switching means including a plurality of electromagnetically operated relay means, means whereby said first switching means is made responsive to characters in said first code transmitted by said first printing means to repeat characters other than said certain characters in said first code for transmission to said second printing means, said first switching means being made upon the reception of said certain characters in said first code to effect a translation of said certain characters received by it into corresponding characters in said second code for transmission to said second printing means, a second switching means including a plurality of electromagnetically operated relay means, means whereby said second switching means is made responsive to characters in said second code to repeat characters other than said certain characters in said second code for transmission to said first printing means, said second switching means being made upon the reception of said certain characters in said second code to effect a translation of said certain characters received by it into corresponding characters in said first code for transmission to said first printing means, one of said relay means included in said first switching means being adapted to be operated when said first switching means causes the transmission of characters to said second printing means, one of said relay means included in said second switching means being adapted to be operated when said second switching means causes the transmission of characters to said first printing means, and means including said one relay means in said first switching means and said one relay means in said second switching means responsive to the operation of either one of said switching means to cause the one of said switching means in operation to assume control over the case status of the other of said switching means.

6. In a communication system including a first communication means arranged to transmit and receive the upper and lower case characters in a first fixed-length telegraph code and means for receiving the characters in said code to control said communication means, a second communication means arranged to transmit and receive the upper and lower case characters in a second fixed-length telegraph code and means for receiving the characters in said second code to control said second communication means, said first code differing in certain upper case characters from said second code and said second code differing in certain upper case characters from said first code, a code translating system comprising, in combination, a first switching means, means whereby said switching means is made responsive to characters in said first code transmitted by said first communication means to repeat the lower case and upper case characters other than said certain characters in said first code for transmission to said second communication means, said first switching means being made responsive to said certain characters in said first code to effect a translation thereof into corresponding characters in said second code for transmission to said second communication means, a second switching means, means whereby said second switching means is made responsive to characters in said second code transmitted by said second communication means to repeat the lower case characters and upper case characters other than said certain characters in said second code for transmission to said first communication means, said second switching means being made responsive to said certain characters in said second code to effect a translation thereof into corresponding characters in said first code for transmission to said first communication means, and control means coupled to both of said switching means and responsive to the operation of either one of said switching means to cause the other of said switching means to assume a case status corresponding to that of said switching means in operation, whereby said first and said second switching means are maintained in the same case status at all times.

7. In a communication system as defined in claim 6, and wherein additional control means are connected to said first and said second switching means, said switching means being operated upon the operation of said additional control means to repeat said certain characters for transmission to said respective communication means without effecting a translation thereof.

8. In a communication system as defined in claim 7, and wherein said additional control means are manually operated.

9. In a telegraph communication system including a first printing means arranged to transmit and receive the upper and lower case characters in a first five-unit telegraph code and means for receiving the characters in said code to control said printing means, a second printing means arranged to transmit and receive the upper and lower case characters in a second five-unit telegraph code and means for receiving the characters in said second code to control said second printing means, said first code differing in certain upper case characters from said second code and said second code differing in certain upper case characters from said first code, a code translating system comprising, in combination, a first switching means including an arrangement of electromagnetically operated relay means, means whereby said first switching means is made responsive to characters in said first code transmitted by said first printing means to repeat the lower case and upper case characters other than said certain characters in said first code for transmission to said second printing means, said first switching means being made responsive to said certain characters in said first code to effect a translation thereof into corresponding characters in said second code for transmission to said second printing means, a second switching means including an arrangement of electromagnetically operated relay means, means whereby said second switching means is made responsive to characters in said second code transmitted by said second printing means to repeat the lower case and upper case characters other than said certain characters in said second code for transmission to said first printing means, said second switching means being made responsive to said certain characters in said second code to effect a translation thereof into corresponding characters in said first code for transmission to said first printing means, one of said relay means included in said first switching means being adapted to be operated when said first switching means causes the transmission of characters to said second printing means, one of said relay means included in said second switching means being adapted to be operated when said second switching means causes the transmission of characters to said first printing means, means including said one relay means in said first switching means and said one relay means in said second switching means coupled between said first and said second switching means and responsive to the operation of either one of said switching means to cause the other of said switching means to assume a case status corresponding to that of said switching means in operation, said first and said second switching means being maintained in the same case status at all times, and manually operated control means connected to said first and to said second switching means, said switching means being responsive to the operation of said control means to repeat said certain characters for transmission to said respective printing means without effecting a translation thereof.

10. In combination, a printer responsive to fixed-length telegraph code characters transmitted to it in groups for printing a message on a line, a comparator circuit coupled to the input of said printer and including a counting mechanism for counting the characters adapted to be received by said printer and for comparing the number of the characters printed on said line with the unused spaces remaining on the line, said comparator being responsive to the operation of said counting mechanism when the number of unused character spaces remaining on a line is insufficient to accommodate the number of characters in a succeeding group of characters transmitted to said printer to cause the transmission to said printer of carriage return and line feed characters prior to the receipt by said printer of said succeeding group of characters.

11. In combination, a printing device adapted to print a series of characters on a line, a source of signals supplying serially appearing fixed-length telegraph code characters arranged in groups connected to said device and adapted to transmit said characters to said device, a counting mechanism coupled to said source and arranged to count each character upon the transmission thereof from said source to said device which character is adapted to be printed on a line by said device and for determining the number of unused character spaces remaining on a line printed by said device, means connected to said counting mechanism and to said source to cause said counting mechanism upon the operation of said source to start the transmission of a group of characters to said device after said counting mechanism has counted a predetermined number of characters to compare the number of unused character spaces remaining on a line printed by said device with the number of characters in said last mentioned group of characters, said source being responsive to the operation of said counting mechanism when the number of unused character spaces remaining in a line is insufficient to accommodate the number of characters in said last mentioned group of characters to cause the transmission of carriage return and line feed characters prior to the transmission of said last mentioned group of characters to said device.

12. In combination, a printing device adapted to print a series of characters on a line, a source of signals supplying serially appearing telegraph code characters arranged in groups, switching means connected to said source and adapted to transmit said characters to said device, a counting mechanism coupled to said switching means and arranged to count each character upon the transmission thereof from said switching means to said device which character is adapted to be printed on a line by said device, for determining the number of unused character spaces remaining on a line printed by said device, contacts mounted on said counting mechanism and adapted to be operated when said counting mechanism has counted a predetermined number of characters, means connected to said counting mechanism and to said switching means to cause said counting mechanism upon the operation of said switching means to start the transmission of a group of characters to said device when said contacts are operated to compare the number of unused character spaces remaining on a line printed by said device with the number of characters in said last mentioned group of characters, said switching means being responsive to the operation of said counting mechanism when the number of unused character spaces remaining on a line is insufficient to accommodate the number of characters in said last mentioned group of characters to cause the transmission of carriage return and line feed characters prior to the transmission of said last mentioned group of characters to said device.

13. In a communication system including a first printing means arranged to transmit and receive the characters in a first fixed-length telegraph code, a second printing means arranged to transmit and receive the characters in a second fixed-length telegraph code and adapted to print a predetermined number of characters on a line, said first code differing in certain characters from said second code, means for translating said certain characters comprising, in combination, a switching means, means whereby said switching means is made responsive to said certain characters transmitted by said first printing means in said first code to effect a translation of each of said certain characters into a corresponding combination of characters in said second code for transmission to said second printing means, a counting means coupled to said switching means and arranged to count each character upon the transmission thereof from said switching means to said second printing means which character is adapted to be printed on a line by said second printing means, for determining the number of unused character spaces remaining on a line printed by said second printing means, means connected to said counting means and to said switching means to cause said counting means upon the operation of said switching means after said counting means has counted a predetermined number of characters to compare the number of unused character spaces remaining on a line printed by said second printing means with the number of characters resulting from the translation by the switching means of any one of said certain characters, and means whereby said switching means is made responsive to the operation of said counting means when the number of unused character spaces remaining in a line is insufficient to accommodate the number of characters in the combination of characters resulting from said last mentioned translation to cause the transmission of carriage return and line feed characters prior to the transmission of said last mentioned combination of characters to said second printing means.

14. In a communication system as defined in claim 13, and wherein said switching means includes an arrangement of electromagnetic relay means, said counting means including an electromagnetically operated stepping switch having a plurality of contacts mounted thereon adapted to be selectively operated according to the number of characters counted by said switch.

15. In a communication system including a first printing means arranged to transmit and receive the characters in a first fixed-length telegraph code, a second printing means arranged to transmit and receive the characters in a second fixed-length telegraph code and adapted to print a predetermined number of characters on a line, said first code differing in certain characters from said second code, means for translating said certain characters comprising, in combination, a switching means, means whereby said switching means is made responsive to characters transmitted by said first printing means to repeat the characters other than said certain characters in said first code for transmission to said second printing means, said switching means being made upon the reception of said certain characters in said first code to effect a translation of said certain characters into a corresponding combination of characters in said second code for transmission to said second printing means, a counting means coupled to said switching means and arranged to count each character upon the transmission thereof from said switching means to said second printing means which character is adapted to be printed on a line by said second printing means, for determining the number of unused character spaces remaining on a line printed by said second printing means, a second switching means connected to said counting means and to said first switching means and adapted to be operated when said counting means has counted a predetermined number of characters, means whereby said first switching means is made responsive to the operation of said second switching means to interrupt the transmission of characters and to complete the transmission during said interruption of carriage return and line feed characters to said second printing means, the transmission of characters by said first switching means from said first printing means to said second printing means being reestablished after the transmission of said carriage return and line feed characters, means connected to said counting means and to said first switching means to cause said counting means upon the operation of said first switching means after said counting means has counted a predetermined number of characters to compare the number of unused character spaces remaining in a line printed by said second printing means with the number of characters resulting from the translation by said first switching means of any one of said certain characters, said first switching means being responsive to the operation of said counting means when the number of unused character spaces remaining on a line is insufficient to accommodate the number of characters in the combination of characters resulting from said last mentioned translation to cause the transmission of carriage return and line feed characters prior to the transmission of said last mentioned combination of characters to said second printing means.

16. In a communication system as defined in claim 15, and wherein said first switching means includes an arrangement of electromagnetic relay means, said counting means including an electromagnetically operated stepping switch having a plurality of contacts mounted thereon adapted to be selectively operated according to the number of characters counted by said switch.

17. In a communication system including a first printing means arranged to transmit and receive the upper and lower case characters in a first fixed-length telegraph code, a second printing means arranged to transmit and receive the upper and lower case characters in a second fixed-length telegraph code and adapted to print a determined number of characters on a line, said first code differing in certain upper case characters from said second code, means for translating said certain characters comprising, in combination, a switching means, means whereby said switching means is made responsive to characters transmitted by said first printing means in said first code to repeat the lower case and upper case characters other than said certain characters in said first code for transmission to said second printing means, said switching means being made upon the reception of said certain characters in said first code to effect a translation of each of said certain characters into a corresponding combination of characters in said second code for transmission to said second printing means, a counting means coupled to said switching means and arranged to count each character upon the transmission thereof from said switching means to said second printing means which character is adapted to be printed on a line by said second printing means, for determining the number of unused character spaces remaining on a line printed by said second printing means, means connected to said counting means and to said switching means to cause said counting means upon the operation of said switching means after said counting means has counted a predetermined number of characters to compare the number of unused character spaces remaining on a line printed by said second printing means with the number of characters resulting from the translation by the switching means of any one of said certain characters, and means whereby said switching means is made responsive to the operation of said counting means when the number of unused character spaces remaining on a line is insufficient to accommodate the number of characters in the combination of characters resulting from said last mentioned translation to cause the transmission of carriage return and line feed characters prior to the transmission of said last mentioned combination of characters to said second printing means.

18. In a telegraph communication system including a first printing means arranged to transmit and receive the upper and lower case characters in a first fixed-length telegraph code, a second printing means arranged to transmit and receive the upper and lower case characters in a second fixed-length telegraph code and adapted to print a predetermined number of characters on a line, said first code differing in certain upper case characters from said second code, a code translating system comprising, in combination, a relay means, means whereby said relay means is made responsive to said certain characters transmitted by said first printing means in said first code to translate each of said certain characters into a corresponding combination of characters in said second code for transmission to said second printing means, an electromagnetically operated stepping switch coupled to said relay means and arranged to count each character put out by said relay means which character is adapted to be printed on a line by said second printing means, for determining the number of unused character spaces remaining on a line printed by said second printing means, contacts mounted on said switch and adapted to be operated when said switch has counted a predetermined number of characters, means connected to said switch and to said relay means to cause said switch upon the operation of said relay means when said contacts are operated to compare the number of unused character spaces remaining on a line printed by said second printing means with the number of characters resulting from the translation by the relay means of any one of said certain characters, and means whereby said relay means is made responsive to the operation of said switch when the number of unused character spaces remaining on a line is insufficient to accommodate the number of characters in the combination of characters resulting from said last mentioned translation to cause the transmission of carriage return and line feed characters prior to the transmission of said last mentioned combination of characters to said second printing means.

19. In combination, a telegraph printer device adapted to print characters on a line, a source of serially appearing telegraph code characters, means coupled between said source and said device arranged to pass all but certain of said code characters to said device and to translate said certain characters into groups of code characters which are forwarded to said device, counting means coupled to said first-mentioned means for counting the code characters forwarded from said first-mentioned means to said device and printed by said device on a line, whereby said counting means determines the number of unused character spaces remaining on a line printed by said device, means coupled between said first-mentioned means and said counting means to operate said counting means to compare the number of unused character spaces and the number of characters in a group of characters resulting from the translation of one of said certain characters, and means responsive to the operation of said counting means when the number of unused character spaces remaining on a line is insufficient to accommodate the number of characters in said last-mentioned group of characters to cause said first-mentioned means to forward to said device carriage return and line feed characters prior to the forwarding to said device of said last-mentioned group of characters.

20. A code converter adapted for use in a communication system including a first communication means arranged to transmit and receive the characters in a first telegraph code and means for receiving the characters in said code to control said first communication means, a second communication means arranged to transmit and receive the characters in a second telegraph code and means for receiving the characters in said second code to control said second communication means, each of said first and second codes including thirty-two combinations of five marking and spacing elements with each combination being assigned to an upper case character and to a lower case character in the respective code, said converter comprising, in combination, a first switching means, means whereby said first switching means is made responsive to the characters in said code transmitted by said first communication means to perform the conversion functions required to convert the characters received to corresponding characters in said second code for transmission to said receiving means of said second communication means, a second switching means, means whereby said second switching means is made responsive to the characters in said second code transmitted by said second communication means to perform the conversion functions required to convert the characters received to corresponding characters in said first code for transmission to said receiving means of said first communication means, and control means coupled to both of said switching means and responsive to the operation of either one of said switching means to cause the other of said switching means to be in the same case status as that of the switching means in operation at all times.

References Cited in the file of this patent

UNITED STATES PATENTS

| | | |
|---|---|---|
| 2,673,236 | Phelps | Mar. 23, 1954 |
| 2,706,215 | Van Duuren | Apr. 12, 1955 |

FOREIGN PATENTS

| | | |
|---|---|---|
| 872,514 | Germany | Apr. 2, 1953 |

OTHER REFERENCES

"A Printing Telegraph Tape-to-Tape Translator," by A. E. Frost, AIEE Technical Paper 50–13, November 1949, 12 pages. (Copy in Div. 42–178/26.5.)